US007923083B2

(12) United States Patent
Tojo et al.

(10) Patent No.: US 7,923,083 B2
(45) Date of Patent: Apr. 12, 2011

(54) RECORDING MEDIUM, INK COMPOSITION AND RECORDING METHOD USING THE SAME

(75) Inventors: Kaoru Tojo, Shizuoka (JP); Toshiki Taguchi, Shizuoka (JP); Yoshiharu Yabuki, Kanagawa (JP); Makoto Suzuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1635 days.

(21) Appl. No.: 11/157,078

(22) Filed: Jun. 21, 2005

(65) Prior Publication Data

US 2005/0233097 A1 Oct. 20, 2005

Related U.S. Application Data

(63) Continuation-in-part of application No. PCT/JP2005/004391, filed on Mar. 8, 2005.

(30) Foreign Application Priority Data

Mar. 11, 2004 (JP) ............................. P.2004-068546
Mar. 29, 2004 (JP) ............................. P.2004-094600
Jul. 26, 2004 (JP) ............................. P.2004-216913

(51) Int. Cl.
*B41M 5/40* (2006.01)
(52) U.S. Cl. ............... 428/32.26; 428/32.27; 428/32.28; 428/32.3; 428/32.34
(58) Field of Classification Search ............... 428/32.26, 428/32.27, 32.28, 32.3, 32.34
See application file for complete search history.

(56) References Cited

U.S. PATENT DOCUMENTS

| | | | |
|---|---|---|---|
| 3,781,346 A * | 12/1973 | Norton ........................ | 562/487 |
| 4,877,922 A | 10/1989 | Sasaki et al. | |
| 2001/0014381 A1 * | 8/2001 | Kaneko et al. ................ | 428/195 |
| 2002/0055071 A1 * | 5/2002 | Nakai et al. .................... | 430/429 |
| 2002/0119295 A1 | 8/2002 | Speer et al. | |
| 2002/0175983 A1 * | 11/2002 | Ishikawa et al. ............. | 347/100 |
| 2003/0064208 A1 | 4/2003 | Yamada et al. | |
| 2003/0104173 A1 * | 6/2003 | Merkel et al. ................ | 428/195 |
| 2003/0179269 A1 | 9/2003 | Yamanouchi et al. | |
| 2004/0096599 A1 | 5/2004 | Kobayashi et al. | |
| 2004/0166252 A1 | 8/2004 | Takashima et al. | |
| 2004/0246321 A1 | 12/2004 | Takashima et al. | |
| 2005/0183630 A1 * | 8/2005 | Oki et al. .................... | 106/31.49 |
| 2006/0088671 A1 | 4/2006 | Kobayashi et al. | |
| 2006/0135646 A1 * | 6/2006 | Oki et al. ...................... | 523/160 |
| 2006/0233976 A1 * | 10/2006 | Uhlir-Tsang et al. ...... | 428/32.34 |

FOREIGN PATENT DOCUMENTS

| | | |
|---|---|---|
| CN | 1500655 A | 6/2004 |
| EP | 0 251 282 A2 | 1/1988 |
| JP | 55-161856 A | 12/1980 |
| JP | 61-36362 A | 2/1986 |
| JP | 2-212566 A | 8/1990 |
| JP | 03-000782 A | 1/1991 |
| JP | 06-211813 A | 8/1994 |
| JP | 8-100141 A | 4/1996 |
| JP | 8-108616 A | 4/1996 |
| JP | 8-169173 A | 7/1996 |
| JP | 8-267908 A | 10/1996 |
| JP | 10-119423 A | 5/1998 |
| JP | 10-217601 A | 8/1998 |
| JP | 11-504958 T | 5/1999 |
| JP | 2000-53765 A | 2/2000 |
| JP | 2000-309156 A | 11/2000 |
| JP | 2001-64893 A | 3/2001 |
| JP | 2001-88430 A | 4/2001 |
| JP | 2003-39824 A | 2/2003 |
| JP | 2003-54122 A | 2/2003 |
| JP | 2003-231850 A | 8/2003 |
| JP | 2005-169664 A | 6/2005 |

OTHER PUBLICATIONS

Patent Abstracts of Japan (JP-A-2001 088430) Ota Tetsuji, "Ink Jet Recording Material".
Partial European Search Report dated Nov. 15, 2005.
Chinese Office Action Dated Sep. 26, 2008.
Notification of Reasons for Refusal issued in counterpart Japanese Application No. 2004-216913 dated Jan. 6, 2010.
Japanese Office Action for Application No. 2004-216913, dated Mar. 30, 2010.

* cited by examiner

*Primary Examiner* — Betelhem Shewareged
(74) *Attorney, Agent, or Firm* — Sughrue Mion, PLLC

(57) ABSTRACT

A recording medium containing a substantially colorless compound in which at least 10 atoms having conjugate $\pi$ electrons are present on a per-molecule basis, wherein it is especially preferable that the compound has at least two aromatic ring groups and/or shows no fluorescence. An ink composition used for printing in image form on media, with the composition containing a dye and controlling a hue change caused in the printed images over a period of one hour immediately after the printing to 5 or below in color-difference terms. And a method of recording images on media by printing an ink composition in image form, wherein the ink composition contains a dye and a hue change caused in the printed images over a period of one hour immediately after the printing is controlled to 5 or below in color-difference terms.

11 Claims, No Drawings

RECORDING MEDIUM, INK COMPOSITION AND RECORDING METHOD USING THE SAME

This is a continuation-in-part application of pending International Application No. PCT/JP2005/004391 filed on Mar. 8, 2005, which claims foreign priority of Japanese Patent Application No. 2004-068546 filed Mar. 11, 2004 (JPA '546) and Japanese Patent Application No. 2004-094600 filed Mar. 29, 2004 (JPA '600). The present application claims foreign priority of JPA '546 and JPA '600, and, in addition, claims foreign priority of Japanese Patent Application No. 2004-216913 filed Jul. 26, 2004.

TECHNICAL FIELD

The present invention relates to a recording medium providing for recording of images in liquid ink, such as water-base ink (using a dye or pigment as a coloring material) or oil-base ink, or solid ink which, though solid at room temperature, is liquefied by heat-fusion and used for printing, preferably for ink-jet recording. More specifically, the invention is concerned with a recording medium, preferably an ink-jet recording material, having excellent ozone-proof and light-fast properties and hardly causing a bronzing phenomenon.

The present invention relates to an ink composition capable of providing ink images reduced in short-term ageing and a recording method using such an ink composition and, more particularly, to an ink composition having the aforesaid feature and suitable for use in ink-jet recording and an ink-jet recording method using such an ink composition.

BACKGROUND ART

In recent years, various information-processing systems have been developed as the information technology industry has made rapid strides. Recording methods and recording devices suitable for such information-processing systems have also been developed, and each of them is in practical use.

Of those recording methods, an ink-jet recording method has been widely used not only in offices but also at home because of its advantages that various kinds of materials can be used for recording and the hardware (apparatus) used therein is relatively low in price, compact in size and excellent in quietness.

In addition, with recent improvements in resolution of ink-jet printers it has become possible to obtain records of the so-called photograph-like print quality, and these recent advances of hardware (apparatus) have stimulated the development of various types of ink-jet recording materials.

In general the properties required for recording sheets used in ink-jet recording include properties of being able to ensure (1) rapid drying of ink (sufficient rapidity of ink absorption), (2) ink dots of proper and uniform diameter (no ink bleed), (3) satisfactory graininess, (4) ink dots of high roundness, (5) high color densities, (6) high saturation (no color subsidence), (7) satisfactory imperviousness to water, light and ozone in printed areas, (8) high whiteness in themselves, (9) satisfactory keeping quality in themselves (occurrence of neither yellow coloration even in storage over a prolonged period nor image blur due to long-term storage (ageing-induced blur)), (10) high resistance to deformation and satisfactory dimensional stability (sufficiently loose curling), and (11) satisfactory hard-running performance.

In using photographic high-gloss paper for the purpose of obtaining records of the so-called photograph-like quality, glossiness, surface smoothness and a photographic-paper feeling similar to that of silver salt photograph are required in addition to the aforementioned properties.

For the purpose of improving those various properties, ink-jet recording materials having porous structures in their ink-receiving layers have been developed in recent years, and put to practical use. By having porous structures, these ink-jet recording materials can achieve high ink receptivity (fast-drying property) and high glossiness.

For instance, JP-A-10-119423 and JP-A-10-217601 propose the ink-jet recording materials wherein their individual supports are each provided with an ink-receiving layer having a high porosity by containing a particulate inorganic pigment and a water-soluble resin.

Because of their makeup, those recording materials, notably the ink-jet recording material provided with an ink-receiving layer of porous structure using silica as a particulate inorganic pigment, have excellent ink absorption and high ink-receiving power capable of forming images of high resolution, and can show high glossiness.

On the other hand, when recorded images of high optical densities are formed, it is known that a problem of the so-called bronzing phenomenon comes up, namely a phenomenon in which the dyes in ink crystallize out on the surface of a recording material as the ink dries; as a result, the recorded images reflect light and take on a metallic luster. This phenomenon is more likely to occur when the dye solubility in water is lowered or a hydrogen bond-forming group is introduced into the dye structure with the intention of enhancing water resistance, light resistance or gas resistance. Since reflection and scattering of light is caused by the bronzing phenomenon, the optical densities of images are lowered, and besides, the recorded images come to have hues significantly different from the intended ones or lost their transparency. Therefore, inhibition of the bronzing phenomenon is one of important requirements for ink-jet ink.

Examples of a hitherto known method for inhibition of the bronzing phenomenon include the methods for size control (as disclosed in JP-A-8-108616, JP-A-8-169173, JP-A-8-267908 and JP-A-2001-64893), the method of adding a specified heterocyclic compound (See JP-A-2001-88430), the method of adding a specified amine compound (See JP-A-2000-53765) and the method of adding a specified salt (See JP-A-2000-309156). However, there may be cases wherein the addition of those additives in increased amounts is required because of their insufficient effects in preventing the bronzing phenomenon from occurring, or the addition of those additives causes a storage-stability problem; as a result, the additives cause deteriorations in various properties of a recording medium and in recorded-image quality.

Although the use of additives can produce various effects as mentioned above, it is difficult to use usual additives while keeping various properties. For instance, when an image-receiving paper is designed to enhance weather resistance of recorded images through acceleration of dye association, the addition of an additive capable of loosening the dye association with the intention of preventing the occurrence of the bronzing phenomenon seriously impairs the keeping quality of recorded images even though it yields an improvement in the bronzing phenomenon. So it is understandable that there are difficulties in choosing amounts and kinds of additives to be added in such a case as to require a consideration of dye-associated conditions in particular. When ionic additives are used, on the other hand, it is required to take account of the influences of counter ions. Therefore, it has been desired to develop molecular designs of additives on the basis of a new concept and to introduce a method of inhibiting in a substantial sense the bronzing phenomenon by use of the additives developed.

Included among inkjet recording methods are a method of jetting liquid droplets under pressure applied thereto by an piezoelectric element, a method of jetting liquid droplets by thermally evolving bubbles in ink, a method of utilizing ultrasonic waves or a method of sucking and jetting liquid droplets by electrostatic force. As ink compositions for these inkjet recording methods, water-base ink, oil-base ink and solid (heat-fusion type) ink are usable. Of these ink varieties, water-base ink is the mainstream of inkjet recording ink from the viewpoints of production, handling, odor and safety.

Coloring materials used in ink compositions for inkjet recording are required to have a wide variety of properties including high solubility in solvents, high possibility for high-density recording, good hues, high fastness to light, heat, air, water and chemicals, firm fixation to image-receiving materials and resistance to spreading, excellent keeping quality in ink form, no toxicity, high purity and availability at low prices. However, it is extremely difficult to pursue coloring agents capable of satisfying those requirements at high levels.

Although various dyes and pigments were already proposed as coloring materials for inkjet recording and used practically, coloring materials meeting all the requirements are not found yet as matters now stand. And it is difficult to achieve both hue and fastness at the levels required for inkjet recording ink by use of well-known dyes and pigments to which color index (C.I.) numbers are assigned.

As dyes capable of enhancing fastness, JP-A-55-161856 proposes the azo dyes derived from aromatic amines and 5-membered heterocyclic amines. However, these dyes have undesirable hues in the yellow and cyan regions, so they have a problem of aggravating color reproduction.

JP-A-61-36362 and JP-A-2-212566 disclose the ink compositions for use in inkjet recording with the invention of achieving both hue and light fastness. However, the dyes adopted in each reference are insufficient in water solubility for use in water-base ink. In addition, when the dyes described in each reference are used in water-base ink for inkjet recording, the resulting ink has a problem with fastness to moisture and heat.

As means for solving those problems, the compounds and the ink composition described in JP-T-11-504958 (the term "JP-T" as used herein means a published Japanese translation of a PCT patent application) are proposed. For further improvements in hue and light fastness, the use of a pyrazolylanilineazo dye in the ink composition for inkjet recording is described in JP-A-2003-231850. However, those ink compositions for inkjet recording are insufficient in color reproduction and fastness of output images.

Images recorded with inkjet printers are generally stored in a state that the dyes constituting the images are unprotected, so their keeping quality is a disadvantage of them, in contrast to those recorded in photographic materials. Further, increasing an image recording speed in inkjet recording is generally performed by using a porous image-receiving material with the intention of enhancing ink absorbency. However, the use of a porous material has problems of lowering the glossiness and aggravating the fastness. Furthermore, it has turned out that the inkjet recording system using a porous image-receiving material has problems that a great hue change occurs immediately after printing and it takes a long time to completely stabilize the printed images.

DISCLOSURE OF THE INVENTION

An first object of the invention is to provide a recording medium capable of forming images free of the bronzing phenomenon while keeping various excellent properties, including high density of printed images, excellent hue and high resistances to light, gas and water.

The foregoing first object of the invention is achieved by first invention described below:

[1] A recording medium comprising a compound in which at least 10 atoms having conjugate π electrons are present on a per-molecule basis.

[2] A recording medium as described in [1], wherein the compound has at least two aromatic ring groups.

[3] A recording medium as described in [1] or [2], wherein the compound shows no fluorescence and has a longest-wavelength-side absorption peak λmax at a wavelength of 350 nm or shorter and a molar absorption constant of 10,000 or below at any of wavelengths within a visible spectral region of 400 to 700 nm.

[4] A recording medium as described in any of [1] to [3], wherein the compound further contains a solubilizing group.

[5] A recording medium as described in any of [1] to [4], which has an ink-receiving layer provided on a support.

[6] A recording medium as described in [5], which comprises the compound in the ink-receiving layer.

[7] A recording medium as described in [6], wherein the ink-receiving layer further comprises a water-soluble resin.

[8] A recording medium as described in [7], wherein the water-soluble resin is at least one resin selected from polyvinyl alcohol resins, cellulose resins, ether linkage-containing resins, carbamoyl group-containing resins, carboxyl group-containing resins or gelatins.

[9] A recording medium as described in [6] or [7], wherein the ink-receiving layer further contains a cross-linking agent capable of forming cross-links between molecules of the water-soluble resin.

[10] A recording medium as described in any of [5] to [9], wherein the ink-receiving layer further comprises a particulate substance.

[11] A recording medium as described in [10], wherein the particulate substance is at least one substance selected from particulate silica, colloidal silica, particulate alumina or pseudo boehmite.

[12] A recording medium as described in any of [5] to [11], wherein the ink-receiving layer further comprises a mordant.

[13] A recording medium as described in any of [5] to [12], wherein the ink-receiving layer further comprises a compound having at least two species of di- or higher-valent metal atoms per molecule.

[14] A recording medium as described in any of [1] to [13], which is an ink-jet recording material.

[15] A method of producing a recording medium as described in any of [1] to [14], the method comprising forming a coating layer as an ink-receiving layer by: applying a coating solution containing at least a particulate substance and a water-soluble resin; and curing the applied coating solution by formation of cross-links, wherein the curing by formation of cross-links is carried out by: adding a cross-linking agent to at least one of the coating solution and a basic solution of pH 7.1 or higher; and applying the basic solution to the coating layer (1) simultaneously with formation of the coating layer by applying the coating solution or (2) during drying of the coating layer formed by applying the coating solution and before the coating layer shows drying shrinkage.

The second object of the invention is to solve are to provide an ink composition capable of forming images brought into a stable state immediately after printing and ensuring reduction in image change by short-term ageing and to provide a recording method using such an ink composition, particularly preferably to provide an ink composition having the foregoing capabilities and suitability for inkjet recording and to provide an inkjet recording method using such an ink composition.

The foregoing second object of the invention is achieved by second invention described below:

[16] An ink composition used for printing in image form on media, wherein the ink composition comprises a dye and controls a hue change to 5 or below in color-difference terms, the hue change being caused in a printed image over a period of one hour immediately after the printing.

[17] An ink composition as described in [16], wherein the dye is an anionically dissociative water-soluble dye.

[18] An ink composition as described in [16] or [17], wherein the dye is an anionically dissociative water-soluble dye and further contains a proton-dissociating group in a structural part responsible for producing dye's color.

[19] An ink composition as described in any of [16] to [18], wherein the dye contains a proton-dissociating group and the media has a film surface pH equivalent to or greater than a pKa of the dye.

[20] An ink composition as described in any of [16] to [19], which is a composition for ink-jet recording.

[21] A method of recording images on media by printing an ink composition in image form, wherein the ink composition comprises a dye and a hue change is controlled to 5 or below in color-difference terms, the hue change being caused in the printed image over a period of one hour immediately after the printing.

[22] A method of recording images as described in [21], wherein the dye is an anionically dissociative water-soluble dye.

[23] A method of recording images as described in [21] or [22], wherein the dye is an anionically dissociative water-soluble dye and further contains a proton-dissociating group in a structural part responsible for producing dye's color.

[24] A method of recording images as described in any of [21] to [23], wherein the dye contains a proton-dissociating group and the media has a film surface pH equivalent to or greater than a pKa of the dye.

[25] A method of recording images as described in any of [21] to [24], wherein the ink composition is for ink-jet recording.

[26] A method of recording images as described in any of [21] to [25], which is a method designed for ink-jet recording.

BEST MODE FOR CARRYING OUT THE INVENTION

An ink-jet recording material according to the invention is distinguished by formation of high-density images causing no bronzing phenomenon with various excellent properties including excellent hue and high resistances to light, gases and water.

The first invention is illustrated below in detail.
(Compounds Having at Least 10 Conjugate π ELECTRONs on Per-molecule Basis)

In the first place, compounds having 10 or more conjugate π electrons on a per-molecule basis are described.

As the number of π-electrons constituting a conjugated π-electron system is increased and the π-electron system is extended, there is a higher probability of causing absorption of light in the visible region. From the viewpoint of color reproduction of images, it is appropriate that the compounds characterizing the invention be colorless. The term "colorless compound" as used in the invention is intended to include compounds in a state that they are only slightly colored to the extent of having no adverse influences on image quality. In addition, the compounds may show fluorescence. However, the compounds showing no fluorescence are preferable in the invention, and the compounds preferred by far are compounds having a longest-wavelength-side absorption peak λmax at a wavelength of 350 nm or shorter, preferably 320 nm or shorter, and a molar absorption constant of 10,000 or below at any of wavelengths within a visible spectral region of 400 to 700 nm.

The compounds according to the invention have 10 or more conjugate π electrons on a per-molecule basis. The number of π electrons has no particular upper limit, but it is preferably 80 or below, far preferably 50 or below, particularly preferably 30 or below. And 10 or more conjugate π electrons may form one big conjugated system, or may form two or more conjugated systems. The compounds especially preferred in the invention are compounds having at least two aromatic ring groups on a per-molecule basis. The term "aromatic ring group" used in the invention includes groups referred to as aromatic ring groups in a broad sense, and it may be an aryl group, an aromatic heterocyclic group containing hetero atoms or an aromatic ring group into which rings are formed by ring fusion. Examples of such an aromatic ring group include a benzene ring group, a naphthalene ring group, an anthracene ring group, a pyridine ring group, a pyrimidine ring group, a piperazine ring group and a triazine ring group.

It is especially advantageous that the compounds according to the invention have at least two solubilizing groups on a per-molecule basis. Examples of a useful solubilizing group include a sulfo group, a carboxyl group, a hydroxyl group, a phosphono group, a carbonamido group, a sulfonamido group, a quaternary ammonium salt and other groups well-known to persons skilled in the art, but the solubilizing groups the compounds can have are not limited to the groups recited above. Of those groups, more favorable groups are a sulfo group and a carboxyl group and the most favorable one is a sulfo group.

Although a maximum number of solubilizing groups in one molecule depends solely on the number of positions available to substituents, the presence of same or different 10 solubilizing groups in one molecule will suffice for practical purposes. The counter cations of those solubilizing groups have no particular restriction, but examples thereof include alkali metal ions, ammonium ion and organic cations (e.g., tetramethyl ammonium cation, guanidinium cation, pyridinium cation). As to these cations, favorable ones are alkali metal ions and ammonium ion and more favorable ones are lithium ion, sodium ion and ammonium ion, and most favorable ones are lithium ion and ammonium ion.

Examples of compounds according to the invention include the compounds described in JP-A-63-55544, JP-A-3-146947, JP-A-3-149543, JP-A-2001-201831, JP-A-2002-139822, JP-A-2002-196460, JP-A-2002-244257, JP-A-2002-244259, JP-A-2002-296743, JP-A-2002-296744 and JP-A-2003-307823.

Of those compounds, compounds represented by the following formula (1) are used to advantage:

A-X-L-(Y-)n                    (1)

In formula (1), A, L and B each represent an aromatic group (an aryl group or an aromatic heterocyclic group). X and Y each represent a divalent linkage group. n represents 0 or 1. Herein, the aromatic group may be a single ring or a condensed ring, and the divalent linkage group is an alkylene group, an alkenylene group, —CO—, —SOn— (n=0, 1 or 2), —NR—(wherein R represents a hydrogen atom, an alkyl group, an aryl group or a heterocyclic group), —O— or a divalent group formed by combining two or more of the linkage groups recited above. However, the compound represented by formula (1) is required to have at least one ionic hydrophilic group selected from a sulfo group, a carboxyl group, a phenolic hydroxyl group or a phosphono group. These ionic hydrohilic groups may take salt forms, and have no particular restrictions as to their counter ions. Examples of such counter ions include alkali metal ions, ammonium ion and organic cations (such as tetramethyl ammonium, guanidinium and pyridinium cations). Of these cations, favorable ones are alkali metal ions and ammonium ion, especially lithium ion, sodium ion and ammonium ion, and the most favorable ones are lithium ion and ammonium ion.

The compounds represented by formula (1) may have substituents other than ionic hydrophilic groups. Examples of such substituents include alkyl groups, aryl groups, aralkyl groups, heterocyclic groups, alkoxy groups, aryloxy groups, a hydroxyl group, amino groups (including anilino and heterocyclylamino groups), acyl groups, acylamino groups, ureido groups, halogen atoms, sulfamoyl groups, carbamoyl groups, sulfonamido groups, sulfonyl groups, sulfenyl groups and sulfinyl groups. These groups may further have substituents. Of the compounds represented by formula (1), the compounds meeting the condition of n=1 are advantageous over the others. In addition, it is preferable that at least one of the aromatic groups A, L and B is an aromatic heterocyclic group. Further, the compounds containing 2 to 4 ionic hydrophilic groups on a per-molecule basis are preferred.

Although the mechanism of bronzing phenomenon inhibition is not clarified yet, it can be thought that the compounds according to the invention act as an agent for dissolving cohesion (a cohesion-dissolving agent) by exerting their stronger π-electron interactions on dyes forming cohesion (association) through the π-electron interaction between dye molecules, with the result that an improvement in bronzing phenomenon can be obtained. When a cohesion-dissolving agent intrudes itself between dye molecules in a state of cohesion or exert its strong π-electron interaction on dye molecules present at the surface of dye aggregates, it is important that the agent has a planar structure and a widely spread π-electron system. In addition, it is also important that the cohesion-dissolving agent has sufficient solubility for the agent itself or a complex formed of the agent and dyes to escape from deposition. Since the dyes used in ink-jet ink, typified by direct dyes, have widely spread planar structures with the intention of enhancing their fixing capabilities although the required number of π-electrons varies by the sizes of dyes in ink-jet ink used, it is supposed that the cohesion-dissolving agent is required to be a colorless compound having a stretch of conjugated system made up of 10 or more πelectrons on a per-molecule basis.

Examples of compounds suitable for use in the invention include the compounds. described in the documents cited above, specifically JP-A-2002-139822, JP-A-2002-196460, JP-A-2002-244257, JP-A-2002-244259, JP-A-2002-296743, JP-A-2002-296744 and JP-A-2003-307823. Representatives of these compounds (cohesion-dissolving agents) are illustrated below:

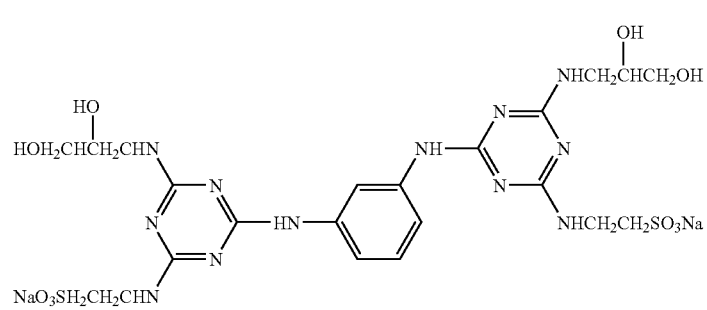

P-1

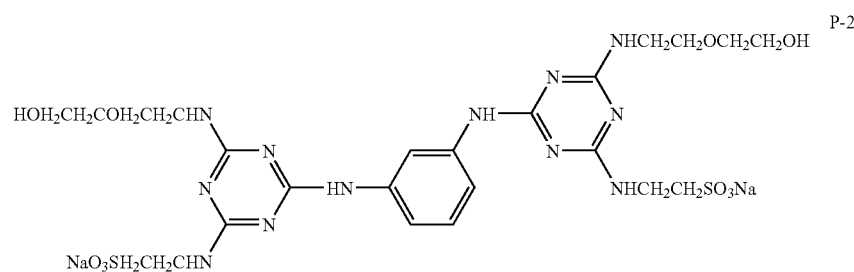

P-2

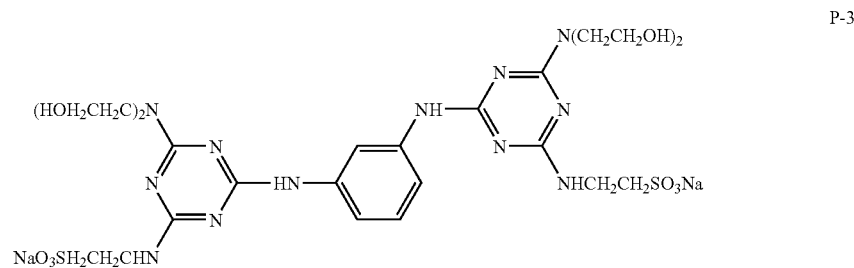

P-3

-continued
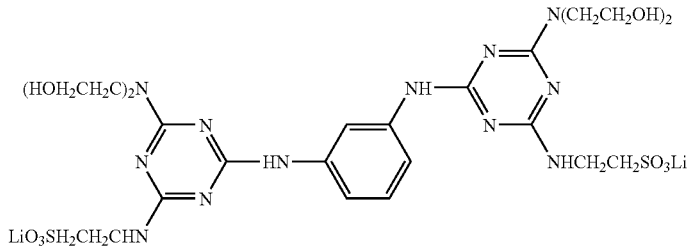
P-4
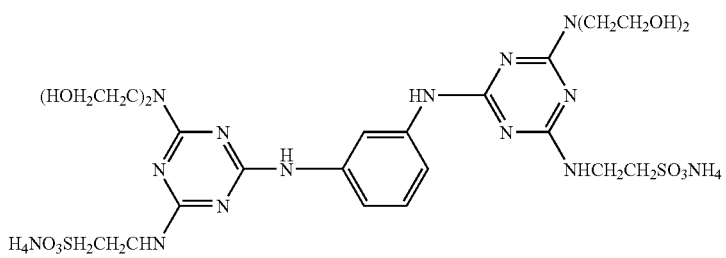
P-5
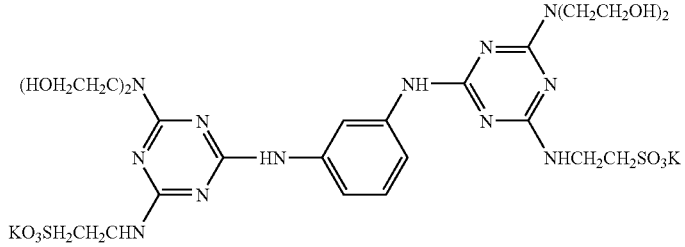
P-6
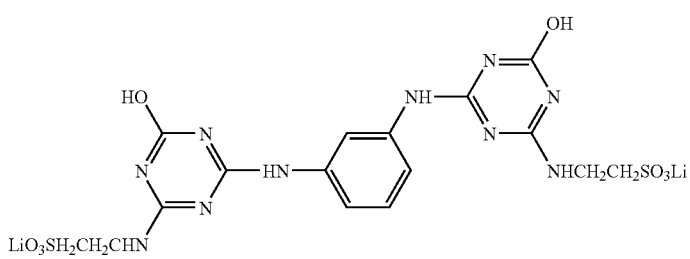
P-7
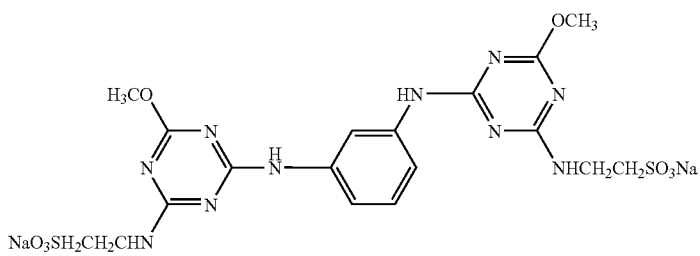
P-8
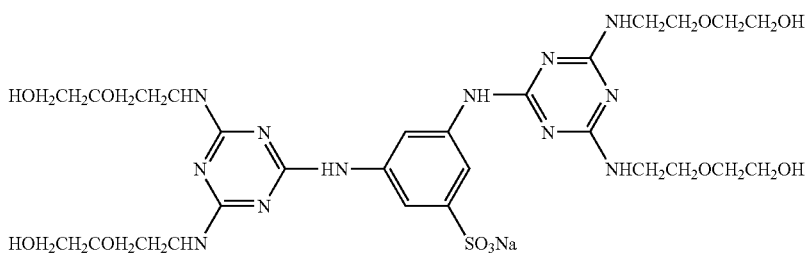
P-9

-continued
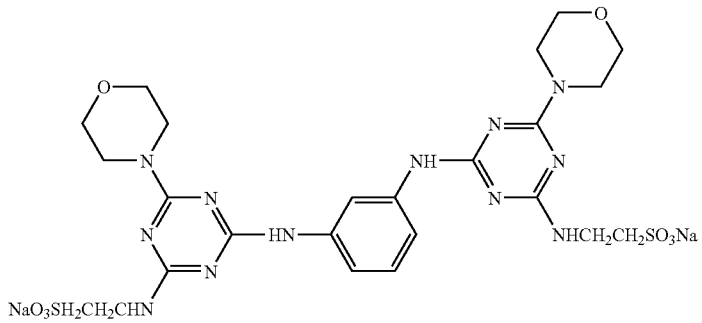
P-10
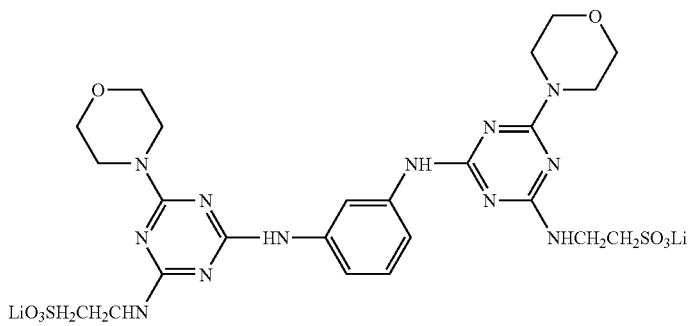
P-11
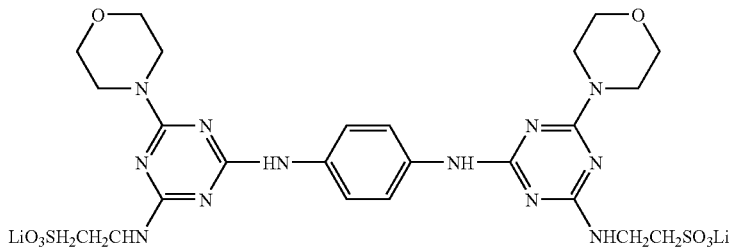
P-12
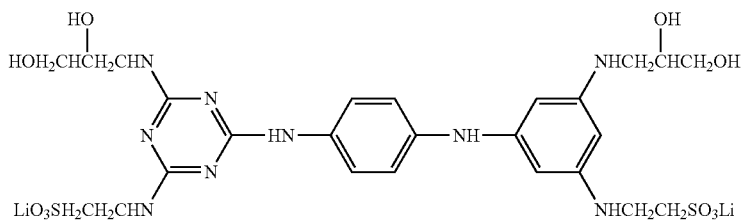
P-13
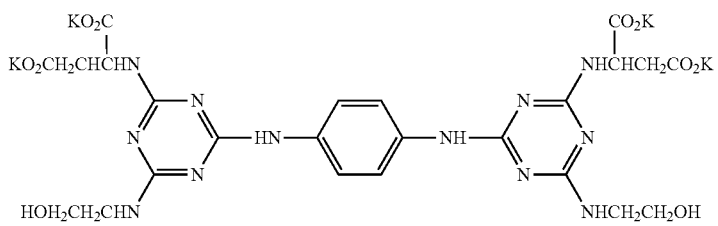
P-14
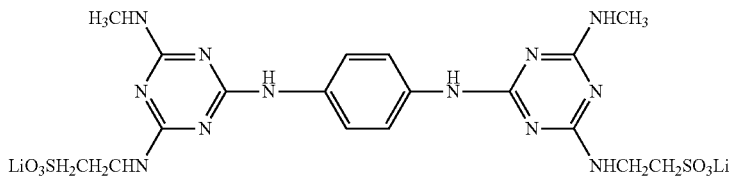
P-15

-continued
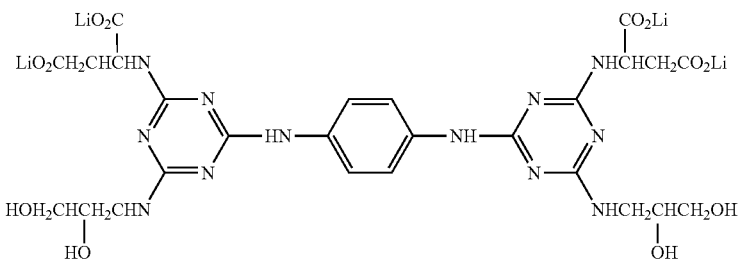
P-16
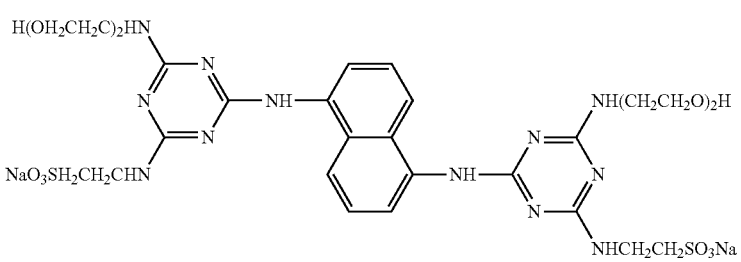
P-17
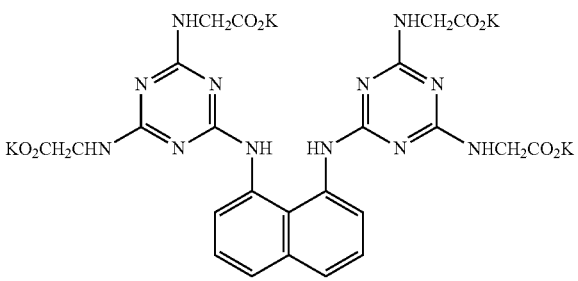
P-18
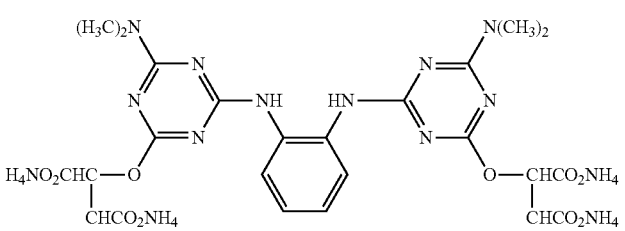
P-19
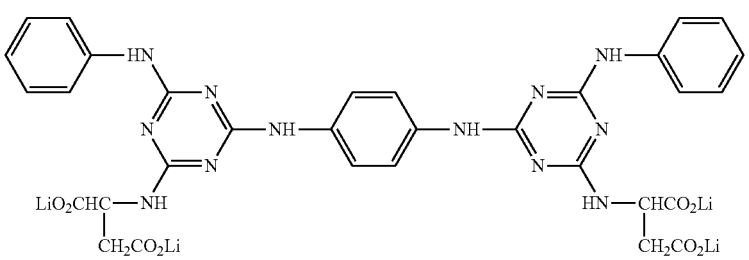
P-20
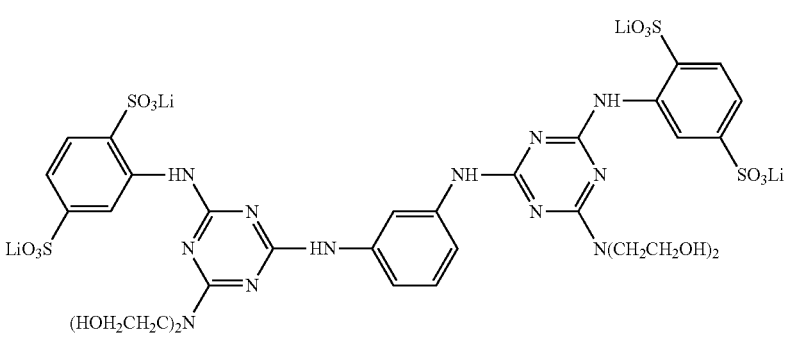
P-21

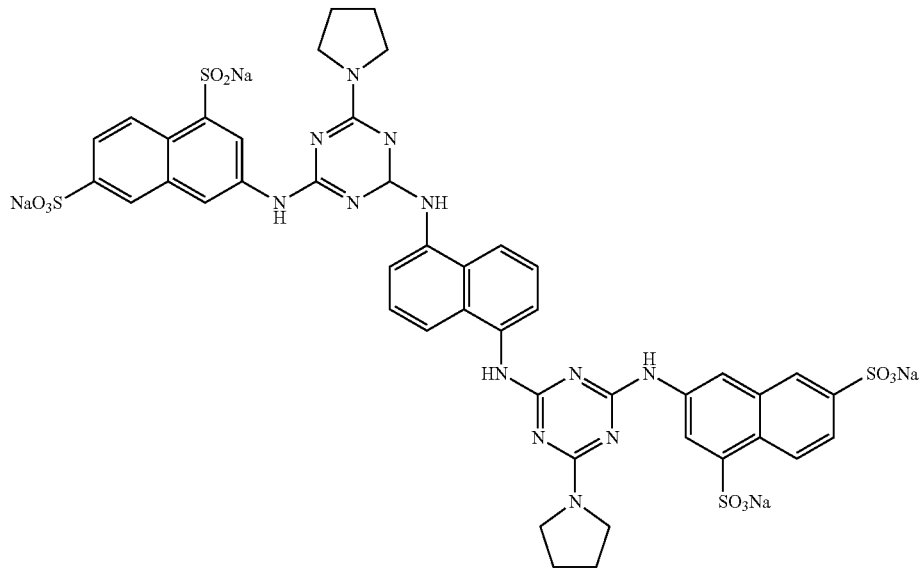
P-22
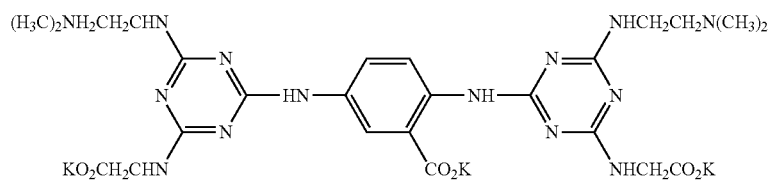
P-23
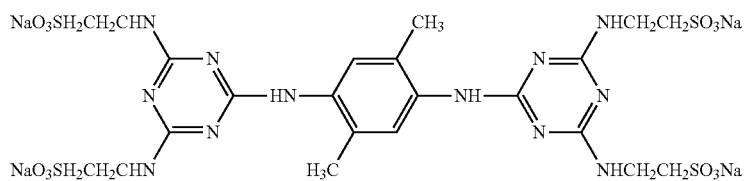
P-24
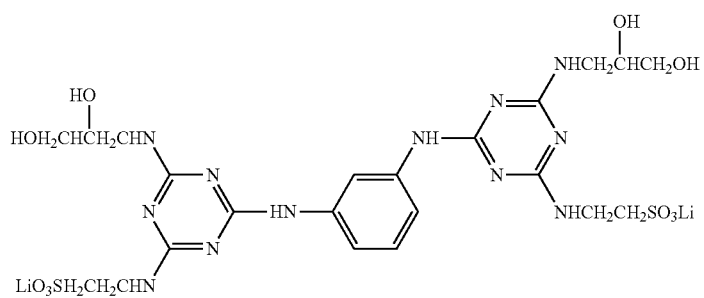
P-25
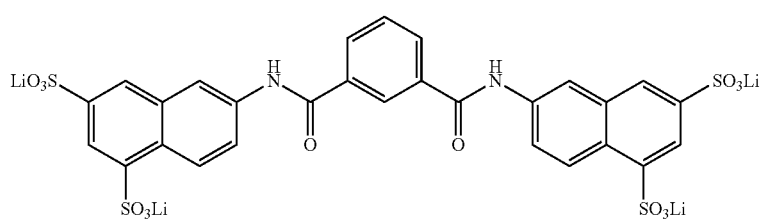
P-26

-continued
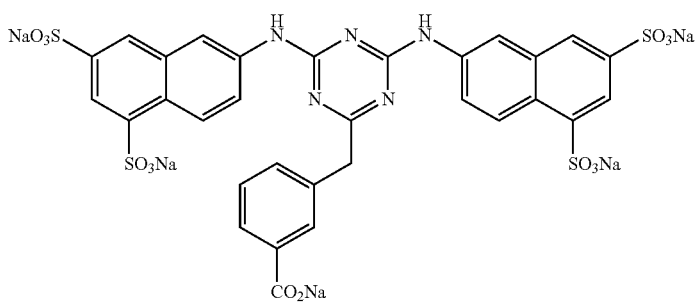
P-27
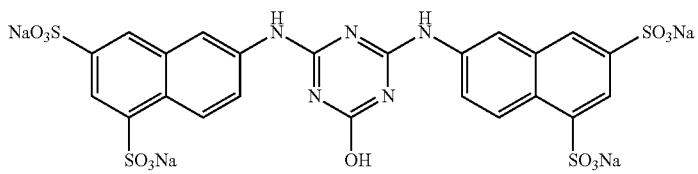
P-28
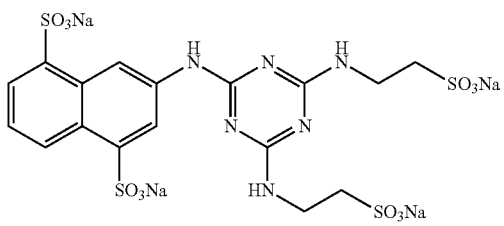
P-29
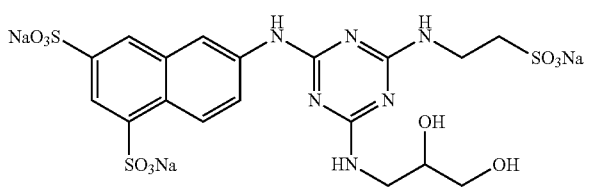
P-30
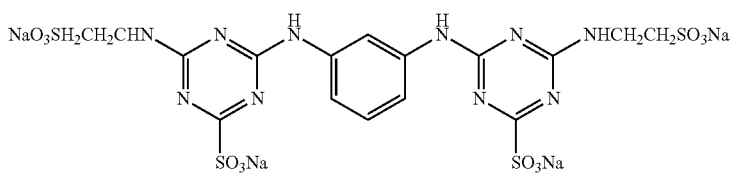
P-31
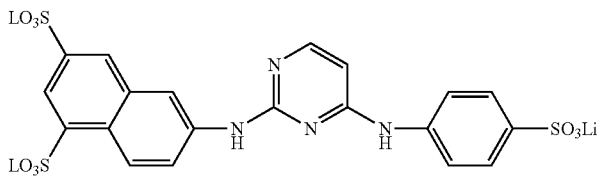
P-32
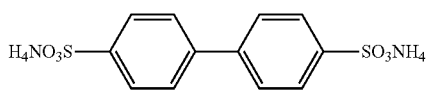
P-33
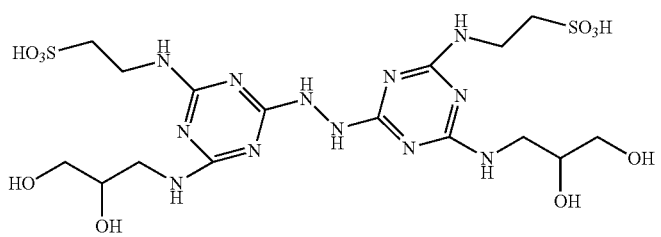
P-34

-continued

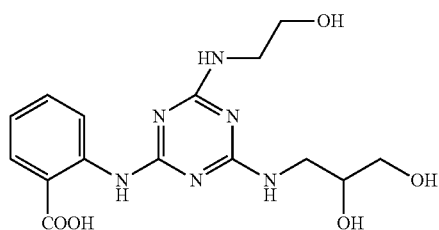

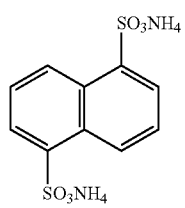

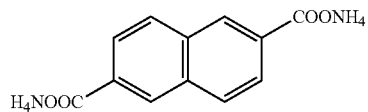

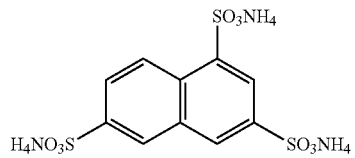

Incidentally, the expression "number of atoms having conjugate π electrons on a per-molecule basis" as used in the invention refers to the number of atoms sharing, regardless of sharing degree, a group of π electrons constituting a conjugated-bond structure capable of assuming an arbitrary conjugated system. Therefore, the number of conjugate electrons corresponds with the number of the atoms defined above. More specifically, taking Compounds P-1 to P-38 illustrated above as examples, the number of atoms having conjugate π electrons on a per-molecule basis is a value as shown in Table 1-1.

TABLE 1-1

Number of atoms having conjugate π electrons with respect to compounds P-1 to P-38

| Compound | Number of atoms having conjugate π electrons |
|---|---|
| P-1 | 18 |
| P-2 | 18 |
| P-3 | 18 |
| P-4 | 18 |
| P-5 | 18 |
| P-6 | 18 |
| P-7 | 18 |
| P-8 | 18 |
| P-9 | 18 |
| P-10 | 18 |
| P-11 | 18 |
| P-12 | 18 |
| P-13 | 18 |
| P-14 | 18 |
| P-15 | 18 |
| P-16 | 18 |
| P-17 | 22 |
| P-18 | 22 |

TABLE 1-1-continued

Number of atoms having conjugate π electrons with respect to compounds P-1 to P-38

| Compound | Number of atoms having conjugate π electrons |
|---|---|
| P-19 | 18 |
| P-20 | 30 |
| P-21 | 30 |
| P-22 | 42 |
| P-23 | 18 |
| P-24 | 18 |
| P-25 | 18 |
| P-26 | 26 |
| P-27 | 32 |
| P-28 | 26 |
| P-29 | 16 |
| P-30 | 16 |
| P-31 | 18 |
| P-32 | 22 |
| P-33 | 12 |
| P-34 | 12 |
| P-35 | 12 |
| P-36 | 10 |
| P-37 | 10 |
| P-38 | 10 |

In the present recording medium, it is appropriate that the compounds having conjugate π electrons be used in a content of 0.01 to 20 mass %, preferably 0.1 to 10 mass %, based on the total solids in an ink-receiving layer. Additionally, the conjugated π-electron compounds may be used independently, or two or more of them may be used in combination.

The compounds used to advantage in the invention can be easily synthesized by reference to the above-cited documents including JP-A-2002-139822.

(Water-soluble Resins)

In a preferred mode of an ink-jet recording material according to the invention, the ink-receiving layer contains a water-soluble resin in conjunction with a conjugated π-electron compound.

Examples of such a water-soluble resin include resins having hydroxyl groups as hydrophilic structural units, such as polyvinyl alcohol resins [e.g., polyvinyl alcohol (PVA), acetoacetyl-modified polyvinyl alcohol, cation-modified polyvinyl alcohol, anion-modified polyvinyl alcohol, silanol-modified polyvinyl alcohol, polyvinyl acetal], cellulose resins [e.g., methyl cellulose (MC), ethyl cellulose (EC), hydroxyethyl cellulose (HEC), carboxymethyl cellulose (CMC), hydroxypropyl cellulose (HPC), hydroxyethylmethyl cellulose, hydroxypropylmethyl cellulose], chitins, chitosans and starch; resins having ether linkages [e.g., polyethylene oxide (PEO), polypropylene oxide (PPO), polyethylene glycol (PEG), polyvinyl ether (PVE)]; and resins having carbamoyl groups [e.g., polyacrylamide (PAAM), polyvinyl pyrrolidone (PVP), polyacrylic acid hydrazide].

In addition, resins containing carboxyl groups as dissociative groups, such as polyacrylic acid salts, maleic acid resins, alginic acid salts and gelatin, are also included in water-soluble resins usable in the invention.

Of those resins, at least one resin selected from polyvinyl alcohol resins, cellulose resins, resins having ether linkages, resins having carbamoyl groups, resins having carboxyl groups or gelatins, especially polyvinyl alcohol (PVA) resins, is suitable as the water-soluble resin used in the invention.

Examples of polyvinyl alcohol resins used to advantage in the invention include the resins described in JP-B-4-52786, JP-B-5-67432, JP-B-7-29479, Japanese Patent No. 2537827, JP-B-7-57553, Japanese Patent Nos. 2502998 and 3053231; JP-A-63-176173Japanese Patent No. 2604367, JP-A-7-276787, JP-A-9-207425; JP-A-11-58941, JP-A-2000-135858, JP-A-2001-205924, JP-A-2001-287444, JP-A-62-278080, JP-A-9-39373, Japanese Patent No. 2750433, JP-A-2000-158801, JP-A-2001-213045, JP-A-2001-328345, JP-A-8-324105, JP-A-11-348417, JP-A-58-181687, JP-A-10-259213, JP-A-2001-72711, JP-A-2002-103805, JP-A-2000-63427, JP-A-2002-308928, JP-A-2001-205919 and JP-A-2002-264489.

Examples of water-soluble resins other than polyvinyl alcohol resins include the compounds described in JP-A-11-165461, paragraphs [0011] to [0012], the compounds described in JP-A-2001-205919, and the compounds described in JP-A-2002-264489.

These water-soluble resins may be used independently, or two or more of them may be used in combination. The suitable water-soluble resin content in the present recording medium is from 9 to 40 mass %, preferably from 12 to 33 mass %, based on the total solids of an ink-receiving layer.

(Fine Particles)

In a preferred mode of ink-jet recording material according to the invention, the ink-receiving layer contains fine particles, especially a combination of fine particles with the water-soluble resin as recited above, in conjunction with a compound containing at least two different kinds of di- or higher-valent metals as described hereinafter.

The ink-receiving layer can have a porous structure by containing fine particles, and thereby its ink absorbency is improved. Special cases where the solid content of the fine particles in the ink-receiving layer is greater than 50 mass %, preferably 60 mass %, are advantageous because they enable formation of more satisfactory porous structures and production of ink-jet recording materials having sufficient ink absorbency. The expression "solid content of fine particles in the ink-receiving layer" as used herein refers to the content calculated on a basis of ingredients other than water in a composition forming the ink-receiving layer.

The fine particles used in the invention may be any of organic and inorganic ones, but it is preferable for the present medium to contain inorganic fine particles from the viewpoints of ink absorbency and image stability.

Suitable examples of organic fine particles include particulate polymers prepared by emulsion polymerization, microemulsion polymerization, soap-free polymerization, seed polymerization, dispersion polymerization or suspension polymerization, such as powdery, latex-state or emulsion-state particulate polyethylene, polypropylene, polystyrene, polyacrylate, polyamide, silicone resin, phenol resin and naturally-occurring polymers.

The suitable average size of organic fine particles is 10 μm or below, preferably from 0.2 to 5 μm.

Examples of inorganic fine particles include particulate silica, colloidal silica, titanium dioxide, barium sulfate, calcium silicate, zeolite, kaolinite, halloysite, mica, talc, calcium carbonate, magnesium carbonate, calcium sulfate, pseudoboehmite, zinc oxide, zinc hydroxide, alumina, aluminum silicate, magnesium silicate, zirconium oxide, zirconium hydroxide, cerium oxide, lanthanum oxide and yttrium oxide. Of these inorganic fine particles, particulate silica colloidal silica, particulate alumina and pseudoboehmite are preferred over the others from the viewpoint of forming satisfactory porous structures. These fine particles may be used as they are primary particles, or in a state that they form into secondary particles. The suitable average primary-particle size of those fine particles is 2 μm or below, preferably 200 nm or below.

More specifically, particulate silica having an average primary-particle size of 30 nm or below, colloidal silica having an average primary-particle size of 30 nm or below, particulate alumina having an average primary-particle size of 20 nm or below and pseudoboehmite having an average pore diameter of 2 to 15 nm are preferable by far. And particulate silica, particulate alumina and pseudoboehmite in particular are used to advantage.

The particulate silica is broadly classified as wet-process particles or dry-process (vapor-phase process) particles according to the method used for preparation thereof. The mainstream of the wet process is a method of preparing hydrated silica by producing activated silica through acidolysis of silicates and then by moderately polymerizing the activated silica to cause aggregation and deposition. On the other hand, the mainstream of the vapor-phase process is a method of preparing anhydrous silica by hydrolyzing silicon halide in a high-temperature vapor phase (flame hydrolysis method), or by heating silica sand and coke with arc in an electric furnace to cause reduction and vaporization and then oxidizing the reduced vapor with air (arc method). The term "vapor-phase process silica" as used herein refers to the fine particles of anhydrous silica prepared by the vapor-phase process. And the vapor-phase process silica in particular is suitable as particulate silica used in the invention.

The vapor-phase process silica differs from the hydrated silica in density of silanol groups at the surface and whether holes are present therein or not, and shows properties different from those of the hydrated silica. Thus the vapor-phase process silica is suitable for formation of a three-dimensional structure with a high porosity. Although reasons for such suitability are not clear, it can be assumed that the hydrated silica has a high silanol-group density of from 5 to 8 per $nm^2$ at the fine-particle surface and tends to agglutinate densely (to form aggregates), but on the other hand, the vapor-phase process silica has a low silanol-group density of from 2 to 3 per nm² at the fine-particle surface, and forms loose and soft agglutinates (flocculates) to result in formation of a high-porosity structure.

The vapor-phase process silica has an especially great specific surface area, so it has high ink absorbency and high ink-holding efficiency. In addition, since it has a low refractive index, the vapor-phase process silica has an advantage that it can impart transparency to the receiving layer as far as it is dispersed to an appropriate particle size and can deliver high color density and satisfactory color generation. The transparency of the receiving layer is of importance to not only the use requiring transparency, such as OHIP use, but also obtaining high color density and good color-generation-induced gloss even when the receiving layer is applied to a recording medium, such as glossy photo paper.

The suitable average primary-particle size of the vapor-phase process silica is 30 nm or below, preferably 20 nm or below, far preferably 10 or below, particularly preferably from 3 to 10 nm. The vapor-phase process silica is apt to cause adhesion between particles through hydrogen-bond formation between silanol groups, so it can form a high-porosity structure when it has an average primary-particle size of 30 nm or below, with the result that the ink absorption characteristic can be improved effectively.

In addition, the particulate silica may be used in combination with the other fine particles as recited above. When the vapor-phase process silica and other fine particles are used in combination, the suitable content of the vapor-phase process silica in the total fine particles is at least 30 mass %, preferably at least 50 mass %.

As to the inorganic fine particles, particulate alumina, alumina hydrate and a mixture or composite thereof are also used to advantage in the invention. Of these substances, alumina hydrate, especially pseudoboehmite ($Al_2O_3 \cdot nH_2O$), is preferable because it can absorb ink well and fix it. The alumina hydrate can be used in various forms, but it is preferable to use sol-state boehmite as a raw material because it makes formation of a smooth layer easy.

To mention a pore structure of pseudoboelnite, the suitable average pore radius is from 1 to 30 nm, preferably from 2 to 15 nm, and the suitable pore volume is from 0.3 to 2.0ml/g, preferably from 0.5 to 1.5 ml/g. Herein, the values of pore radius and pore volume are determined by a nitrogen absorption-and-desorption method. Specifically, these values can be measured with a gas absorption-and-desorption analyzer (e.g., Omnisorp 369, trade name, made by Coulter, Inc.).

As to the particulate alumina, on the other hand, particulate alumina prepared in a vapor-phase process is preferable because of its great specific surface area. The suitable average primary-particle size of vapor-phase process alumina is 30 nm or below, preferably 20 nm or below.

The fine particles as mentioned above can be used in an ink-jet recording material, if desired, in the modes disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777 and JP-A-2001-301314.

The water-soluble resin and the fine particles as main constituents of the ink-receiving layer according to the invention may be single materials, or they each may be used in the form of a mixture of two or more materials.

Further, what kind of a water-soluble resin is used in combination with fine particles, especially particulate silica, becomes important from the viewpoint of keeping transparency. When the vapor-phase process silica is used, polyvinyl alcohol resins are suitable as the water-soluble resin. Of these resins, polyvinyl alcohol resins whose saponification degrees are in the range of 70 to 100%, particularly in the range of 80 to 99.5%, are preferred over the others.

The polyvinyl alcohol resins have hydroxyl groups in their structural units, and these hydroxyl groups form hydrogen bonds to silanol groups present on the particulate silica surface. Therefore, the polyvinyl alcohol resins tend to form three-dimensional reticular structures having secondary particles of particulate silica as reticulate chain units. Formation of such a three dimensional reticular structure is thought to result in formation of an ink receiving layer having a porous structure high in porosity and sufficient in strength.

When ink-jet recording is carried out, the porous ink-receiving layer formed in the foregoing manner can quickly absorbs ink by capillary action, and form dots having good roundness without causing ink breed.

Additionally, the polyvinyl alcohol resins may be used in combination with other water-soluble resins as recited above. When the water-soluble resins and the polyvinyl alcohol resins are used in combination, the content of the polyvinyl alcohol resins in the total water-soluble resins used is preferably at least 50% by mass, and far preferably at least 70% by mass.

(Content Ratio of Fine Particles to Water-soluble Resins)

The content ratio of fine particles (x) to water-soluble resins (y) [abbreviated as PB ratio (x:y)] in terms of mass has also a significant influence upon the film structure and film strength of the ink-receiving layer. Specifically, as the content ratio [PB ratio] in terms of mass is increased, the ink-receiving layer has a tendency to decrease in density and strength though it increases in porosity, pore volume and surface area (per unit mass).

In the ink-receiving layer according to the invention, it is appropriate that the content ratio [PB ratio (x:y)] in terms of mass be in the range of 1.5:1 to 10:1 from the viewpoint of preventing a drop in film strength and cracking upon drying, which are caused by too great a PB ratio, as well as the viewpoint of preventing reduction in ink absorbency which occurs as a result that too small a PB ratio makes it easy for the resin to stop up pores and thereby lowers the porosity.

Since it happens that stress is applied to a recording medium when the medium is passing through the feed system of an ink-jet printer, the ink-receiving layer is required to have sufficient film strength. The attainment of sufficient film strength is also required from the viewpoint of preventing the ink-receiving layer from producing cracks and coming off when the recording medium receives cutwork into sheets. In view of these cases, it is preferable that the mass ratio (x:y) is 5:1 or below. On the other hand, the mass ratio is preferably 2:1 or above from the viewpoint of ensuring high-speed ink absorption when the recording medium is used in an ink-jet printer.

For instance, when a coating solution is prepared by thoroughly dispersing vapor-phase particulate silica having an average primary particle size of 20 nm or below and a water-soluble resin into an aqueous solution at a mass ratio (x:y) of 2:1 to 5: 1, coated on a support and then dried, a three-dimensional reticular structure having secondary particles of particulate silica as reticule chains can be formed, and thereby a transparent porous film having an average pore diameter of 30 nm or below, a porosity of 50 to 80%, a specific pore volume of 0.5 ml/g or above and a specific surface area of 100 m²/g or above can be formed with ease.

(Cross-linking Agent)

The ink-receiving layer of an ink-jet recording material according to the invention is preferably in a mode that the coating layer containing the foregoing water-soluble resin, especially in combination with the foregoing fine particles, further contains a cross-linking agent capable of forming cross-links between molecules of the water-soluble resin and is cured by undergoing cross-linking reaction between the cross-linking agent and the water-soluble resin to be rendered more porous.

For cross-linking the water-soluble resins, notably polyvinyl alcohol, boron compounds are suitable. Examples of a boron compound usable for such a purpose include borax, boric acid and borates (e.g., orthoborates, $InBO_3$, $ScBO_3$, $YBO_3$, $LaBO_3$, $Mg_3(BO_3)_2$, $Co_3(BO_3)_2$, diborates (such as $Mg_2B_2O_5$ and $Co_2B_2O_5$), metaborates (such as $LiB_2$, $Ca(BO_2)_2$, $NaBO_2$ and $KBO_2$), tetraborates (such as $Na_2B_4O_7 \cdot 7H_2O$), pentaborates (such as $KB_5O_8 \cdot 4H_2O$, $Ca_2B_6O_{11} \cdot 7H_2O$ and $CsB_5O_5$)). Of these compounds, borax, boric acid and borates, especially boric acid, are advantageous in that they can quickly cause cross-linking reaction.

The following compounds besides the boron compounds can be used as cross-linking agents for the water-soluble resins as recited above.

Specifically, the compounds usable as the cross-linking agents are aldehyde compounds, such as formaldehyde, glyoxal and glutaraldehyde; ketone compounds, such as diacetyl and cyclopentanedione; active halogen compounds, such as bis(2-chloroethylurea)-2-hydroxy-4,6-dichloro-1,3,5-triazine and sodium salt of 2,4-dichloro-6-s-triazine; active vinyl compounds, such as divinylsulfonic acid, 1,3-vinylsulfonyl-2-propanol, N,N'-ethylenebis(vinylsulfonylacetamide) and 1,3,5-triacryloyl-hexahydro-s-trizaine; N-methylol compounds, such as dimethylolurea and methyloldimethylhydantoin; melamine resins, such as methylolmelamine and alkylated methylolmelamine; epoxy resins; isocyanate compounds, such as 1,6-hexamethylenediidocyanate; the aziridine compounds described in U.S. Pat. Nos. 3,017,280 and 2,983,611; the carboxyimide compounds described in U.S. Pat. No. 3,100,704; epoxy compounds, such as glycerol triglycidyl ether; ethyleneimino compounds, such as 1,6-hexamethylene-N,N'-bisethyleneurea; halogenated carboxyaldehyde compounds, such as mucochloric acid and mucophenoxychloric acid; dioxane compounds, such as 2,3-dihydroxydioxane; metal-containing compounds, such as titanium lactate, aluminum sulfate, chrome alum, potassium alum, zirconium acetate and chromium acetate; polyamine compounds, such as tetraethylenepentamine; hydrazide compounds, such as adipic dihydrazide; and low-molecular weight compounds or polymers containing at least two oxazoline groups per molecule.

The cross-linking agents as recited above can be used alone or as combination of two or more thereof.

The curing by formation of cross-links is preferably carried out by adding a cross-linking agent to a coating solution containing a particulate substance and a water-soluble resin (hereinafter referred to as "coating Solution A", too) and/or a basic solution as mentioned hereinafter, and further by applying a basic solution of pH 7.1 or higher (coating Solution B) to the coating layer (1) simultaneously with formation of the coating layer by applying the coating solution or (2) during drying of the coating layer formed by applying the coating solution and before the coating layer shows drying shrinkage. The pH of the basic solution used herein is preferably 7.5 or higher, especially 8 or higher.

The addition of a cross-linking agent, when a boron compound is taken as an example of the cross-linking agent, is preferably carried out in the following manner. Specifically, when the ink-receiving layer is a layer prepared by applying a coating solution containing a particulate substance, polyvinyl alcohol and a water-soluble resin (coating Solution A) to form a coating layer and curing the coating layer by formation of cross-links, the curing by formation of cross-links is carried out by applying a basic solution of pH 7.1 or higher (coating Solution B) to the coating layer (1) simultaneously with the formation of the coating layer by application of the coating solution, or (2) during the drying of the coating layer formed by application of the coating solution and before the coating layer shows drying shrinkage. Herein, it will suffice to incorporate a boron compound as the cross-linking agent in either coating Solution A or coating Solution B, but the boron compound may be incorporated in both coating Solution A and coating Solution B.

The cross-linking agent is used in an amount of 1 to 50% by mass, preferably 5 to 40% by mass, relative to the water-soluble resin.

(Mordant)

In the invention, the ink-receiving layer may contain an organic mordant in combination with an inorganic mordant for the purpose of achieving improvements in water resistance and age smearing resistance of formed images.

As the organic mordant, a cationic polymer (a cationic mordant) is suitable. By allowing the mordant to be present in an ink-receiving layer, the mordant interacts with liquid ink containing an anionic dye as a coloring material to stabilize the coloring material and to improve water resistance and age smearing resistance. In using the organic mordant and the inorganic mordant, each may be a combination of two or more varieties.

For incorporation of the mordant into the ink-receiving layer can be used a method of adding the mordant to the coating Solution A containing a particulate substance and a water-soluble resin can be used, or a method of adding the mordant to the coating Solution B when there is apprehension that the mordant flocculates a particulate substance.

As the cationic mordant, a polymeric mordant containing as cationic groups primary to tertiary amino groups or quaternary ammonium salt groups is suitably used, but a cationic nonpolymeric mordant can also be used.

Suitable examples of the polymeric mordant include homopolymers of monomers having primary to tertiary amino groups or salts thereof, or quaternary ammonium salt groups (mordant monomers), and copolymers or condensation polymers of such mordant monomers and other monomers (nonmordant monomers). Such polymeric mordant can be used in the form of a water-soluble polymer or in the form of water-dispersible latex particles.

Examples of the monomers (mordant monomers) include trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride; n,n-dimethyl-N-(4-methyl)benzyl-N-p-vinylbenzylammonium chloride, N,N-dimethyl-N-phenyl-N-p-vinylbenzylammonium chloride, trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinylphenyl)ethylammonium chloride, N,N,N-triethyl-N-2-(3-vinylphenyl)ethylammonium chloride, N,N-diethyl- N-ethyl-N-2-(4-vinylphenyl)ethylammonium chloride, N,N-diethyl-N-methyl-N-2-(4-vinylphenyl)ethylammonium acetate, and quaternary compounds formed by reacting methyl chloride, ethyl chloride, methyl bromide, ethyl bromide, methyl iodide or ethyl iodide with N,N-dimethylaminoethyl(meth)acrylate, N,N-diethylaminoethyl(meth)acrylate, N,N-dimethylaminopropyl(meth)acrylate, N,N-diethylaminopropyl(meth)acrylate, N,N-diethylaminoethyl(meth)acrylamide, N,N-diethylaminoethyl(meth)acrylamide, N,N-dimethylaminopropyl(meth)acrylamide and N,N-diethylaminopropyl(meth)acrylamide, or the sulfonates, alkylsulfonates, acetates or alkylcarboxylates obtained by anion replacement in the quaternary compounds recited above.

Examples of those quaternary compounds include monomethyldiallylammonium chloride, trimethyl-2-(methacryloyloxy)ethylammonium chloride, triethyl-2-(methacryloyloxy)ethylammonium chloride, trimethyl-2-(acryloyloxy)ethylammonium chloride, triethyl-2-(acryloyloxy)propylammonium chloride, triethyl-3-(methacryloyloxy)propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl-3-(acryloylamino)propylammonium chloride, triethyl-3-(acryloylamino)propylammonium chloride, N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino)propylammonium chloride, trimethyl-2-(methacryloyloxy)ethylammonium bromide, triethyl-3-(acryloylamino)propylammonium bromide, trimethyl-2-(methacryloyloxy)ethylammonium sulfonate, and trimethyl-3-(acryloylamino)propylammonium acetate.

Examples of other copolymerizable monomers include N-vinylimidazole and N-vinyl-2-methylimidazole.

In addition to those monomers, allylamine, diallylamine and their derivatives and salts can also be used. Examples of such compounds include allylamine, allylamine hydrochloride, allylamine acetate, allylamine sulfate, diallylamine, diallylamine hydrochloride, diallylamine acetate, diallylamine sulfate, diallylmethylamine and salts thereof (e.g., hydrochloride, acetate, sulfate), diallylethylamine and salts thereof (e.g., hydrochloride, acetate, sulfate) and diallyldimethylammonium salts (whose counter anions include chloride, acetate and sulfate ions). Incidentally, these allylamine and diallylamine derivatives are inferior in polymerization activity when they take amine forms, so they are generally polymerized in salt forms and desalted as required.

In addition, compounds obtained by carrying out polymerization using units such as N-vinylacetamide and N-vinylformamide, and then converting the units to vinylamine units by hydrolysis and further to their salts may also be utilized.

The term "nonmordant monomers" refers to the monomers containing neither basic groups, such as primary to tertiary amino groups, their salts and quaternary ammonium salt groups, nor cationic moieties and having no interaction with dyes in ink-jet ink or little interaction with such dyes, if any.

Examples of nonmordant monomers include alkyl esters of (meth)acrylic acid; cycloalkyl esters of (meth)acrylic acid, such as cyclohexyl (meth)acrylate; aryl esters of (meth)acrylic acid, such as phenyl (meth)acrylate; aralkyl esters of (meth)acrylic acid, such as benzyl (meth)acrylate; aromatic vinyl compounds, such as styrene, vinyltoluene and α-methylstyrene; vinyl esters, such as vinyl acetate, vinyl propionate, vinyl ester of versatic acid; allyl esters, such as allyl acetate; halogen-containing monomers, such as vinyl chloride; vinyl cyanides, such as (meth)acrylonitrile; and olefins, such as ethylene and propylene.

As the alkyl esters of (meth)acrylic acid, those containing 1 to 18 carbon atoms in each individual alkyl moiety are suitable. Examples of such alkyl esters include methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate and stearyl (meth)acrylate.

Of these esters, methyl acrylate, ethyl acrylate, methyl methacrylate, ethyl methacrylate and hyddroxyethylmethacrylate are preferred over the others.

The nonmordant monomers as recited above can be used alone or as combinations of two or more thereof.

Examples of suitable polymeric mordants other than those recited above include polydiallyldimethylammonium chloride, copolymers of diallyldimethylammonium chloride and other monomers (including mordant monomers and nonmordant monomers), copolymer of diallyldimethylammonium chloride and $SO_2$, polydiallylmethylamine hydrochloride, and cyclic amine resins, typified by polydiallyl hydrochloride, and their derivatives (including copolymers); alkyl (meth)acrylate polymers substituted with secondary amino, tertiary amino or quaternary ammonium salts, typified by polydiethylmethacryloyloxyethylamine, polytrimethylmethacryloyloxyethylammonium chloride, polydimethylbenzylmethacryloyloxyethylammonium chloride and polydimethylhydroxyethylacryloyloxyethylammonium chloride, and copolymers of such substituted alkyl(meth)acrylates and other monomers; polyamine resins, typified by polyethyleneimine and derivatives thereof, polyallylamine and derivatives thereof, and polyvinylamine and derivatives thereof; polyamine resins, typified by polyamide-polyamine resins and polyamide-epichlorohydrin resins; polysaccharides, typified by cationic starch, chitosani and derivatives thereof; dicyandiamide derivatives, typified by dicyandiamiude-formaldehyde polycondensates and dicyhandiamide-ethylenetriamine polycondensates, polyamidine and derivatives thereof; dialkylamine-epichlorohydrin addition polymers, typified by dimethylamine-epichlorohydrin addition polymer, and derivatives thereof; and styrene polymers having quaternary ammonium salt-substituted alkyl groups and copolymers of such substituted styrene monomers and other monomers.

More specifically, the polymeric mordants as recited above include those described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60543, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,18,061, 3,309,690, 4,115,124, 4,124,386, 4,193,800, 4,273,853, 4,282,305 and 4,450,224, JP-A-1-161236, JP-A-10-81064, JP-A-10-157277, JP-A-10-217601, JP-A-2001-138621, JP-A-2000-211235, JP-A-2001-138627, JP-A-8-174992, JP-B-5-35162, JP-B-5-35163, JP-B-5-35164, JP-B-5-88846, and Japanese Patent Nos. 2,648,847 and 2,661,677.

When an inorganic mordant and an organic mordant are used in combination, the relative proportion of these mordants may be determined by the balance between keeping quality and ink bleed. Herein, the suitable proportion of the inorganic mordant in the total mortands used is 5% or more, preferably 10% or more. The suitable amount of total mordants used is from 0.01 g/m² to 5 g/m², preferably from 0.1 g/m² to 3 g/m².

(Compound Containing Two or More Kinds of Di- or Higher-valent Metal Atoms)

In the invention, compounds having at least two species of di- or higher-valent metal atoms on a per-molecule basis (hereinafter referred simply to as "metal-containing compounds") may be used. The species of di- or higher-valent metal atoms include all species of metal atoms exhibiting electrovalence of two or above, and they are not limited to any particular species. Examples of such metal species include magnesium, aluminum, calcium, scandium, titanium, vanadium, manganese, iron, nickel, chromium, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten and bismuth.

As the species of di- or higher-valent metal atoms, combinations of at least two metallic elements selected from the group II metals, the group III metals or the group IV metals are preferred.

Suitable examples of the group II metallic elements include beryllium, magnesium, calcium, strontium, barium and zinc.

Suitable examples of the group III metallic elements include scandium, yttrium, lanthanum, boron, aluminum, gallium, indium and thallium.

Suitable examples of the group IV metallic elements include titanium, zirconium, hafnium and thorium.

Of those metallic elements, at least two species of metals selected from aluminum, zirconium, titanium, lanthanides, zinc or magnesium are more suitable as the species of di- or higher-valent metal atoms contained in the metal-containing compounds used in the invention from the viewpoint of improvements in ozone resistance and age smearing resistance. And the combinations of zirconium and at least one species of metal atom selected from aluminum, titanium, lanthanides, zinc or magnesium are especially preferred.

Further, it is preferable from the viewpoint of enhancement of manufacturing suitability that the compounds containing at least two species of di- or higher-valent metal atoms on a per molecule basis are water-soluble metal-containing compounds. The standard of the expression "water-soluble" as used herein lies in water solubility of 0.5 mass % or higher, preferably 1.0 mass % or higher, far preferably 1.5 mass %, at room temperature. On the other hand, the metal-containing compounds can be added in the form of emulsified dispersions or organic solutions when they are soluble in oil; while, when they are solid compounds, they can be added as fine-grain dispersions.

For achieving a higher-level improvement in both ozone resistance and age smearing resistance, it is appropriate that the metal-containing compound as used in the invention be a complex compound formed from at least both of a zirconium-containing compound and an aluminum-containing compound.

Examples of a zirconium-containing compound usable for the above purpose include zirconium acetylacetonate, zirconium acetate, zirconium sulfate, zirconium ammonium carbonate, zirconium stearate, zirconium octylate, zirconium sulfate, zirconium nitrate, zirconium oxychloride, zirconium hydroxychloride, zirconium lactate, zirconium succinate, zirconium oxalate, basic zirconium aminoacetate, and mixtures of any two or more of the zirconium salts recited above.

Examples of an aluminum-containing compound usable for the foregoing purpose include aluminum halide, basic aluminum chloride (aluminum polychloride), basic aluminum sulfate, basic aluminum nitrate, basic aluminum sulfaminate, basic aluminum phenolsulfonate, and mixtures of any two or more of the aluminum salts recited above.

Of the complex compounds containing both zirconium and aluminum, the complex compounds formed using at least basic zirconium compounds and/or basic aluminum compounds are most suitable as the metal-containing compounds.

As the basic zirconium compounds usable for forming the metal-containing compounds, compounds represented by the following formula (I) are suitable:

$$Zr(OH)_xA_{4-x} \quad (I)$$

wherein A represents an amino acid and x represent a number satisfying the inequality 0<x<4 (wherein the number doesn't need to be an integer).

Of the basic zirconium compounds represented by formula (I), basic zirconium-amino acid gel, zirconium hydroxide-amino acid gel, basic zirconium carbonate-amino acid gel and mixtures of two or more of these gels are preferred over the others. These gels are preferably reaction products of water-soluble salts of amino acids and water-soluble zirconium salts, or reaction products of water-soluble salts of amino acids and zirconium hydroxysalts.

In addition, zirconium oxysalts, zirconium hydroxysalts, trioxodizirconyl hydroxysalts and mixtures of these salts are suitable as the zirconium compounds.

When the basic zirconium compounds are basic zirconium carbonate gels; the basic zirconium carbonates are preferably compounds represented by the following formula (II):

$$Zr(OH)_{4-2x}(CO_3)_x \quad (II)$$

wherein x represents a number satisfying the inequality 0<x<2 (wherein the number doesn't need to be an integer).

Of the basic zirconium carbonate gels, the reaction products of sodium carbonate and zirconium oxysalts or zirconium hydroxysalts are preferred.

The foregoing formulae (I) and (II) are simplified formulae, so the compounds represented by them may also be in a polymeric state and ligands and/or water can be bonded thereto. Alternatively, the OH groups in formulae (I) and (II) can be represented as oxide (oxy group).

Acid zirconium compounds, that is, cationic zirconium compounds usable for formation of the metal-containing compounds include both zirconium oxysalts and zirconium hydroxysalts (also referred to as zirconium salts and zirconyl hydroxysalts). These compounds can be represented by the following formula (III):

$$ZrO(OH)_{2-nz}B_z \quad (III)$$

wherein z is in the range of about 0.9 to about 2 (where z doesn't need to be an integer), n is a valence number of B and satisfies the inequality 2-nz>0, and B is selected from the group consisting of halide, nitrate, sulfamate, sulfate and mixtures of two or more thereof The basic aluminum compounds usable for formation of the metal-containing compounds can be represented by the following formula (IV):

$$Al_2(OH)_{6-nx}B_x \quad (IV)$$

wherein B is selected from the group consisting of halide, nitrate, sulfamate, sulfate and mixtures of two or more thereof, x is a number satisfying the inequality 0<x<6 (where x doesn't need to be an integer), (6-nx) represents a number of zero or above, and n represents a valence number of B.

More specifically, the above formula (IV) represents polymers, complexes, basic aluminum compounds having aquo ligands and/or bonded molecules, and mixtures of these compounds.

Of the basic aluminum compounds represented by formula (IV), basic aluminum chlorides of formulae $Al_2(OH)_2Cl_4$ to $Al_2(OH)_5Cl$, which correspond to the formula (IV) in which B is chloride and x satisfies the inequality 2<x<5 (where x doesn't need to be an integer), are preferred over the others.

In the complex compound containing both zirconium and aluminum, the suitable mole ratio of zirconium to aluminum is from $1/100$ to $100/1$, preferably from $3/100$ to $100/3$, particularly preferably from $5/100$ to $100/5$.

One preferred form of the compounds containing at least two species of di- or higher-valent metal atoms on a per-molecule basis is a complex using an organic compound in addition to the species of metal atoms. The organic compound is preferably a compound containing at least one atom having a lone pair of electrons, such as oxygen atom, sulfur atom, nitrogen atom or phosphorus atom, so that it can cause interaction with the species of metal atoms. Examples of such an organic compound include organic compounds; at least containing groups convertible into anionic groups selected from $—CO_2^-$, $—SO_3^-$, $—OSO_3^-$, $—PO_4^{m-}$(m=1, 2 or 3), $—PO_3^{2-}$, $—PO_2^-$ or $O^-$. The organic compounds having groups convertible into those anionic groups may further have nitrogen atoms.

Examples of such organic compounds include amino acids, aliphatic carboxylic acid compounds, betaine compounds (such as carbobetaine, sulfobetaine and phosphobetaine compounds), aromatic carboxylic acid compounds, heterocyclic carboxylic acid compounds, aliphatic diketone compounds, aliphatic sulfonic acid compounds, aromatic sulfonic acid compounds, heterocyclic sulfonic acid compounds, aliphatic phosphoric acid compounds, aromatic phosphoric acid compounds, heterocyclic phosphoric acid compounds, aliphatic sulfinic acid compounds, aromatic sulfinic acid compounds, heterocyclic sulfinic acid compounds, amine compounds (such as hydroxyl group-containing amine compounds), amide compounds and urea compounds.

These compounds may be low-molecular-weight compounds or high-molecular-weight compounds having substituent group on partial skeletons.

The compounds containing at least two species of di- or higher-valent metal atoms on a per-molecule basis are listed below, but these compounds listed should not be construed as limiting the scope of the invention. The list thereof include:

(1) zirconium-chloroglycine-hydroxyaluminum complex,
(2) octaaluminum-zirconium-pentachloride-tricosahydroxide,
(3) tetraaluminum-zirconium-tetrachloride-dodecahydroxide,
(4) tetraaluminum-zirconium-trichloride-tridecahydroxide,
(5) octaaluminum-zirconium-octachloride-eicosahydroxide,
(6) a mixture of basic aluminum chloride ($Al_2(OH)_5Cl$) and zirconium lactate,
(7) a complex of basic aluminum chloride ($Al_2(OH)_5Cl$) and zirconium acetate,
(8) a complex of basic aluminum chloride ($Al_2(OH)_5Cl$) and basic zirconium aminoacetate,
(9) a complex of aluminum chloride, basic zirconium α-aminopropionate and zinc sulfate,
(10) a complex of basic zirconium aminoacetate, lanthanum chloride and basic aluminum chloride ($Al_2(OH)_5Cl$),
(11) a complex of basic aluminum chloride ($Al_2(OH)_5Cl$), zirconium oxychloride and hydroxyethyliminodiacetic acid,
(12) a complex of basic aluminum chloride ($Al_2(OH)_5Cl$), zirconium oxychloride and betaine,
(13) myristato-methacrylato-chlorohydroxo-metanolato-isopropanolato-zirconium-aluminum, and
(14) 3-aminopropionato-chlorohydroxo-methanolato-zirconium-aluminum.

In producing an ink-jet recording material according to the invention, the aforementioned compounds in which at least two species of di- or higher-valent metal atoms are contained on a per-molecule basis may be used in either of the following ways: (1) a compound containing at least two species of di- or higher-valent metal atoms per molecule is prepared in advance and used in a condition that the metal-containing compound is added to a coating solution for forming an ink-receiving layer, or (2) individual metal-containing compounds capable of forming a compound (complex) containing at least two species of di- or higher-valent metal atoms per molecule as intended in the invention (e.g., a combination of a zirconium-containing compound and an aluminum-containing compound) are added together or separately to a coating solution for forming an ink-receiving layer and/or a solution for applying a mordant at the solution-preparing stage and allowed to react with each other during the process of preparing those solutions, and the reaction product thus formed is used as it is.

Additionally, each of the compounds containing at least two species of di- or higher-valent metal atoms on a per-molecule basis can be prepared generally by mixing individual metal-containing compounds capable of forming an intended metal-containing compound, or further heating them, if needed. The compounds containing individual metals as used herein may be in salt forms taken by bonding to a strong acid or a weak acid, or may be in forms of hydroxides, halohydroxides or complexes. These complex compounds formed by reacting compounds according to the invention can be incorporated into the ink-receiving layer of an ink-jet recording material. Examples of metal salts, hydroxides, halohydroxides and complexes as mentioned include the following: calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, cupric chloride, ammonium copper(II) chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidosulfate tetrahydrate, aluminum sulfate, aluminum alum, aluminum sulfite, aluminum thiosulfate, aluminum polychloride, basic aluminum lactate, basic aluminum sulfate, basic aluminum nitrate, basic aluminum sulfaminate, basic aluminum formate, basic aluminum acetate, basic aluminum aminoacetate, aluminum nitrate nonahydrate, aluminum chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconium acetylacetonate, zirconyl acetate, zirconyl sulfate, zirconium ammonium carbonate, zirconyl stearate, zirconyl octylate, zirconyl nitrate, zirconyl lactate, zirconyl succinate, zirconyl oxalate, zirconium ammonium acetate, zirconium potassium carbonate, zirconium sodium lactate, basic zirconium aminoacetate, zirconium oxychloride, zirconium hydroxychloride, chromium acetate, chromium sulfate, magnesium sulfate, magnesium chloride hexahydrate, magnesium citrate nonahydrate, sodium phosphotungstate, sodium tungsten citrate, dodecatungstophosphoric acid n-hydrate, dodecatungstosilicic acid hexacosahydrate, molybdenum chloride, dodecamolybdophosphoric acid n-hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride and bismuth nitrate.

Of the compounds recited above, aluminum-containing compounds, such as aluminum sulfate, aluminum alum, aluminum sulfite, aluminum thiosulfate, aluminum polychloride, basic aluminum lactate, basic aluminum sulfate, basic aluminum nitrate, basic aluminum sulfaminate, basic aluminum formate, basic aluminum acetate, basic aluminum aminoacetate, aluminum nitrate nonahydrate and aluminum chloride hexahydrate; titanium-containing compounds, such as titanium tetrachloride, tetraisopropyl titanate, titanium acetylacetonate and titanium lactate; and zirconium-containing compounds, such as zirconium acetylacetonate, zirconyl acetate, zirconyl sulfate, zirconium ammonium carbonate, zirconyl stearate, zirconyl octylate, zirconyl nitrate, zirconyl lactate, zirconyl succinate, zirconyl oxalate, zirconium ammonium acetate, zirconium potassium carbonate, zirconium sodium lactate, basic zirconium aminoacetate, zirconium oxychloride and zirconium hydroxychloride, are preferred over the others. And basic zirconium salts and/or basic aluminum salts in particular are used to advantage.

For the purpose of further improvements in image bleed and light resistance, it is appropriate that the content of the compounds having at least two species of di- or higher-valent metal compounds on a per-molecule basis in the ink-receiving layer according to the invention be from 0.01 g/m$^2$ to 20 g/m$^2$, preferably from 0.1 g/m$^2$ to 15 g/m$^2$, particularly preferably from 0.5 g/m$^2$ to 10 g/m$^2$.

When the content of the complexes is lower than 0.01 g/m$^2$, their effect on improvements in image bleed and light resistance is occasionally insufficient; while, when the content is higher than 20 g/m$^2$, there sometimes occur flocculation of fine particles used and reduction in glossiness of the recording medium.

(Other ingredients)

An ink-jet recording material according to the invention can further contain various known additives as required. Examples of such additives include an acid, a ultraviolet absorbent, an antioxidant, a brightening agent, an monomer, a polymerization initiator, a polymerization inhibitor, a bleed preventive, an antiseptic, a viscosity stabilizer, an antifoaming agent, a surfactant, an antistatic agent, a matting agent, a curl preventive and a water resistance-imparting agent.

In the invention, the ink-receiving layer may contain an acid. By adding an acid, the surface pH of the ink-receiving layer is adjusted to pH 3-8, preferably pH 4-6. This adjustment is favorable to enhancing the resistance of white areas to yellow change. The measurement of surface pH is made in accordance with the method A (coating method) of the pH measuring methods defined by Nippon Kami Pulp Gijutsu Kyokai (J. TAPPI). Specifically, the measurement can be carried out using a pH Indicator Set for paper surface, Model MPC, made by KYORITSU CHEMICAL-CHECK Lab., Corp., which conforms to the method A.

Examples of an acid usable for the foregoing purpose include formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutaminic acid, salicylic acid, metal salts of salicylic acid (e.g., Zn, Al, Ca and Mg salts), methanesulfonic acid, itaconic acid, benzenesulfonic acid, toluenesulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalene disulfonic acid, hydroxybenzenesulfonic acid, toluenesulfinic acid, benzenesulfinic acid, sulfanilic acid, sulfaminic acid, α-resorcylic acid, β-resorcylic acid, γ-resorcylic acid, gallic acid, phloroglucinol, sulfosalicylic acid, ascorbic acid, erysorbic acid, bisphenolic acid, hydrochloric acid, nitric acid, sulfuric acid, phosphoric acid, polyphophoric acid, boric acid, boronic acid, and acidic ones of the organic and inorganic mordants recited above. The addition amounts of these acids may be determined so that the ink-receiving layer has a surface pH of 3 to 8.

The acids recited above may be used in the form of metal salts (e.g., sodium salts, potassium salts, calcium salts, cesium salts, zinc salts, copper salts, iron salts, aluminum salts, zirconium salts, lanthanum salts, yttrium salts, magnesium salts, strontium salts, cerium salts), or salts prepared by reacting the acids with amines (e.g., ammonia, triethylamine, tributyl amine, piperazine, 2-methylpiperazine, polyallylamine).

In the invention, it is preferable that the ink-receiving layer contains keeping quality improvers, including an ultraviolet absorbent, an antioxidant and a bleed preventive.

Examples of compounds usable as the ultraviolet absorbent, the antioxidant and the bleed preventive include alkylphenol compounds (including hindered phenol compounds), alkylthiomethylphenol compounds, hydroquinone compounds, alkylated hydroquinone compounds, tocopherol compounds, thioether linkage-containing aliphatic, aromatic and/or heterocyclic compounds, bisphenol compounds, O-, N- and S-benzil compounds, hydroxybenzil compounds, triazine compounds, phosphonate compounds, acylaminophenol compounds, ester compounds, amide compounds, ascorbic acid, amine antioxidants, 2-(2-hydroxyphenyl)benzotriazole compounds, 2-hydroxybenzophenone compounds, acrylates, water-soluble or hydrophobic metal salts, organometallic compounds, metal complexes, hindered amine compounds (including TEMPO compounds), 2-(2-hydroxyphenyl) 1,3,5-triazine compounds, metal deactivators, phosphite compounds, phosphonite compounds, hydroxyamine compounds, nitron compounds, peroxide scavengers, polyamide stabilizers, polyether compounds, basic auxiliary stabilizers, benzofuranone compounds, indolinone compounds, phosophine compounds, polyaminde compounds, thiourea compounds, urea compounds, hydrazide compounds, amidine compounds, sugar compounds, hydroxybenzoic acid compounds, dihydroxybenzoic acid compounds, and trihydroxybenzoic acid compounds.

Of these compounds, alkylated phenol compounds, thioether linkage-containing aliphatic, aromatic and/or heterocyclic compounds, bisphenol compounds, ascorbic acid, amine antioxidants, water-soluble or hydrophilic metal salts, organometallic compounds, metal complexes, hindered amine compounds, hydroxyamine compounds, polyamine compounds, thiourea compounds, hydrazide compounds, hydroxybenzoic acid compounds, dihydroxybenzoic acid compounds and trihydroxybenzoic acid compounds are preferred over the others.

Examples of those compounds include those described in JP-A-2002-36717, JP-A-2002-86904, Japanese Patent No. 2002-13005, JP-A-10-182621, JP-A-2001-26051, JP-B-4-34953, JP-B-4-34513, JP-A-11-170686, JP-B-4-34512, European Patent No. 1138509, JP-A-60-67190, JP-A-7-276808, JP-A-2001-94829, JP-A-47-10537, JP-A-58111942, JP-A-58-212844, JP-A-59-19945, JP-A-59-46646, JP-A-59-109055, JP-A-63-53544, JP-B-36-10466, JP-B-42-26187, JP-B-48-30492, JP-B-48-31255, -JP-B-48-41572, JP-B-48-54965, JP-B-50-10726; U.S. Pat. Nos. 2,719,086, 3,707,375, 3,754,919, 4,220,711, JP-B-45-4699, JP-B-54-5324, EP-A-223739, EP-A-309401, EP-A-309402, EP-A-310551, EP-A-310552, EP-A-459416, German Patent Application (OLS) No. 3,435,443, JP-A-54-48535, JP-A-60-107384, JP-A-60-107383, JP-A-60-125470, JP-A-60-125471, JP-A-60-125472, JP-A-60-287485, JP-A-60-287486, JP-A-60-287487, JP-A-60-287488, JP-A-61-160287, JP-A-61-185483, JP-A-61-211079, JP-A-62-146678, JP-A-62-146680, JP-A-62-146679, JP-A-62-282885, JP-A-62-262047, JP-A-63-051174, JP-A-63-89877, JP-A-63-88380, JP-A-63-88381, JP-A-63-113536, JP-A-63-163351, JP-A-63-203372, JP-A-63-224989, JP-A-63-251282, JP-A-63-267594, JP-A-63-182484, JP-A-1-239282, JP-A-2-262654, JP-A-2-71262, JP-A-3-121449, JP-A-4-291685, JP-A-4-291684, JP-A-5-61166, JP-A-5-119449, JP-A-5-188687, JP-A-5-188686, JP-A-5-110490, JP-A-5-1108437, JP-A-5-170361, JP-B-48-43295, JP-B-48-33212, and U.S. Pat. Nos. 4,814,262 and 4,980,275.

The additional ingredients as recited above may be used alone or as combinations of two or more thereof In advance of their addition, the additional ingredients may be made soluble in water, made dispersive, formed into a polymer dispersion, emulsified or formed into oil droplets. Alternatively, they can be encased in microcapsules. In an ink-jet recording material according to the invention, the amount of the additional ingredients added is preferably from 0.01 to 10 g/m².

For the purpose of enhancing the dispersibility of inorganic fine particles, the particle surface may be treated with a silane coupling agent. As the silane coupling agent, compounds having organic functional groups (e.g., a vinyl group, an amino group (including primary to tertiary amino groups and quaternary ammonium salt groups), an epoxy group, a mercapto group, a chloro group, an alkyl group, a phenyl group, an ester group, a thioether group) in addition to moieties for performing coupling treatment are suitable.

In the invention, it is preferable that the coating solution for an ink-receiving layer contains a surfactant. As the surfactant, any of cationic, anionic, nonionic, amphoteric, fluorine-containing and silicon-containing surfactants can be used.

Examples of nonionic surfactants usable herein include polyoxyalkylene alkyl ethers and polyoxyalkylene alkyl phenyl ethers (e.g., diethylene glycol monomethyl ether, diethylene glyocl diethyl ether, polyoxyethylene lauryl ether, polyoxyethylene stearyl ether, polyoxyethylene nonyl phenyl ether), oxyethylene-oxypropylene block copolymer, sorbitan fatty acid esters (e.g., sorbitan monolaurate, sorbitan monooleate, sorbitan trioleate), polyoxyethylene sorbitan fatty acid esters (e.g., polyoxyethylene sorbitan monolaurate, polyoxyethylene sorbitan monooleate, polyoxyethylene sorbitan trioleate), polyoxyethylene sorbitol fatty acid esters (e.g., polyoxyethylene sorbitol tetraoleate), glycerin fatty acid esters (e.g., glycerol monooleate), polyoxyethylene glycerin fatty acid esters (e.g., polyoxyethylene glycerin monostearate, polyoxyethylene glycerin monooleate), polyoxyethylene fatty acid esters (e.g., polyethylene glycol monolaurate, polyethylene glycol monooleate), polyoxyethylene alkylamine and acetylene glycols (e.g., 2,4,7,9-tetramethyl-5-decyne-4,7-diol and adduct of this diol and ethylene oxide or propylene oxide). Of these compounds, polyoxyalkylene alkyl ethers are preferred over the others. The noninonic surfactants as recited above can be used in both the coating Solution A and the coating Solution B. Additionally, they can be used alone or in combination.

The amphoteric surfactants may be any of amino acid types, carboxyammonium betaine types, sulfonammonium betaine types, ammoniumsulfate betaine types or imidazolium betaine types, with suitable examples including those described in U.S. Pat. No. 3,843,368, JP-A-59-49535, JP-A-63-236546, JP-A-5-303205, JP-A-8-262742, JP-A-10-282619, Japanese Patent Nos. 2,514,194 and 2,759,795 and JP-A-2000-351269. Of these amphoteric surfactants, those of amino acid types, carboxyammonium betaine types and sulfonammonium betaine types are preferred over the others. They may be used alone or in combination.

Examples of anionic surfactants usable therein include fatty acid salts (e.g., sodium stearate, potassium oleate), alkylsulfate salts (e.g., sodium laurylsulfate, triethanolamine laurylsulfate), sulfonic acid salts (e.g., sodium dodecylbenzenesulfonate), alkylsulfosuccinic acid salts (e.g., sodium dioctylsulfosuccinate), alkyl diphenyl ether disulfonic acid salts and alkylphosphoric acid salts.

Examples of the cationic surfactants usable therein include alkylamine salts, quaternary ammonium salts, pyridinium salts and imidazolium salts.

Examples of the fluorine-containing surfactants usable therein include compounds derived via perfluoroalkyl group-containing intermediates by use of a method, such as an electrolytic fluorination, telomerization or oligomerization.

More specifically, those compounds include perfluoroalkylsulfonic acid salts, perfluoroalkylcarboxylic acid salts, perfluoroalkylethylene oxide adducts, perfluoroalkyltrialkylammonium salts, perfluoroalkyl group-containing oligomers and perfluoroalkyl phosphates.

As the silicon-containing surfactants, silicone oils modified by organic groups are suitable. They can take a siloxane structure whose side chains are modified by organic groups, or a siloxane structure modified at one end or both ends. Examples of modification by an organic group include amino modification, polyether modification, epoxy modification, carboxyl modification, carbinol modification, alkyl modification, aralkyl modification, phenol modification and fluoro modification.

The suitable content of surfactants in a coating solution for the ink-receiving layer in the invention is from 0.001 to 2.0%, preferably from 0.01 to 1.0%. When two or more coating solutions are used for forming the ink-receiving layer, it is preferable to add surfactants to each of the coating solutions.

For prevention of curling, it is preferable in the invention that the ink-receiving layer contains a high boiling organic solvent. The high boiling organic solvent is a water-soluble or hydrophobic organic compound having a boiling point of 150° C. or higher under ordinary pressure, and it may be a liquid or a solid at room temperature and may be a low molecular-weight compound or a high polymer. Examples of such a compound include aromatic carboxylic acid esters (e.g., dibutyl phthalate, diphenyl phthalate, phenyl benzoate), aliphatic carboxylic acid esters (e.g., dioctyl adipate, dibutyl sebacate, methyl stearate, dibutyl maleate, dibutyl fumarate, triethyl acetylcitrate), phosphoric acid esters (e.g., trioctyl phosphate, tricresyl phosphate), epoxy compounds (e.g., epoxidized-soybean oil, methyl ester of epoxidized fatty acid), alcohol compounds (e.g., stearyl alcohol, ethylene glycol, propylene glycol, diethylene glycol, triethylene glycol, glycerin, diethylene glycol monobutyl ether (DEGMBE), triethylene glycol monobutyl ether, glycerin monomethyl ether, 1,2,3-butanetriol, 1,2,4-butanetriol, 1,2,4-pentanetriol, 1,2,6-hexanetriol, thiodiglycol, triethanolamine, polyethylene glycol), vegetable oils (e.g., soybean oil, sunflower oil) and higher aliphatic carboxylic acids (e.g., linolic acid, oleic acid).

(Support)

In the invention, both supports, a transparent support made from a transparent material, such as a plastic, and an opaque support made from an opaque material, such as paper, can be used. From the viewpoint of taking advantage of the transparency of the ink-receiving layer, it is preferable to use a transparent support or a high-gloss opaque support. In addition, it is possible to use as a support a read-only optical disk, such as CD-ROM or DVD-ROM, a write-once optical disk, such as CD-R or DVD-R, or a rewritable optical disk and to provide the ink-receiving layer on a label side of the disk.

Materials suitable for use as the transparent support are transparent materials having a property of being able to resist the radiant heat from an overhead projector or a backlight display. Suitable examples of transparent materials having such a property include polyesters, such as polyethylene terephthalate (PET); polysulfone, polyphenylene oxide, polyimide, polycarbonate and polyamide. Of these materials, polyesters, especially polyethylene terephthalate, are preferred over the others.

Such transparent supports have no particular restriction as to their thickness, but it is preferable from the viewpoint of easy handling that their thickness is within the range of 50 to 200 μm.

Materials suitable as the high-gloss opaque support are those having glossiness of 40% or higher at the surface of the side on which the ink-receiving layer is provided. Herein, the glossiness is a value determined in accordance with the method defined by JIS P-8142 (the method of testing 75-degree specular glossiness of paper and paperboard). Examples of such an opaque support include the following:

namely, high-gloss paper supports, such as art paper, coated paper, cast-coated paper and baryta paper used as a support for silver-salt photography, high-gloss films prepared by adding white pigment to plastic films, such as polyester films including polyethylene terephthalate film, cellulose ester films including nitrocellulose film, cellulose acetate film and cellulose acetate butyrate film, polysulfone films, polyphenylene oxide films, polyimlde films, polycarbonate films and polyamide films, to give them opacity (and, if desired, subjecting the films to surface calendering treatment); and supports prepared by providing polyolefin coatings, wherein white pigment may be incorporated or not, on various types of paper supports, transparent supports as recited above or high-gloss films containing white pigment.

Additionally, it is also appropriate to use a film of white pigment-containing polyester foam (e.g., PET foam prepared by incorporating fine particles of polyolefin into PET and drawing PET to form voids therein). Moreover, resin-coated paper used in photographic paper for silver-salt photography is also suitable as the opaque-support.

Such opaque supports have no particular restriction as to their thickness, but it is preferable from the viewpoint of easy handling that their thickness is in the range of 50 to 300 μm.

Further, the support surface may be subjected to corona discharge treatment, glow discharge treatment, flame treatment or ultraviolet irradiation treatment in order to improve its wetting characteristics and adhesiveness.

Next, base paper used for the resin-coated paper is described in detail.

The base paper is mainly made from wood pulp. In the wood pulp, synthetic pulp such as polypropylene or synthetic fiber such as nylon or polyester may be mixed, if needed. As the wood pulp, any of LBKP, LBSP, NBKP, NBSP, LDP, NDP, LUKP and NUKP can be used, but it is preferable to use wood pulp rich in short fibers, such as LBKP, NBSP, LBSP, NDP and LDP, in higher proportions. However, the suitable proportion of LBSP and/or LDP is from 10 mass % to 70 mass %.

Chemical pulp (sulfate pulp or sulfite pulp) is preferably used because its impurity is slight, and pulp with whiteness improved by undergoing bleaching treatment is also used to advantage.

The base paper can contain various additives, including a sizing agent such as a higher fatty acid or an alkylketene dimer, a white pigment such as calcium carbonate or titanium oxide, a paper strength-increasing agent such as starch, polyacrylamide or polyvinyl alcohol, a brightening agent, a moisture retaining agent such as polyethylene glycol, a dispersant and a softening agent such as a quaternary ammonium, as appropriate.

The suitable freeness of pulp used for making paper is from 200 to 500 ml determined with a CSF tester. As to the fiber length after beating, the sum of 24-mesh residue's percentage by mass and 42-mesh residue's percentage by mass defined by JIS P-8207 is preferably from 30 to 70%. Additionally, the 4-mesh residue's percentage by mass is preferably 20% or below.

The suitable basis weight of base paper is from 30 to 250 g, particularly preferably from 50 to 200 g. The suitable thickness of base paper is from 40 to 250 μm. The base paper can be made highly smooth by undergoing calendering treatment at the stage of or after making paper. The density of base paper is generally from 0.7 to 1.2 g/m$^2$ (JIS P-8118).

Further, it is preferable that the base paper has stiffness of 20 to 200 g under the condition defined by JIS P-8143.

The surface of base paper may be coated with a surface-sizing agent. The surface-sizing agent coated may be the same sizing agent that the base paper can contain.

The suitable pH of the base paper is from 5 to 9, measured in accordance with the hydrothermal extraction method defined by JIS P-8113.

The polyethylene covering the surface and the back of base paper is mainly low-density polyethylene (LDPE) and/or high-density polyethylene (HDPE). Further, LLDPE and polypropylene may be used as a portion of polyethylene.

As to the ink-receiving layer-side polyethylene layer in particular, it is preferable that the opacity, whiteness and color hue of the polyethylene layer are improved by addition of rutile- or anatase-type titanium oxide, a brightening agent and ultramarine as is often in the case of photographic paper. The suitable content of titanium oxide in the polyethylene is from about 3 to about 20% by mass, preferably from 4 to 13% by mass. The polyethylene layer's thickness has no particular limitation, but it is preferable that both the surface-side polyethylene layer and the back polyethylene layer have a thickness of 10 to 50 μm. In addition, an undercoat layer may be provided on the polyethylene layer for the purpose of imparting adhesiveness to the ink-receiving layer. The undercoat layer is preferably formed from aqueous polyester, gelatin or PVA, and the thickness thereof is preferably from 0.01 to 5 μm.

The polyethylene-coated paper may be used as calendered paper, or it may be used as matte paper prepared in a process that, while applying polyethylene to base paper by melt extrusion coating, the so-called impress treatment is given to the polyethylene applied to render the polyethylene surface matte as is familiar in the case of photographic paper.

The support may be provided with a backing layer, and the backing layer can contain various additives including white pigment and water-based binder.

Examples of the white pigment containable in the backing layer include white inorganic pigments, such as precipitated calcium carbonate, ground calcium carbonate, kaolin, talc, calcium sulfate, barium sulfate, titanium dioxide, zinc oxide, zinc sulfate, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrohalloysite, magnesium carbonate and magnesium hydroxide; and organic pigments, such as styrene plastic pigment, acrylic plastic pigment, polyethylene microcapsules, urea resin and melamine resin.

Examples of the water-based binder usable in the backing layer include water-soluble high polymers, such as styrene-maleate copolymer, styrene-acrylate copolymer, polyvinyl alcohol, silanol-modified polyvinyl alcohol, starch, cationic starch, casein, gelatin, carboxymethyl cellulose, hydroxyethyl cellulose and polyvinyl pyrrolidone; and water-dispersible high polymers, such as styrene-butadiene latex and acrylic emulsion.

Examples of other ingredients containable in the backing layer can contain include a defoaming agent, an antifoaming agent, a dye, a brightening agent, an antiseptic and a water resistance imparting agent.

(Preparation of Ink-jet Recording Material)

The ink-jet recording material according to the invention has no particular restriction as to the method of providing an ink-receiving layer, but the coating methods hitherto known can be used for providing the ink-receiving layer. For instance, the ink-receiving layer can be provided using an extrusion coater, an air doctor coater, a blade coater, a rod coater, a knife coater, a squeegee coater, a reverse roll coater or a bar coater. The ink-receiving layer provided on a support may have the form of a single layer, or may take a multilayer structure. And it may further have an ink solvent absorbing layer, an interlayer and a protective layer. It is allowable to make the inorganic mordant used in the invention be present throughout the ink-receiving layer or be present in the vicinity of the ink-accepting surface.

In addition, it is preferable to form the ink-receiving layer, e.g., in the following process (wet-on-wet process): Specifically, a first coating solution containing at least a particulate substance and a water-soluble resin (referred to as "coating Solution A", too) is coated on a support surface, and further thereto a second coating solution containing at least a basic compound and being adjusted to pH 7.1 or higher (referred to as coating Solution B, too) is applied (1) simultaneously with the coating or (2) during drying of the coating layer formed with the coating Solution A and before the coating layer shows a drying shrinkage speed, and then the second coating solution-applied coating layer is cured by cross-linking.

Herein, it is preferable that the compounds according to the invention, which contain at least two species of di- or higher-valent metal atoms on a per-molecule basis, are incorporated in at least either the coating Solution A or the coating Solution B, especially in the coating Solution A. Additionally, the metal-containing compounds according to the invention can also be formed using the method in which part of the compounds containing di- or higher-valent metals capable of forming the present metal-containing compounds is incorporated into the first coating solution (coating Solution A), the remainder of the compounds containing di- or higher-valent metals is incorporated into the second coating solution (coating Solution B), and both are allowed to react with each other during the double-layer coating described below. Further, it is preferable that the cross-linking agent capable of cross-linking the water-soluble resin can also be incorporated in at least either the coating Solution A or the coating Solution B. And providing the ink-receiving layer cured by cross-linking in the foregoing manner is advantageous from the viewpoints of ink absorption and prevention of film cracking.

In the invention, the coating Solution A for an ink-receiving layer, which contains at least a particulate substance (e.g., vapor-phase process silica) and a water-soluble resin, can be prepared, e.g., in the following manner: Vapor-phase process particulate silica and a dispersant are added to water (so that the particulate silica concentration in water is, e.g., from 10 to 20% by mass), and dispersed over a period of, e.g., 20 minutes (preferably 10 to 30 minutes) by using a high-speed rotation-type wet colloidal mill (e.g., CLEARMIX made by MTECHNIQUE) under a high-rev condition, e.g., at 10,000 rpm (preferably 5,000 to 20,000 rpm). The resulting dispersion is admixed with a cross-linking agent (a boron compound) and a water solution of polyvinyl alcohol (PVA) (so that the ratio of the PVA to the vapor-phase process silica in the resulting admixture is about ⅓ by mass), and further admixed with a compound containing at least two species per molecule of di- or higher-valent metal atoms according to the invention, if the addition of this compound to the coating Solution A is desired, and then dispersed under the same condition as described above. The thus prepared coating Solution A is in a sol state. This solution is applied to a support and then dried, thereby forming a porous ink-receiving layer having a three-dimensional reticular structure.

Additionally, the preparation of an aqueous dispersion containing vapor-phase process silica and a dispersant may be performed by preparing in advance an aqueous dispersion of vapor-phase process silica and then adding the aqueous dispersion to an aqueous solution of dispersant, or by adding an aqueous solution of dispersant to the aqueoust dispersion of vapor-phase process silica, or by mixing them simultaneously. Alternatively, a powder of vapor-phase process silica is used instead of the aqueous dispersion, and the powder may be added to an aqueous solution of dispersant in the foregoing manner.

After mixing the vapor-phase process silica and the dispersion agent, the resulting mixture is subjected to micro-granulation treatment with a dispersing machine and thereby made into an aqueous dispersion having an average microgranule size of 50 to 300 nm. Examples of a dispersing machine usable herein include a dispersing machine of high-speed rotation type, a dispersing machine of medium agitation type (e.g., a ball mill, a sand mill), an ultrasonic dispersing machine, a colloid mill-type dispersing machine and a high-pressure dispersing machine. From the viewpoint of efficiently dispersing flocculates formed, an agitation-type dispersing machine, a colloid mill-type dispersing machine and a high-pressure dispersing machine are preferred over the others.

As a solvent in each step, water, an organic solvent and a mixture thereof can be used. Examples of the organic solvent usable in the coating process include alcohol compounds such as methanol, ethanol, n-propanol, i-propannol and methoxypropanol, ketones such as acetone and methyl ethyl ketone, tetrahydrofuran, acetonitrile, ethyl acetate and toluene.

As the dispersant, on the other hand, a cationic polymer can be used. Examples of such a cationic polymer include the organic mordants as recited above. In addition, silane coupling agents can be preferably used as the dispersant.

The suitable amount of the dispersant added is from 0.1% to 30%, preferably from 1% to 10%, to the amount of the particulate substance used.

After forming the ink-receiving layer on a support, it is possible to enhance the surface smoothness, glossiness, transparency and strength of the ink-receiving layer by subjecting the ink-receiving layer to a calendering treatment with a super calender or a gloss calender, wherein the ink-receiving layer is passed through roll nips under heated and pressurized conditions. However, the calendering treatment sometimes leads up to a drop in porosity (or a drop in ink absorbency), so it is required to set the calendering condition causing a slight drop in porosity.

The suitable roll temperature in performing the calendering treatment is from 30 to 150° C., preferably from 40 to 100° C.

And the suitable linear pressure between rolls during the calendering treatment is from 50 to 400 kg/cm, preferably from 100 to 200 kg/cm.

In the case of ink-jet recording, it is required to determine the layer thickness of an ink-receiving layer in relation to the porosity in the layer, because the layer is required to have an absorptive capacity high enough to absorb all of ink drops. In a case where the quantity of ink is 8 nL/mm$^2$ and the porosity is 60%, for instance, the ink-receiving layer is required to have a thickness of at least about 15 μm.

In view of the foregoing point, it is preferable in the case of ink-jet recording that the thickness of the ink-receiving layer is in the range of 10 to 50 μm.

The suitable diameter of pores in the ink-receiving layer is from 0.005 to 0.030 μm, preferably from 0.01 to 0.025 μm, in terms of median diameter.

The porosity and the mediam diameter of pores can be measured with a mercury porosimeter (Poresizer 9320-PC2, trade name, a product of Shimadzu Corporation).

Further, it is desirable that the ink-receiving layer has excellent transparency. One measure of the transparency is what haze value the ink-receiving layer has when it is formed on a transparent support, and the haze value is preferably 30% or below, far preferably 20% or below.

The haze value can be measured with a hazemeter (HGM-2DP made by SUGA TEST INSTRUMENTS Co., Ltd.).

To a constituent layer (e.g., an ink-receiving layer or a backing layer) of the ink-jet recording material according to the invention, a dispersion of particulate polymer may also be added. This dispersion is used for the purpose of improving physical properties of the layer, specifically for stabilization of dimensions and prevention of curling, adhesion and cracking. The description of particulate-polymer dispersions can be found in JP-A-62-245258 and JP-A-10-228076. Additionally, the addition of a dispersion of particulate polymer having a low glass transition temperature (40° C. or below) to the mordant-containing layer makes it possible to prevent the layer from cracking and Curling. And the prevention of curling can also be effected by addition of a dispersion of particulate polymer having a high glass transition temperature to the backing layer.

Ink-jet recording materials according to the invention can be produced also using the methods described in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-2091 and JP-A-8-2093.

On the support, an undercoat layer may be provided for purposes of increase in adhesion of the support to the ink-receiving layer and proper adjustment of electric resistance.

Incidentally, the ink-receiving layer may be provided on one side of the support, or may be provided on both sides of the support for the purpose of preventing deformations, inclusive of curling. In a case where the recording medium is used for OHP and has the ink-receiving layer on only one side of the support, an antireflective coating can be provided on the other side or either side of the support for the purpose of heightening light transmission.

Further, boric acid or a boron compound can be coated on the side of the support to face the ink-receiving layer, and on this coating the ink-receiving layer may be formed. By doing so, the glossiness and surface smoothness can be ensured for the ink-receiving layer, and besides, the ageing-induced blur of images, which is attributed to storage under high temperature and humidity conditions after printing, can be controlled.

(Ink-jet recording method)

The ink-jet recording in the invention is not particularly restricted as to the recording system, but can be performed using any of known systems, including a charge control system utilizing electrostatic induction force for jetting ink, a drop-on-demand system utilizing vibration pressure of piezo-electric element (pressure pulse system), an acoustic ink-jet system in which ink is irradiated with acoustic beams converted from electric signals and jetted by utilizing the radiation pressure, and a thermal jet system utilizing the pressure generated by formation of bubbles when ink is heated. In the ink-jet recording systems are further included a system of jetting many drops of low-concentration ink, or the so-called photo ink, at small volumes, a system of improving image quality by use of two or more varieties of ink which are of substantially same hue but different in concentration, and a system of using colorless and transparent ink.

The second invention is described below in detail.

The present ink composition is characterized in that a hue change occurring over a period of one hour immediately after printing images is controlled to 5 or below, preferably 3 or below, in color-difference terms.

Herein, the hue is represented by L*a*b* colorimetric reference system. And the color difference (ΔE) is given by $$\Delta E = \{(L1^* - L2^*)^2 + (a1^* - a2^*)^2 + (b1^* - b2^*)^2\}^{0.5}$$

when the hue immediately after printing is taken as E0 (L1*a1*b1*) and the hue after one-hour lapse from the printing is taken as E1 (L2*a2*b2*). The light source used herein is a white light source. The expression "immediately after printing" as used herein means a period of 5 minutes or shorter after the conclusion of printing. In determining E0 and E1, images printed under the same conditions and the same area of each of the images are used though the images may be printed with one ink composition or two or more ink compositions of different colors. In addition, the printing is carried out in environments air-conditioned at 25° C. and 60% RH, and reflective materials are used as the media.

ΔE can be measured with a color analyzer (e.g., a spectroscopic colorimeter, CM-3630, made by Minolta Inc.).

In order to control ΔE to 5 or below in the invention, dyes suffering no significant changes in their spectra after a lapse of time, compared with immediately after printing on media, are used as the dyes incorporated in ink compositions. In addition, it is also important to use a water-base vehicle selected to contribute to prevention of significant spectral changes of the dyes used. Specifically, selection of the water content in an ink composition and selection of the kind of a water-miscible organic solvent to use in combination with water become important. Further, as with the water-base vehicle, it is important to select constituent materials of a recording medium on which an ink composition is received in image form (with consideration given to the kind of fibers, the presence or absence of additives, such as a sizing agent and a mordant, and the kinds and structures of additives).

As to examples of such dyes, it is generally preferable to use dyes causing little change in their spectra when they undergo solvation, or dyes resistant to the so-called solvatochromism. Alternatively, it is also preferable to use dissociative dyes whose spectra differ greatly between the state in which protons are dissociated from their molecules and the state in which protons are not dissociated from their molecules and are almost fixed to the spectra in the dissociated state over a period of one hour immediately after printing. These dissociative dyes are anionically dissociative dyes, preferably water-soluble dyes which further contain proton-dissociating groups in their individual structural parts responsible for producing their colors. The term "anionically dissociative dyes" as used herein refers to the dyes whose bodies can be converted into anions by dissociation of their dissociative groups. In addition, the term "proton-dissociating group" as used herein refers to the group capable of dissociating a proton from itself and converting the body of a dye containing the group into an anion when the dye is dissolved and/or dispersed.

A dissociating group includes a hydroxyl group, a thiol group, a group containing a carbon atom present in the form of an active methylene or methine group, a group containing a nitrogen atom substituted by a strongly electron-attracting group, such as sulfonamido, and a group containing a protonated nitrogen atom. And examples of the dissociative group include —COOM, —SO$_3$M, —SO$_2$NH—, —CONHCO—, —COCH$_2$CO— and —P(=O)(OH)$_2$. Herein, M represents a hydrogen atom, an alkali metal or an ammonium (including quaternary ammoniums).

The dyes resistant to solvatochromism are dyes of the type which have fixed molecular structures and low numbers of freely moving chromophores and substituent groups. Examples of dyes of such a type include anthraquinone dyes, anthrapyridone dyes, phenothiazine dyes and oxazine dyes.

Examples of the foregoing dissociative dyes include azo and azomethine dyes which each include an electron structure comparable to phenol, naphthol or an analogue thereof and contain an anionically dissociative group and/or a proton-dissociating group on an aromatic hetero ring.

As other dissociative dyes, many dyes combined with functional compounds are known. Examples thereof include the compounds described in U.S. Pat. Nos. 4,559,290, 4,783,396, 4,139,389, 4,139,379, 4,783,796, 3,443,940, 4,336,322 and 4,500,626.

In the invention, it is preferable that the dye is a dye having a proton-dissociating group and the film surface pH of a medium on which images are printed is equivalent to or greater than the pKa of the dye.

The film surface pH can be determined by applying 1 ml of water to the medium and measuring the wetted surface with a pH electrode flat in its measuring section.

In the invention, a wide variety of dyes can be used. Specifically, any of synthetic and natural dyes, soluble in water or oil, may be used.

As to the kinds of usable dyes, various kinds of dyes, including azo dyes, azomethine dyes, nitro dyes, indigoid dyes, diphenylmethane dyes, triphenylmethane dyes, pyrazolone dyes, stilbene dyes, quinoline dyes, acid dyes, acridine dyes, indophenol dyes, indoaniline dyes, indamine dyes, azine dyes, thiazine dyes, thiazole dyes, sulfide dyes, oxide dyes, naphthamide dyes, benzoquinone dyes, naphthoquinone dyes, anthraquinone dyes, oxyketone dyes, phthalocyanine dyes, polymethine dyes, quinophthalone dyes, xanthene dyes, cyanine dyes, merocyanine dyes, oxonol dyes and anthrapyridone dyes, can be used.

Of these dyes, anionically dissociative dyes are preferred over the others as mentioned above. These dyes include direct dyes, acidic dyes, acid-processed vat dyes and mordant dyes.

Of the dyes of these kinds, dyes whose parts can be converted into anions by dissociation, wherein the anions constitute parts of dyes' conjugate systems (π-electron systems), are used to particular advantage.

As to these dyes, dyes used as pH indicators or mordant dyes in the photographic field are particularly suitable for use in the invention.

And it is preferable that the dyes have the dissociative groups in structural sections responsible for producing their colors. The structural sections responsible for producing colors include molecular structures from which the names of dyes are derived, preferably those of azomethine or azo dyes.

Examples of dyes usable in the invention are illustrated below. Herein, the symbols "Y-", "C-" and "M-" attached to the following structural formulae stand for yellow, cyan and magenta dyes, respectively.

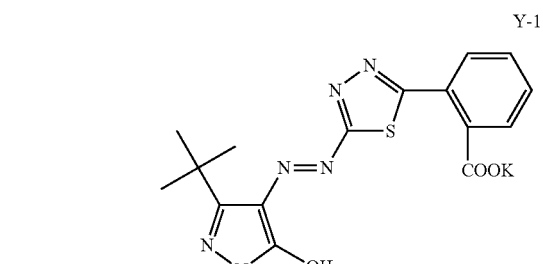

Y-1

Y-2

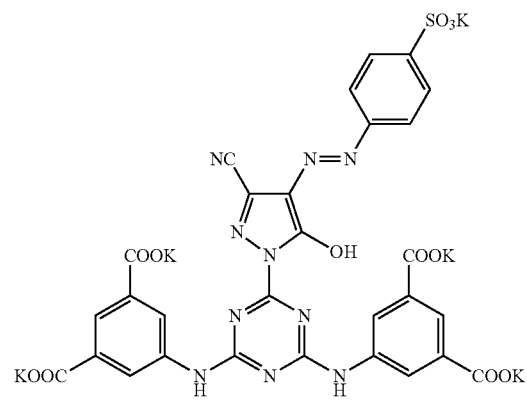

Y-4
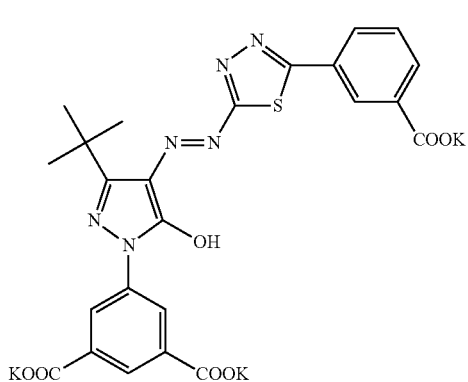
Y-5
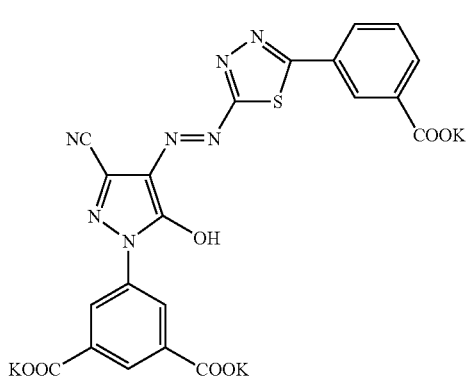
Y-6
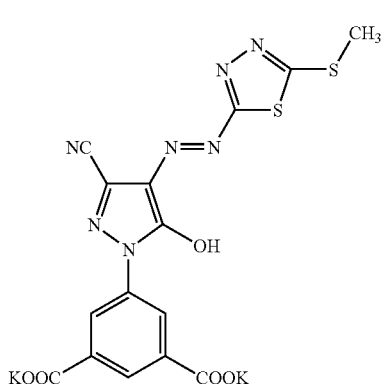
Y-7
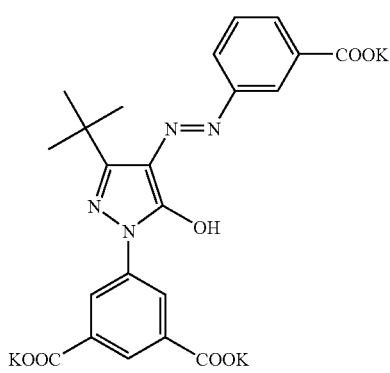
Y-8
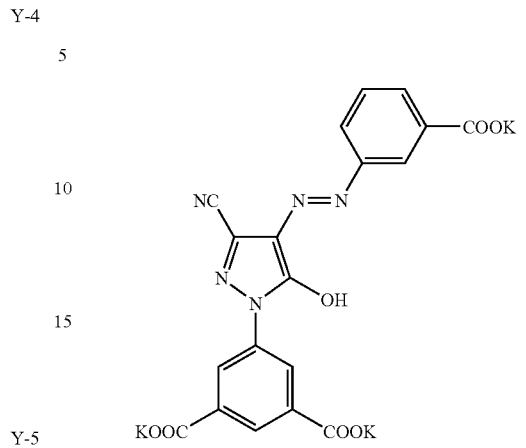
Y-9
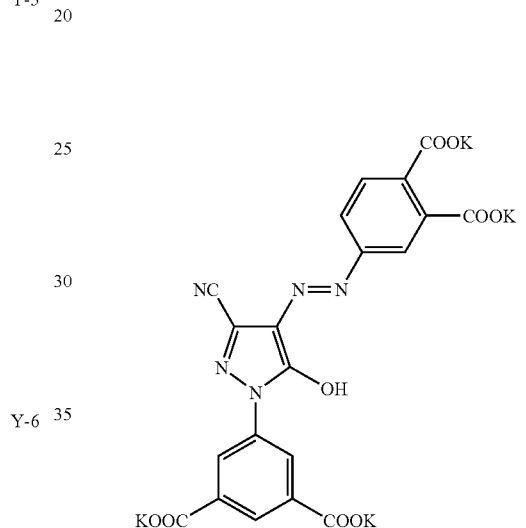
Y-10
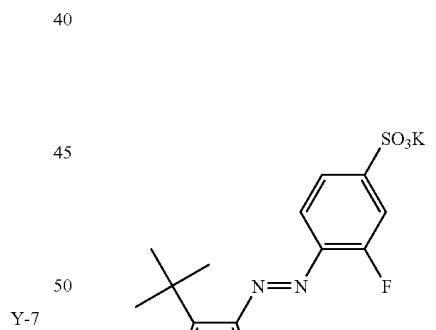
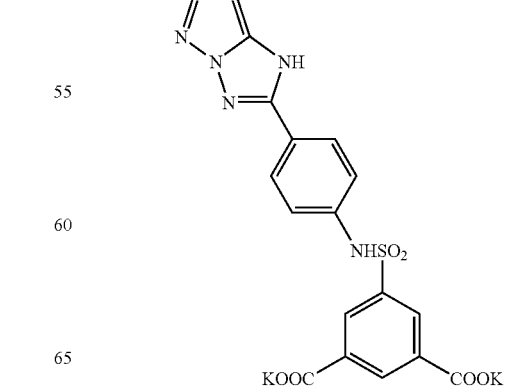

Y-11
Y-12
Y-13
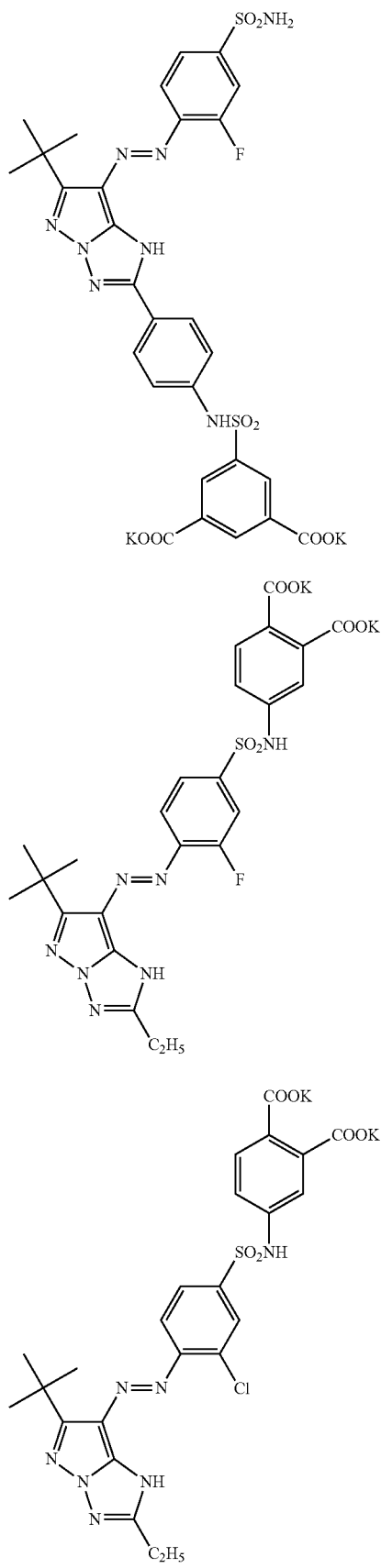
Y-14
Y-15
M-1
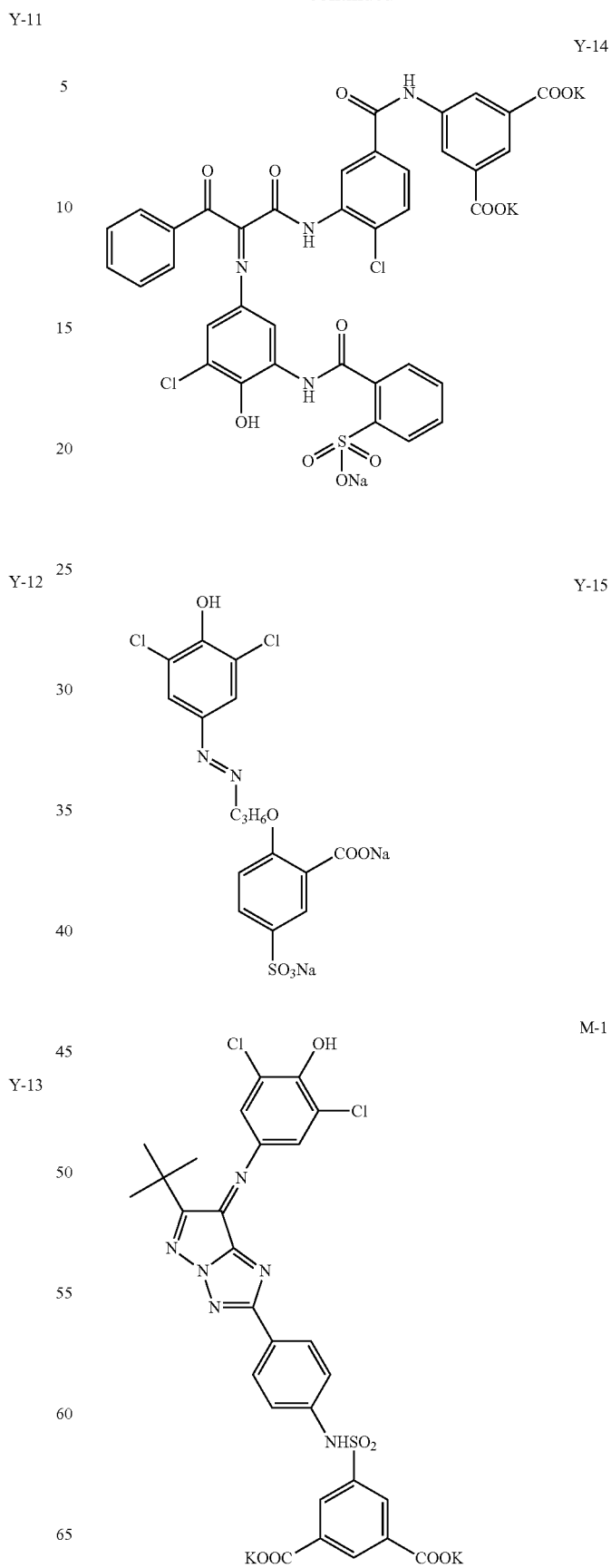

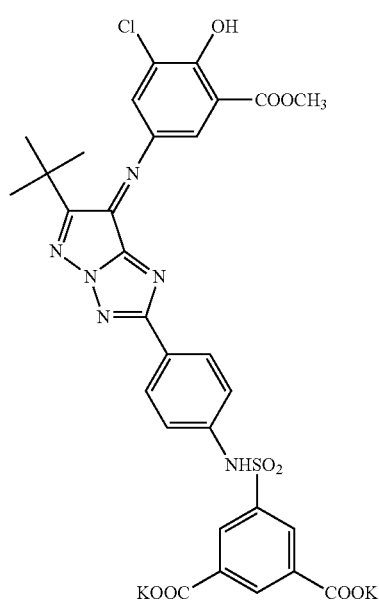
M-2
M-3
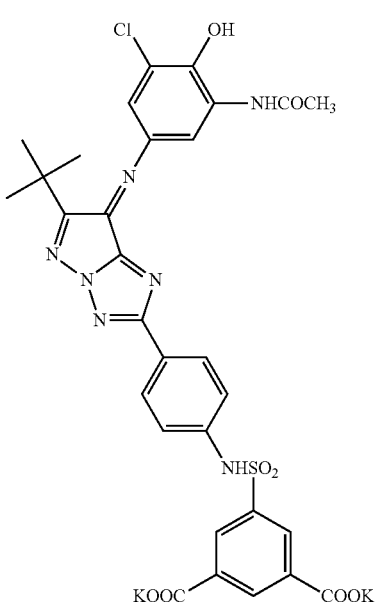
M-4
M-5
M-6

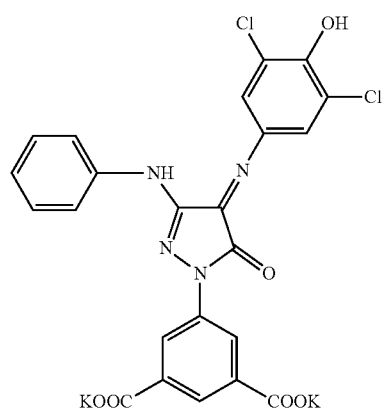
M-7
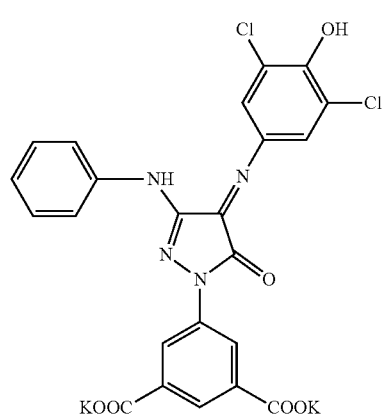
M-8
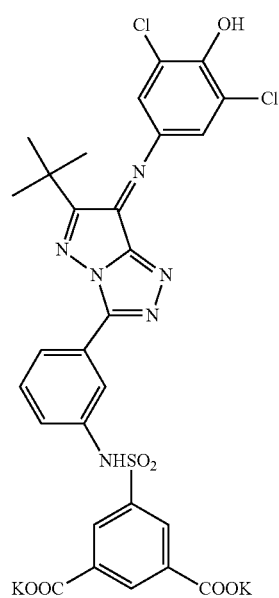
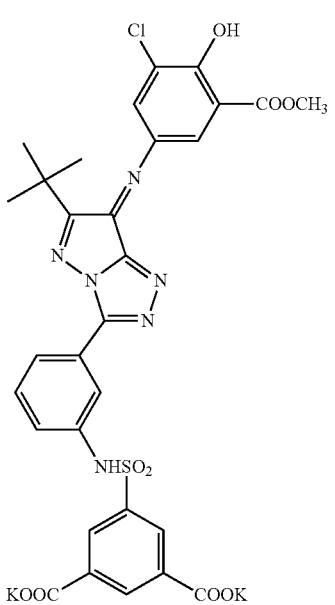
M-10
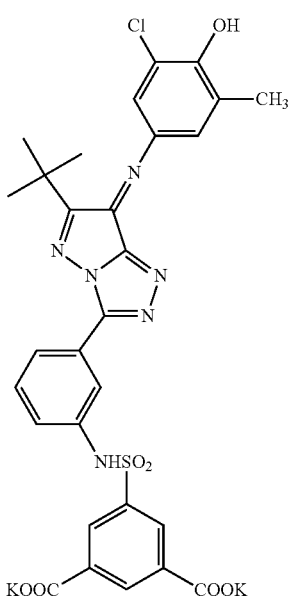
M-11

M-12 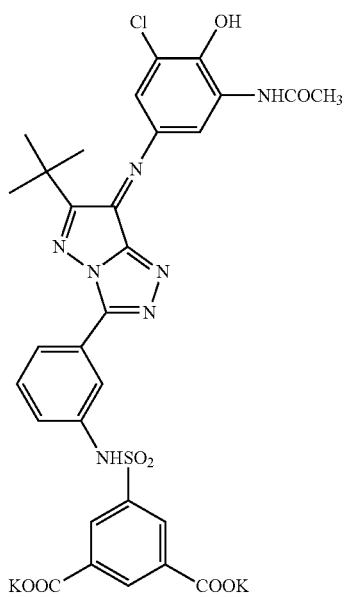
M-13 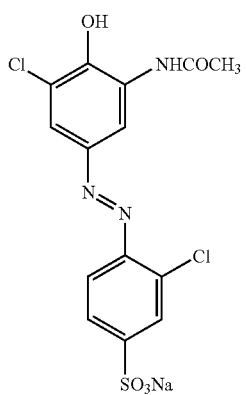
M-14 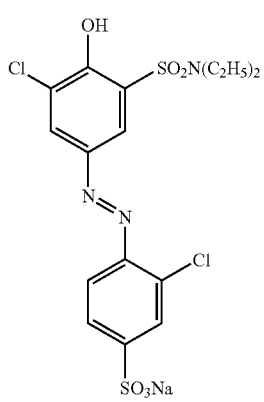
M-15 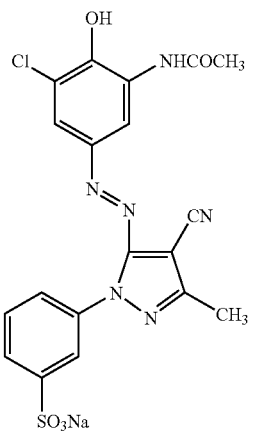
M-16 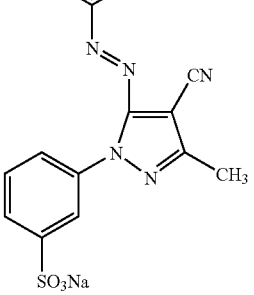
M-17 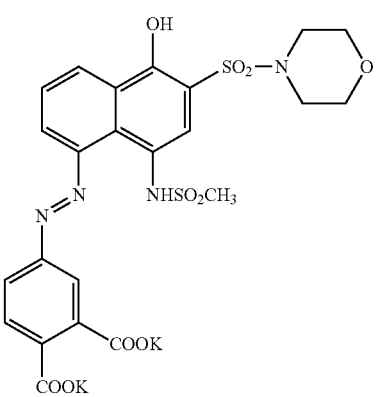
M-18 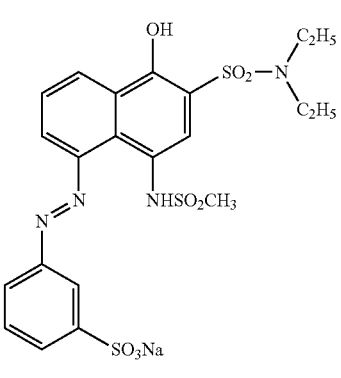

55
-continued
C-1
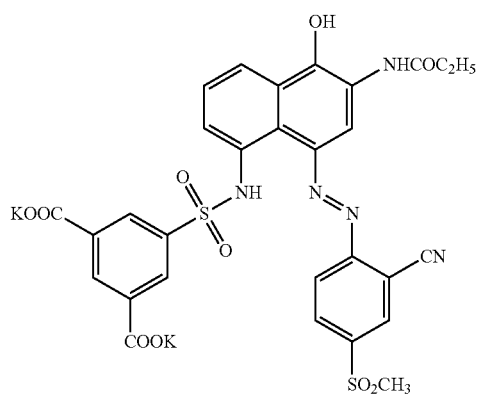
C-2
C-3
C-4
56
-continued
C-5
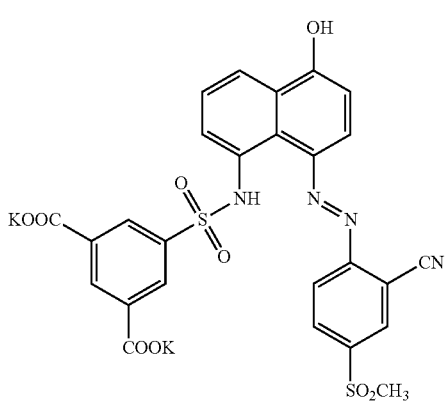
C-6
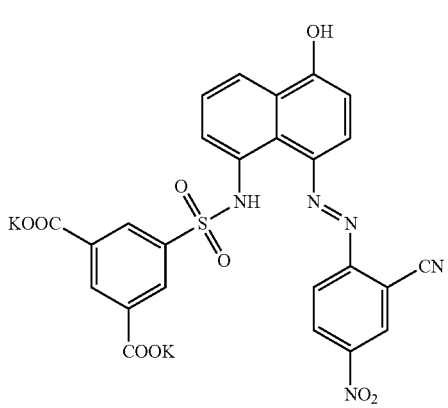
C-7
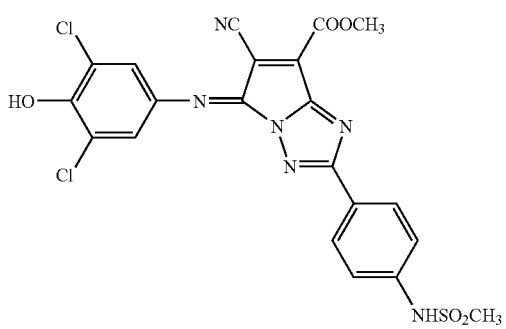
C-8
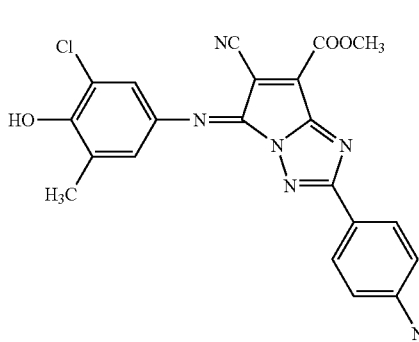

-continued

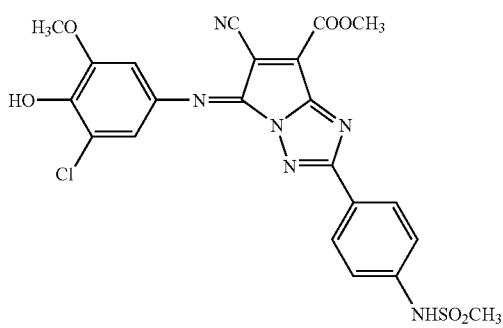

C-9

Further, ink compositions in which the dyes are used in combination with pigments can also be used in the invention.

The pigments usable in the invention are commercially available pigments and various known pigments as described in literature. As to the literature, for example, *Color Index* (compiled by The Society of Dyers and Colourists), *Kaitei Shinpan Ganryou Binran*, compiled by Nippon Ganryo Gijutsu Kyokai (1989), *Saishin Ganryo Oyo Giiutsu*, CMC Publishing Co., Ltd. (1986), *Insatsu Inki Gijutsu*, CMC Publishing Co., Ltd. (1984), and W. Herbst & K. Hunger, *Industrial Organic Pigments*, VCH Verlagsgesellschaft (1993) can be referred to. Examples of organic pigments usable in the invention include azo pigments (such as azo color lake, insoluble azo pigments, condensed azo pigments, chelate azo pigments), polycyclic pigments (such as phthalocyanine pigments, anthraquinone pigments, perylene and perynone pigments, indigo pigments, quinacridone pigments, dioxazine pigments, isoindolinone pigments, quinophthalone pigments, and diketopyrrolopyrrole pigments), lake pigments (color lakes of acid or basic dyes), and azine pigments. Examples of inorganic pigments usable in the invention include the yellow pigments of C.I. Pigment Yellow 34, 37, 42 and 53, the red pigments of C.I. Pigment Red 101 and 108, the blue pigments of C.I. Pigment Blue 27, 29 and 17:1, the black pigments of C.I. Pigment Black 7 and magnetite, and the white pigments of C.I. Pigment White 4, 6, 18 and 21.

Suitable examples of blue to cyan pigments having tones appropriate for image formation include phthalocyanine pigments, indanthrone pigments of anthraquinone type (e.g., C.I. Pigment Blue 60) and triarylcarbonium pigments of lake pigment type. The most suitable ones of these pigments are phthalocyanine pigments (with preferable examples including copper phthalocyanines, such as C.I. Pigment Blue 15:1, do. 15:2, do. 15:3, do. 15:4 and do. 15:6, mono- to low-chlorinated copper phthalocyanines, the aluminum phthalocyanine pigments disclosed in European Patent No. 860475, the metal-free phthalocyanine of C.I. Pigment Blue 16 and phthalocyanines containing Zn, Ni and Ti as their respective central metals). Of these phthalocyanine pigments, C.I. Pigment Blue 15:3, do. 15:4 and the aluminum phthalocyanine pigment are advantageous over the others.

Suitable examples of red to violet pigments having tones appropriate for image formation include azo pigments (with preferable examples including C.I. Pigment Red 3, do. 5, do. 11, do. 22, do. 38, do. 48:1, do. 48:2, do. 48:3, do. 48:4, do. 49:1, do. 52:1, do. 53:1, do. 57:1, do. 63:2, do. 144, do. 146 and do. 184, among which C.I. Pigment Red 57:1, do. 146 and do. 184 are particularly advantageous), quinacridone pigments (with preferable examples including C.I. Pigment Red 122, do. 192, do. 202, do. 207 and do. 209, and C.I. Pigment Violet 19 and do. 42, among which C.I. Pigment Red 122 is particularly advantageous), triarylcarbonium pigments of lake pigment type (with preferable examples including the xanthene pigments of C.I. Pigment Red 81:1 and C.I. Pigment violet 1, do. 2, do. 3, do. 27 and do. 39), dioxazine pigments (e.g., C.I. Pigment Violet 23 and do. 37), diketopyrrolopyrrole pigments (e.g., C.I. Pigment Red 254), perylene pigments (e.g., C.I. Pigment Violet 29), anthraquinone pigments (e.g., C.I. Pigment Violet 5:1, do. 31 and do. 33), and thioindigo pigments (e.g., C.I. Pigment Red 38 and do. 88).

Suitable examples of yellow pigments having tones desirable for image formation include azo pigments (with preferable examples including the monoazo pigments of C.I. Pigment Yellow 1, 3, 74 and 98, the disazo pigments of C.I. Pigment Yellow 12, 13, 14, 16, 17 and 83, general azo pigments of C.I. Pigment Yellow 93, 94, 95, 128 and 155, and the benzimidazolone pigments of C.I. Pigment Yellow 120, 151, 154, 156 and 180, among which the pigments derived from benzidine compounds are particularly advantageous), isoindoline/isoindolinone pigments (with preferable examples including C.I. Pigment Yellow 109, 110, 137 and 139), quinophthalone pigments (including C.I. Pigment Yellow 138 as a preferable example), and flavanthrone pigments (e.g., C.I. Pigment Yellow 24).

Suitable black pigments are inorganic pigments (including carbon black and magnetite as preferable examples) and aniline black.

In addition, orange pigments (e.g., C.I. Pigment Orange 13 and 16) and green pigments (e.g., C.I. Pigment Green 7) may be used.

The pigments used in the invention may be bare pigments or surface-treated pigments. Methods thought to be usable for surface treatment of pigments include a method of coating the pigment surface with resin or wax, a method of causing surfactants to adhere to the pigment surface, and a method of binding a reactive substance (e.g., a silane coupling agent, and radicals produced from epoxy compounds, polyisocyanates and diazonium salts) to the pigment surface. These methods are written in the following literature and patents.

(1) *Kinzoku Sekken no Seishitsu to Oyo* (SAIWAI SHOBO)
(2) *Insatsu Inki Insatsu* (CMC Publishing Co., Ltd., 1984)
(3) *Saishin Ganryo Oyo Gijutsu* (CMC Publishing Co., Ltd., 1986)
(4) U.S. Pat. Nos. 5,554,739 and 5,571,311
(5) JP-A-9-151342, JP-A-10-140065, JP-A-10-292143 and JP-A-11-166145

The self-dispersible pigments prepared by reacting diazonium salts with carbon black as disclosed in the above U.S. Patents (4), and the encapsulated pigments prepared by the methods disclosed in the above Japanese Patents (5) are used to a particular advantage because high dispersion stability can be obtained without using any additional dispersant in ink compositions.

In the invention, pigments may also be dispersed with the aid of dispersants. The dispersants can be chosen from various known ones, such as low molecular dispersants of surfactant type and polymeric dispersants, to suit the pigments used. Examples of such dispersants include those described in JP-A-3-69949 and European Patent No. 549486. In the case of using dispersants, pigment derivatives referred to as synergists may further be added for the purpose of promoting adsorption of the dispersants to the pigments.

The grain sizes of pigments usable in the invention are preferably within the range of 0.01 to 10 μm, far preferably from 0.05 to 1 μm, after dispersion.

In dispersing pigments, known dispersing techniques used for preparation of ink compositions or those used for toner production can be adopted. Examples of a dispersing machine usable therein include a vertical or horizontal agitator mill, an attrition mill, a colloid mill, a ball mill, a three-roll mill, a pearl mill, a super mill, an impeller, a disperser, a KD mill, a dynatron, and a pressure kneader. Details of the dispersing machines are described, e.g., in *Saishin Ganryo Oyo Gijutsu*, CMC Publishing Co., Ltd. (1986).

The present ink compositions can be prepared, e.g., by incorporating, preferably dissolving and/or dispersing, the dyes as specified above into water-base vehicles. The term "water-base vehicles" as used in the invention is intended to include water and admixtures of water with ingredients added as required, such as solvents including water-miscible organic solvents, humectants, stabilizers and preservatives. The present ink compositions are especially suitable for use in inkjet recording.

The water-miscible organic solvents usable in the invention are materials known in the field concerned to have functions as an anti-drying agent, a permeation accelerator and a humectant in ink compositions for inkjet recording. Of these materials, water-miscible organic solvents having high boiling points are used in most cases. Examples of such organic solvents include alcohol (e.g., methanol, ethanol, propanol, isopropanol, butanol, isobutanol, sec-butanol, t-butanol, pentanol, hexanol, cyclohexanol, benzyl alcohol), polyhydric alcohol (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine), and other polar solvents (e.g., formamide, N,N-dimethylformamide, N,N-dimethylacetamide, dimethyl sulfoxidel, sulfolane; 2-pyrrolidone, N-methyl-2-pyrrolidone; N-vinyl-2-pyrrolidone, 2-oxazolidone, 1,3-dimethyl-2-imidazolidinone, acetonitrile, acetone). Additionally, these water-miscible organic solvents may be used as combinations of two or more thereof.

Of these solvents, alcohol solvents are preferred over the others.

It is preferable that the total content of those water-miscible organic solvents in an ink composition is from 5 to 60% by mass, particularly preferably from 10 to 45% by mass.

In preparation of the present ink compositions, the first thing to do is preferably to dissolve the dyes as specified above in water when they are water-soluble dyes. Thereafter, various solvents and additives are added thereto, and subjected to mixing and dissolving operations, thereby preparing homogeneous ink compositions.

As methods for performing the dissolving operation, various methods, such as dissolution by stirring, dissolution by exposure to ultrasonic waves and dissolution by shaking, can be adopted. Of these methods, stirring in particular is used to advantage. The stirring can be performed using various methods known in the field concerned, such as flow stirring and shear-stress-utilized stirring wherein a reversing agitator or a dissolver is used. Alternatively, a stirring method utilizing shearing stress against the bottom of a vessel as in the case of a magnetic stirrer can be used to advantage.

Adjustments to liquid properties of the present ink compositions by addition of surfactants can bring about improvement in jetting consistency of the ink compositions and can have excellent effects on enhancement of water resistance of the images formed and prevention of bleeding of the printed ink composition.

Examples of surfactants usable in the present ink compositions include anionic surfactants, such as sodium dodecylsulfate, sodium dodecyloxysulfonate and sodium alkylbenzenesulfonate, cationic surfactants, such as cetylpyridinium chloride, trimethylcetylammonium chloride and tetrabutylammonium chloride; and nonionic surfactants, such as polyoxyethylene nonyl phenyl ether, polyoxyethylene naphthyl ether and polyoxyethylene octyl phenyl ether. Of these surfactants, nonionic surfactants in particular are used to advantage.

The content of surfactants in an ink composition is from 0.001 to 20% by mass, preferably from 0.005 to 10% by mass, far preferably from 0.01 to 5% by mass.

When the dyes as specified above are oil-soluble dyes, the present ink compositions can be prepared by dissolving the oil-soluble dyes in high boiling organic solvents and then dispersing the dissolved dyes into water-base vehicles in an emulsified state.

The high boiling organic solvents usable in the invention are organic solvents having boiling points of 150° C. or higher, preferably 170° C. or higher.

Examples of such organic solvents include phthalic acid esters (such as dibutyl phthalate, dioctyl phthalate, dicyclohexyl phthalate, di-2-ethylhexyl phthalate, decyl phthalate, bis(2,4-di-tert-amylphenyl) isophthalate and bis(1,1-diethylpropyl) phthalate), phosphoric or phosphonic acid esters (such as diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate and di-2-ethylhexxylphenyl phosphate), benzoic acid esters (such as 2-ethylhexylbenzoate, 2,4-dichlorobenzoate, dodecylbenzoate and 2-ethylhexyl-p-hydroxybenzoate), amides (such as N,N-diethyldodecanamide and N,N-diethyllauryamide), alcohol compounds (such as isostearyl alcohol), aliphatic esters (such as dibutoxyethyl succinate, di-2-ethylhexyl succinate, 2-hexyldecyl tetradecanoate, tributyl citrate, diethyl azelate, isostearyl lactate and trioctyl citrate), aniline derivatives (such as N,N-dibutyl-2-butoxy-5-tert-octylaniline), chlorinated paraffin (such as paraffin having a chlorine content of 10 to 80%), trimesic acid esters (such as tributyl trimesate), dodecylbenzene, diisopropylnaphthalene, phenol compounds (such as 2,4-di-tert-amylphenol, 4-dodecyloxyphenol, 4-dodecyloxycarbonylphenol and 4-(4-dodecyloxyphenylsulfonyl)phenol), carboxylic acids (such as 2-(2,4-di-tert-amylphenoxy)butyric acid and 2-ethoxyoctanedecanoic acid), and alkylphosphoric acids (such as di-2-(ethylhexyl) phosphoric acid and diphenylphosphoric acid). The ratio of the amount of a high boiling organic solvent used to the amount of oil-soluble dyes dissolved therein is from 0.01 to 3, preferably from 0.01 to 1.0, by mass.

Those high boiling organic solvents may be used alone or as a mixture of two or more thereof (e.g., a mixture of tricresyl phosphate and dibutyl phthalate, a mixture of trioctyl phosphate and di(2-ethylhexyl)sebacate, a mixture of dibutyl phthalate and poly(N-t-butylacrylamide).

Examples of high boiling organic solvents usable in the invention, other than the above-recited ones, and/or synthetic methods of these high boiling organic solvents are described, e.g., in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253. EP-A-289820, EP-A-309158, EP-A-309159, EP-A-309160, EP-A-509311 and EP-A-510576, East German Patent Nos. 147,009, 157,147, 159,573 and 225,240A, GB-A-2091124, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

The above high boiling organic solvents are also used in a proportion of 0.01 to 3.0 parts by mass, preferably 0.01 to 1.0 parts by mass, to 1 parts by mass of oil-soluble dyes.

In the invention, oil-soluble dyes and high boiling organic solvents are used in a state that they are emulsified and dispersed in water-base vehicles. In the emulsifying and dispersing operations, low boiling organic solvents can be used in some cases from the viewpoint of emulsifying efficiency. Herein, organic solvents having their boiling points in the range of about 30° C. to about 150° C. under normal atmospheric pressure are defined as low boiling organic solvents. Suitable examples of such solvents include esters (e.g., ethyl acetate, butyl acetate, ethyl propionate, β-ethoxyethyl acetate, methyl cellosolve acetate), alcohol compounds (e.g., isopropyl alcohol, n-butyl alcohol, sec-butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofulran, dioxane). However, low boiling organic solvents usable in the invention should not be construed as being limited to those examples.

Emulsification is carried out in order that an oil phase of a dye or dyes dissolved in a high boiling organic solvent or, in some cases, in a mixture of high boiling and low boiling organic solvents is formed into fine droplets when dispersing the oil phase into a water phase made up mainly of water. Herein, additives as described below, e.g., surfactants, humectants, dye stabilizers, emulsion stabilizers, antiseptics and fungicides, can be added to either the water phase or the oil phase, or both on an as needed basis.

The method generally used for emulsification is a method of adding an oil phase to a water phase. Alternatively, a method of dripping a water phase into an oil phase, or the so-called phase inversion emulsification, is also used to advantage. The emulsification methods are also applicable to the cases where the additives are oil-soluble substances although the dyes used are water-soluble dyes.

In preparing dispersions in an emulsified state, various kinds of surfactants can be used. Examples of surfactants suitable therein include anionic surfactants, such as fatty acid salts, alkylsulfates, alkylbenzenesulfonates, alkylnaphthalenesulfonates, dialkylsulfosuccinates, alkylphosphates, naphthalenesulfonic acid-formaldehyde condensates and polyoxyethylene alkylsulfates; and nonionic surfactants, such as polyoxyethylene alkyl ethers, polyoxyethylene alkyl aryl ethers, polyoxyethylene fatty acid esters, sorbitan fatty acid esters, polyoxyethylene sorbitan fatty acid esters, polyoxyethylene alkylamines, glycerin fatty acid esters and oxyethylene-oxypropylene block copolymers. In addition, the acetylene series polyoxyethylene oxide surfactants of SURFYNOLS (produced by Air Products and Chemicals Inc.) are also suitable. Further, amphoteric surfactants of amine oxide type, such as N,N-dimethyl-N-alkylamine oxides, are usable as well. Furthermore, the surfactants disclosed in JP-A-59-157636, pp. 37-38, and *Research Disclosure*, No. 308119 (1989), can be used.

For the purpose of aiming at stabilizing dispersions just after emulsification, water-soluble polymers can be added in combination with the surfactants as recited above. Examples of water-soluble polymers usable for such a purpose include polyvinyl alcohol, polyvinyl pyrrolidone, polyethylene oxide, polyacrylic acid, polyacrylamide, and copolymers prepared from two or more of monomers constituting the homopolymers recited above. In addition, it is also suitable to use natural water-soluble polymers, such as polysaccharide, casein and gelatin. For further stabilization of dye dispersions, polymers substantially insoluble in water-base vehicles can also be used in combination with water-soluble polymers as recited above. Examples of such insoluble polymers include vinyl polymers prepared by polymerizing acrylic acid esters, methacrylic acid esters, vinyl esters, acrylamides, methacrylamides; olefins, styrene compounds, vinyl ethers or/and acrylonitriles, polyurethane, polyester, polyamide, polyurea and polycarbonate. For the above purpose, it is preferable that those polymers contain —$SO_3^-$ or —$COO^-$ groups. When the polymers substantially insoluble in water-base vehicles are used, the amount thereof is preferably at most 20 mass %, far preferably at most 10 mass %, of the amount of high boiling organic solvents used in combination.

In preparing water-base ink compositions by dispersing oil-soluble dyes and high boiling organic solvents in an emulsified state, the particle size control is especially important. For enhancement of color purity and density of images formed by inkjet recording, it is required to reduce an average particle size. The volume-average particle size is preferably 1 μm or below, far preferably from 5 to 100 nm.

The volume average size and the size distribution of the dispersed particles can be easily determined by known methods including a static light-scattering method, a dynamic light-scattering method, a centrifugal sedimentation method and the methods described in *Jikken Kagaku Koza,* 4th ed., pp. 417-418. For instance, the volume-average particle size is easily determined by diluting an ink composition with distilled water so as to adjust a particle concentration in the composition to 0.1-1% by mass, and using a commercially available volume-average particle size analyzer (e.g., Microtrac UPA, made by Nikkiso Co., Ltd.). Further, the laser Doppler effect-utilized dynamic light-scattering method is used to particular advantage because it allows particle size measurement down to fine sizes.

The term "volume-average particle size" refers to the average particle size determined by assigning a weight depending on a volume of each particle to its size, or the value obtained by dividing the sum total of products of diameters and volumes of individual particles in a set of particles by the total volume of the particles. The description of the volume-average particle size can be found, e.g., in Soichi Muroi, *Kobunshi Latex no Kagaku,* p. 119, Kobunshi Kanko-Kai.

Further, it has been found out that the presence of coarse particles also plays an important role in the printability. In other words, the coarse particles clog nozzles of a printing head, or form dregs even if clogging of the nozzles is not yet caused; as a result, it becomes impossible to jet the ink, or kinks are formed in the jet of ink composition to exert a serious influence on printability. For prevention of such a problem, it is significant to control the number of particles not smaller than 5μm to at most 10 and the number of particles not smaller than 1 μm to at most 1,000 per μl of the ink composition prepared.

As a method for eliminating such coarse particles, a known centrifugal separation method or precision filtering method can be adopted. Such a separating operation may be performed just after dispersion by emulsification or during a period between the end of addition of various additives, such as humectants and surfactants, to the dispersion in an emulsified state and the instant preceding the load into an ink cartridge.

As an effective measure to reduce the average size of particles and eliminate coarse particles, a mechanically emulsifying apparatus can be adopted.

As the emulsifying apparatus, known apparatus of various types, such as a simple stirrer type, an impeller stirrer type, an in-line stirrer type, a mill type such as a colloid mill, and an ultrasonic wave type, may be used, but a high-pressure homogenizer in particular can be used to advantage.

The detailed mechanisms of high-pressure homogenizers are disclosed, e.g., in U.S. Pat. No. 4,533,254 and JP-A-6-47264. And Gaulin Homogenizer (made by A.P.V GAULIN INC.), Microfluidizer (made by MICROFLUIDEX INC.) and Multimizer (made by SUGINO MACHINE LIMITED) are commercially available as high-pressure homogenizers.

In addition, the latest model of high-pressure homogenizer as disclosed in U.S. Pat. No. 5,720,551, which is equipped with a mechanism to form fine particles in an ultrahigh-pressure jet stream, is particularly effective in preparing the present dispersion by emulsification. An example of such an ultrahigh-pressure jet stream-utilized emulsifying apparatus is DeBEE 2000 (made by BEE INTERNATIONAL LTD.).

The pressure at the time of emulsification with a high-pressure emulsifying and dispersing apparatus is at least 50 MPa, preferably at least 60 MPa, and far preferably at least 180 MPa.

One particularly preferred method is a method of using at least two types of emulsifying apparatus in combination, e.g., a method of using a stirrer-type emulsifying apparatus first and then passing through a high-pressure homogenizer. Another method used to advantage is a method of once performing an emulsifying and dispersing operation with the combination of different types of emulsifying apparatus, then adding additives such as a humectant and a surfactant, and passing again through a high-pressure homogenizer while loading the ink composition into a cartridge.

When not only a high boiling organic solvent but also a low boiling organic solvent is contained in an emulsion, it is appropriate to remove the low boiling organic solvent from the emulsion in terms of emulsion stability and for reasons of safety and hygiene. The method of removing a low boiling organic solvent can be chosen from known methods depending on the kind thereof More specifically, evaporation, vacuum evaporation and ultrafiltration methods are applicable. And it is preferable that such a removal operation is performed at the earliest possible stage after emulsification.

Methods of preparing ink compositions for inkjet recording are described in detail, e.g., in JP-A-5-148436, JP-A-5-295312, JP-A-7-97541, JP-A-7-82515 and JP-A-7-118584, and these methods are also applicable to preparation of the present ink compositions.

Into the present ink compositions, functional ingredients can be mixed in order to impart various functions to the ink compositions. Examples of functional ingredients include various solvents as recited above, an anti-drying agent for preventing the ink compositions from clogging in nozzles due to drying, a permeation accelerator for enabling better permeation of ink into paper, an ultraviolet absorbent, an anti-oxidant, a viscosity modifier, a surface tension modifier, a dispersant, a dispersion stabilizer, a fungicide, a corrosion inhibitor, a pH modifier, an antifoam agent and a chelating agent. The present ink compositions can use functional ingredients properly selected from the agents as recited above in appropriate amounts: In those functional ingredients are included compounds which-i each can combine one function with another function. In mixing such a compound as to combine two or more functions, the compound is therefore counted in the mixing proportions of ingredients having functions corresponding to its functions, respectively.

The anti-drying agent suitable for use in the invention is a water-soluble organic solvent lower in vapor pressure than water. Examples of such a solvent include polyhydric alcohol compounds, typified by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylolpropane; lower alkyl ethers of polyhydric alcohol compounds, such as ethylene glycol monomethyl (or monoethyl) ether, diethylene glycol monomethyl (or monoethyl) ether and tri-ethylene glycol monoethyl (monobutyl) ether; heterocyclic compounds, such as 2-pyrrolidone, N-methyl-2-pyrrolidone, 1,3-dimethyl-2-imidazolidine and N-ethylmorpholine; sulfur-containing compounds, such as sulfolane, dimethylsulfoxide and 3-sulfolene; polyfunctional compounds, such as diacetone alcohol and diethanolamine; and urea derivatives. Of these compounds, polyhydric alcohol compounds, such as glycerin and diethylene glycol, are preferred over the others. These anti-drying agents can be used alone or as combination of two or more thereof. The suitable proportion of these anti-drying agents in the present ink composition is from 10 to 50% by mass.

Examples of a permeation accelerator usable in the invention include alcohol compounds, such as ethanol, isopropanol, butanol, di(tri)ethylene glycol monobutyl ether and 1,2-hexanediol, sodium laurylsulfate, sodium oleate, and nonionic surfactants. When such a permeation accelerator is contained in the ink composition in a proportion of 10 to 30% by mass, it can produce sufficient effect. And it is preferable to add the permeation accelerator in an amount not to cause blurring of printed images and print through.

Examples of an ultraviolet absorbent usable for improving the keeping quality of the images printed in the invention include the benzotriazole compounds as described in JP-A-58-185677, JP-A-61-190537, JP-A-2-782, JP-A-5-197075 and JP-A-9-34057, the benzophenone compounds as described in JP-A-46-2784, JP-A-5-194483 and U.S. Pat. No. 3,214,463, the cinnamic acid compounds as described in JP-B-48-30492, JP-B-56-21141 and JP-A-10-88106, the tri-azine compounds as described in JP-A-4-298503, JP-A-8-53427, JP-A-8-239368, JP-A-10-182621 and JP-T-8-501291, the compounds described in *Research Disclosure*, No. 24239, and the compounds showing fluorescence by absorbing ultraviolet rays, or the so-called fluorescent whitening agents, typified by stilbene compounds and benzoxazole compounds.

As the antioxidants for improving the keeping quality of images printed in the invention, various fading inhibitors of organic compound type and metal complex type can be used. Examples of a fading inhibitor of organic compound type include hydroquinones, alkoxyphenols, dialkoxyphenols, phenols, anilines, amine, indanes, chromans, alkoxyanilines, and heterocyclic compounds. Examples of a fading inhibitor of metal complex type include nickel complexes and zinc complexes. More specifically, the compounds disclosed in the patents cited in *Research Disclosure*, No. 17643, Items VII-I to VII-J, No. 15162; No. 18716, p. 650, left column, No. 36544, p. 527, No. 307105, p. 872, and No. 15162, and the compounds included in the general formulae and the examples of the representative compounds described in JP-A-62-215272, pp. 127-137, can be used as fading inhibitors.

Examples of a fungicide usable in the invention include sodium dehydroacetate, sodium benzoate, sodium pyridinethione-1-oxide, ethyl p-hydroxybenzoate, and 1,2-benzoisothiazoline-3-one and salts thereof The suitable proportion of these compounds in the ink composition is from 0.02 to 5.00% by mass.

For details of such fungicides *Bokin Bobaizai Jiten* (compiled by Nippon Bokin Bobai Gakkai Jiten Henshu Iinkai) can be referred to.

Examples of a corrosion inhibitor usable in the invention include acidic sulfite, sodium thiosulfate, ammonium thioglycolate, diisopropylammonium nitrite, pentaerythritol tetranitrate, dicyclohexylammonium nitrite and benzotriazole. The suitable proportion of these compounds in the ink composition is from 0.02 to 5.00% by mass.

The use of a pH modifier in the invention is favorable for controlling pH and providing dispersion stability, and it is preferable that the ink composition is adjusted to pH 8-11 at 25° C. When the pH of the ink composition is lower than 8, the solubility of dyes is lowered and the ink composition tends to clog nozzles; while, when the pH of the ink composition is higher than 11, the ink composition tends to suffer deterioration in water resistance. As basic pH modifiers, organic bases and inorganic alkalis are usable, and organic acids and inorganic acids are usable as acidic pH modifiers.

Examples of a basic compound usable as the pH modifier include inorganic compounds, such as sodium hydroxide, potassium hydroxide, sodium carbonate, potassium carbonate, sodium hydrogen carbonate, potassium hydrogen carbonate, sodium acetate, potassium acetate, sodium phosphate and sodium monohydrogen phosphate; and organic bases, such as aqueous ammonia, methylamine, ethylamine, diethylamine, triethylamine, ethanolamine, diethanolamine, triethanolamine, ethylenediamine, piperidine, diazabicychlooctane, diazabicycloundecene, pyridine, quinoline, picoline, lutidine and collidine.

Examples of an acidic compound usable as the pH modifier include inorganic compounds, such as hydrochloric acid, sulfuric acid, phosphoric acid, boric acid, sodium hydrogen sulfate, potassium hydrogen sulfate, potassium dihydrogen phosphate and sodium dihydrogen phosphate; and organic compounds, such as acetic acid, tartaric acid, benzoic acid, trifluoroacetaic acid, methanesulfonic acid, ethanesulfonic acid, benzenesulfonic acid, p-toluenesulfonic acid, saccharic acid, phthalic acid, picolinic acid and quinolinic acid.

The present ink composition has its conductivity within the range of 0.01 to 10 S/m. And the range of 0.05 to 5 S/m in particular is suitable as the conductivity of the present ink composition.

The conductivity can be determined in accordance with an electrode method using commercially available saturated potassium chloride.

The conductivity can be controlled mainly by ion concentrations in aqueous solutions. When salt concentrations are high, the salts can be removed with an ultrafilter membrane. When the conductivity is controlled by addition of salts, on the other hand, various kinds of organic and inorganic salts can be used.

Examples of an inorganic salt usable therein include potassium halides, sodium halides, sodium sulfate, potassium sulfate, sodium hydrogen sulfate, potassium hydrogen sulfate, sodium nitrate, potassium nitrate, sodium hydrogen carbonate, potassium hydrogen carbonate, sodium phosphate, sodium monohydrogen phosphate, boric acid, potassium dihydrogen phosphate and sodium dihydrogen phosphate, and examples of an organic salt usable therein include sodium acetate, potassium acetate, potassium tartarate, sodium tartarate, sodium benzoate, potassium benzoate, sodium p-toluenesulfonate, potassium saccharate, potassium phthalate and sodium picolinate.

Further, the conductivity can also be adjusted by selecting ingredients of the water-base vehicle mentioned hereinafter.

The suitable viscosity of the present ink composition is from 1 to 30 mPa.s, preferably from 2 to 15 mPa.s, particularly preferably from 2 to 10 mPa.s, at 25° C. When the viscosity of an ink composition is higher than 30 mPa.s, the fixation of images recorded in the ink composition is slowed down and jetting capability of the ink composition is lowered. When the viscosity is lower than 1 mPa.s, on the other hand, the images recorded become blurred and their definition is lowered.

The viscosity can be controlled freely by the amount of an ink solvent added. Examples of an ink solvent suitable for viscosity control include glycerin, diethylene glycol, triethanolamine, 2-pyrrolidone, diethylene glycol monobutyl ether, and triethylene glycol monobutyl ether.

Alternatively, a viscosity modifier may be used for the viscosity control. Examples of a viscosity modifier usable herein include cellulose, water-soluble polymers such as polyvinyl alcohol, and nonionic surfactants. For details of viscosity modifiers *Nendo Chosei Gijutsu,* chap. 9, Gijutsu Joho Kyokai (1999) and *Inkujetto Purinta yo Kemikaluzu (98 zoho)—Zairyo no Kaihatsu Doko Tenbo Chosa-*, pp. 162-174, CMC Publishing Co., Ltd. (1997) can be referred to.

Methods for measuring viscosity of liquid are described in detail in JIS Z8803, and the viscosity of liquid can be determined easily with a commercially available viscometer. For instance, rotational viscometers, such as B-type viscometer and E-type viscometer made by Tokyo Keiki Kogyo, can be used. The viscosity measurements in the invention are carried out at 25° C. by use of a vibration viscometer, Model VM-100A-L, made by YAMAICHI ELECTRONICS Co., Ltd. The unit of viscosity is Pas, but mPa.s is in common use.

The suitable surface tension of the present ink compositions, whether static or dynamic, is from 20 to 50 mN/m, preferably from 20 to 40 mN/m, at 25° C. When the static and dynamic surface tensions exceed 50 mN/m, the consistency in jetting is lowered and the quality of images printed deteriorates because bleeding and feathering are caused in mixed color areas. When the surface tensions are 20 mN/m or lower, it sometimes occurs that the ink compositions jetted out adhere to the hardware surface and impair the print quality.

For the purpose of adjusting surface tensions, various types of surfactants including the cationic, anionic, nonionic and betaine surfactants as recited above can be added. Additionally, these surfactants may be used as combinations of two or more thereof.

To measurement of static surface tension, a capillary rise method, a falling-drop method and a hanging ring method are known to be applicable. In the invention, however, a vertical plate method is adopted as the static surface tension measurement.

When hanging a thin plate of glass or platinum in a vertical direction so as to immerse a part of the thin plate into a liquid, the surface tension of the liquid acts downward along the length of the contact between the liquid and the thin plate. The surface tension can be determined by balancing this downward force with an upward force.

To measurement of dynamic surface tension, on the other hand, a vibration jet method, a meniscus drop method and a maximum bubble pressure method are known to be applicable, as described in *Shin Jikken Kagaku Koza*, vol. 18 (Kaimen to Koloido), pp. 69-90, Maruzen Co., Ltd. (1977). In addition, the liquid membrane break method as disclosed in JP-A-3-2064 is also known to be applicable. In the invention, however, the measurements of dynamic surface tension are made using a bubble pressure differential method. The principle of this method and the way to measure are explained below.

When air bubbles are generated in a solution rendered homogeneous by stirring, a new air-liquid interface is formed and surfactant molecules in the solution troop up toward the water surface at a constant rate. When the bubble rate (the bubble generation rate) is slowed down by making a change therein, a greater number of surfactant molecules can gather on the bubble surface, and the maximum bubble pressure just before bubbles burst can be lowered. As a result, the maximum bubble pressure (surface tension) relative to the bubble rate can be detected. For determination of dynamic surface tension can be suitably utilized a method of generating air bubbles in a solution by use of two probes large and small, measuring a pressure difference between the two probes under the maximum bubble pressure conditions, and calculating the dynamic surface tension from the pressure difference measured.

In the present ink compositions, it is advantageous for nonvolatile ingredients to make up 10 to 70 mass % of the total ingredients from the viewpoints of consistency in jetting the ink compositions, print quality, various kinds of fastness of images printed, and reduction in image blur after printing and stickiness of printed areas. And, from the viewpoints of consistency in jetting the ink compositions and reduction in image blur after printing, it is more advantageous that the content of nonvolatile ingredients is from 20 to 60 mass %.

The term "nonvolatile ingredients" as used herein is intended to include liquid, solid and high molecular weight ingredients having boiling points not lower than 150° C. at one atmospheric pressure. More specifically, the nonvolatile ingredients in the ink compositions include dyes, high boiling solvents, and additives added as needed, such as polymer latices, surfactants, dye stabilizers, fungicides and buffers. Most of these nonvolatile ingredients, other than dye stabilizers, have disadvantages of lowering the dispersion stability of the ink compositions, and inhibiting the stabilization of dyes by association on image-receiving paper and exacerbating various kinds of fastness of printed image areas and image blur under high humidity conditions.

In the invention, it is possible to incorporate high molecular weight compounds. The term "high molecular weight compounds" as used herein is intended to include all of high molecular compounds having number average molecular weights of at least 5,000 as far as they can be incorporated in ink compositions. Examples of such high molecular compounds include high molecular compounds substantially soluble in water-base vehicles, water-dispersible high molecular compounds such as polymer latex and polymer emulsion, and alcohol-soluble high molecular compounds soluble in polyhydric alcohol compounds used as auxiliary solvents. Other high molecular compounds may also be included in the high molecular weight compounds usable in the invention as far as they can be dissolved or dispersed homogeneously in a substantial sense into the ink compositions.

Examples of water-soluble high molecular compounds usable in the invention include water-soluble polymers, such as polyvinyl alcohol, silanol-modified polyvinyl alcohol, carboxymethyl cellulose, hydroxyethyl cellulsode, polyvinyl pyrrolidone, polyalkylene oxides including polyethylene oxide and polypropylene oxide, and polyalkylene oxide derivatives; natural water-soluble high polymers, such as polysaccharide, starch, cationic starch, casein and gelatin; water-soluble acrylic resins, such as polyacrylic acid, polyacrylamide and acrylic acid-acrylamide copolymer; water-soluble alkyd resins; and water-soluble high molecular compounds containing $-SO_3^-$ or $-COO^-$ groups and having substantial solubility in water-base vehicles.

Examples of polymer latex usable in the invention include styrene-butadiene latex, styrene-acrylic latex and polyurethane latex. And one example of polymer emulsions usable in the invention is an acrylic emulsion.

Those water-soluble high molecular compounds can be used alone or as combinations of two or more thereof.

The water-soluble high molecular compounds, as mentioned above, are used as viscosity modifiers for adjusting the viscosities of ink compositions to the range favorable for jetting properties. When high molecular compounds are added in a large amount, the resulting ink composition has an increased viscosity and a reduced consistency in its jetting, and forms deposits with a lapse of time and tends to clog nozzles.

The amount of high molecular compounds added as a viscosity modifier depends on the molecular weight of the compounds added (namely the higher the molecular weight of the compound added, the smaller amount of addition suffices for modification of viscosity). Specifically, the amount added is controlled to the range of 0 to 5%, preferably 0 to 3%, far preferably 0 to 1%, of the total mass of the ink composition.

In the invention, if needed, the various cationic, anionic, nonionic and betaine surfactants as recited above can also be used as dispersants and dispersion stabilizers, and fluorine-containing compounds and silicone compounds as antifoam agents and chelating agents, typified by EDTA, can be used as well.

Reflection media as printing media suitable for use in the invention are further described below. The reflection media include recording paper and recording film. An example of a support usable in the recording paper or the recording film is paper manufactured from chemical pulp such as LBKP or NBKP, mechanical pulp such as GP, PGW, RMP, TMP, CTMP, CMP or CGP, or waste paper such as DIP, wherein known additives including a dye, a binder, a sizing agent, a fixing agent, a cationic agent and a paper strength increasing agent are mixed as needed, by use of a paper machine such as a Fourdrinier machine or a vat machine. And other examples of the support may be synthetic paper and plastic film sheets. It is preferable that the support has a thickness of from 10 to 250 μm and a basis weight of from 10 to 250 g/m².

An image-receiving material for receiving the present ink compositions and an ink set may be prepared by providing an image-receiving layer and a back coating layer directly on a support, or by subjecting a support to sizepress coating with starch or polyvinyl alcohol or to anchoring and then by providing an image-receiving layer and a back coating layer on the support. Further, the support may be subjected to flattening processing with a calendering apparatus, such as a machine calender, a TG calender or a soft calender.

Supports far preferred in the invention are paper laminated with polyolefin (e.g., polyethylene, polypropylene and ethylene-propylene copolymer) or polyethylene terephthalate on both sides, and plastic films. To the polyolefin, a white pigment (e.g., titanium dioxide, zinc oxide) or a tinting dye (e.g., cobalt blue, ultramarine blue, neodymium oxide) is preferably added.

In the image-receiving layer provided on the support, a porous material and an aqueous binder are incorporated. Further, it is preferable that the image-receiving layer contains a pigment, and a white pigment is suitable as the pigment. Examples of a white pigment include inorganic pigments, such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate; and organic pigments, such as styrene pigment, acrylic pigment, urea resin and melamine resin. Of these pigments, inorganic porous white pigments are preferred over the others. And synthetic amorphous silica having a great pore area is used to particular advantage. As the synthetic amorphous silica, both silicic acid anhydride synthesized in dry process (vapor-phase process) and hydrated silicic acid synthesized in a wet process are usable.

Examples of a recording paper containing the pigments as recited above in its image-receiving layer, which can be used in the invention, include those disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777 and JP-A-2001-301314.

Examples of an aqueous binder incorporated in the image-receiving layer include water-soluble polymers, such as polyvinyl alcohol, silanol-modified polyvinyl alcohol, starch, cationic starch, casein, gelatin, carboxymethyl cellulose, hydroxyethyl cellulsode, polyvinyl pyrrolidone, polyalkylene oxides and polyalkylene oxide derivatives; and water-dispersible polymers; such as styrene-butadiene latex and an acrylic emulsion. These aqueous binders, can be used alone or as combinations of two or more thereof. Of those aqueous binder, polyvinyl alcohol and silanol-modified polyvinyl alcohol are especially favorable from the viewpoints of adhesion to pigments and delamination resistance of the ink-receiving layer.

In addition to pigments and aqueous binders, the image-receiving layer can further contain other additives, such as a mordant, a waterproofing agent, a light resistance improver, a gas resistance improver, a surfactant and a hardener.

To the image-receiving layer, an immobilized mordant is preferably added. Therefore, it is appropriate to use a polymeric mordant.

Descriptions of polymeric mordants can be found in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, and U.S. Pat. Nos. 2,484,430, 2,548,564, 3,148,061, 3,309,690, 4,115,124, 4,124,386, 4,193,800, 4,273,853, 4,282,305 and 4,450,224. The image-receiving materials containing the polymeric mordants disclosed in JP-A-1-161236, pp. 212-215, are especially favorable. When the polymeric mordants disclosed in this reference are used, the images obtained can have excellent image quality and improved light resistance.

Waterproofing agents are effective in rendering images waterproof, and cationic resins are especially suitable as these agents. Examples of such cationic resins include polyamide-polyamine epichiorohydrin, polyethyleneimine, polyamine-sulfone, dimethyldiallylammonium chloride polymer, and cationic polyacrylamide. The suitable content of these cationic resins is from 1 to 15% by mass, particularly 3 to 10% by mass, of the total solids in the ink-receiving layer.

Examples of compounds usable as light resistance improver and gas resistance improver include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, saccharide, water-soluble reducing compounds, organic acids, inorganic acid, hydroxyl group-containing organic acids, benzotriazole compounds, benzophenone compounds, triazine compounds, heterocyclic compounds, water-soluble metal salts, organometallic compounds and metal complexes.

Examples of these compounds include the compounds described in JP-A-10-182621, JP-A-2001-260519, JP-A-2000-260519, JP-B-4-34953, JP-B-4-34513, JP-B-34512, JP-A-11-170686, JP-A-60-67190, JP-A-7-276808, JP-A-2000-94829, JP-T-8-512258, and JP-A-11-321090.

A surfactant functions as a coating aid, a stripping quality modifier, a slipping quality modifier or an antistatic agent. Examples of surfactants functioning as such agents include those described in JP-A-62-173463 and JP-A-62-183457.

Instead of surfactants, fluorinated organic compounds may be used. It is advantageous for the fluorinated organic compounds to be hydrophobic. Examples of such, compounds include fluorine-containing surfactants, fluorine compounds in oil form (e.g.; fluorinated oil), and fluorinated synthetic resins in solid form (e.g., tetrafluoroethylene resin). For details of fluorinated organic compounds JP-B-57-9053, columns 8-17, JP-A-61-20994 and JP-A-62-135826 can be referred to.

Examples of a hardener usable in the invention include the materials described in JP-A-1-161236, p. 222, JP-A-9-263036, JP-A-10-119423 and JP-A-2001-310547.

Examples of other additives further added to the image-receiving layer include a pigment-dispersing agent, a thickening agent, an antifoam agent, a dye, a brightening agent, an antiseptic, a pH adjusting agent and a matting agent. Additionally, the ink-receiving layer may be a single layer or a double layer.

The recording paper and the recording film may be provided with a back coating layer. To this coating layer, a white pigment, an aqueous binder and other ingredients can be added.

Examples of a white pigment containable in the back coating layer include inorganic white pigments, such as precipitated calcium carbonate, ground calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrohalloysite, magnesium carbonate and magnesium hydroxide; and organic pigments, such as styrene plastic pigments, acrylic plastic pigments, polyethylene, microcapsules, urea resin and melarmine resin.

Examples of an aqueous binder containable in the back coating layer include water-soluble polymers, such as styrene-maleate copolymer, styrene-acrylate copolymer, polyvinyl alcohol, silanol-modified polyvinyl alcohol, starch, cationic starch, casein, gelatin, carboxymethyl cellulose, hydroxyethyl cellulose and polyvinyl pyrrolidone; and water-dispersible polymers, such as styrene-butadiene latex and an acrylic emulsion. Examples of other ingredients containable in the back coating layer include an antifoam agent, a foam depresser, a dye, a brightening agent, an antiseptic and a waterproofing agent.

To constituent layers (including a back coating layer) of the recording paper or recording film, a dispersion of polymer particulates may be added. The dispersion of particulate polymer is used for the purpose of improving physical properties of coating layers, e.g., ensuring dimensional stability in the coating layers and preventing the coating layers from curling, sticking and cracking. Descriptions of the dispersion of polymer particulates can be found in JP-A-62-245258, JP-A-62-136648 and JP-A-62-110066. When the dispersion of polymer particulates having a low glass transition temperature (40° C. or below) is added to a mordant-containing layer, the layer can be prevented from cracking and curling. Alternatively, the curling can also be prevented by adding to a back coating layer the dispersion of polymer particulates having a high glass transition temperature.

The present ink compositions can also be used for purposes other than inkjet recording. For instance, the present ink compositions are usable as materials for display images, and mateials for forming images on interior decoration materials and exterior decoration materials.

Examples of display images include posters, advertising fliers, images painted on or attached to wallpaper, decorative articles (e.g., ornaments and dolls), wrapping paper and materials, paper bags, plastic bags, package materials, billboards and sides of transport facilities (cars, buses and trains), and logos on clothes. When dyes according to the invention are used as a material for forming display images, the term "images" herein is intended to include all of human-recognizable dye-based patterns, from images in a narrow sense to abstract designs, characters and geometrical patterns.

Examples of interior decoration materials include a wide variety of materials such as wallpaper, decorative articles (e.g., ornaments and dolls), members of lighting fixtures, members of furniture, and design members of floor and ceiling. When dyes according to the invention are used as the material for forming images on such materials, the term "images" herein is intended to include all of human-recognizable dye-based patterns, from images in a narrow sense to abstract designs, characters and geometrical patterns.

Examples of exterior decoration materials include a wide variety of materials such as wall materials, roofing materials, billboards, outdoor decorative articles for gardening (e.g., ornaments and dolls), and members of outdoor lighting fixtures. When dyes according to the invention are used as the material for forming images on such materials, the term "images" herein is intended to include all of human-recognizable dye-based patterns, from images in a narrow sense to abstract designs, characters and geometrical patterns.

Examples of media on which patterns are formed in the uses as mentioned above include paper, texture, cloth (including nonwoven fabric), plastics, metals and ceramics. The dyeing can be effected in a mode of mordanting, textile printing or dye fixation using a reactive group-introduced dye. Of these modes, the dyeing in the mode of mordanting is preferred over the others.

In the manufacturing of ink compositions, ultrasonic vibrations may be applied at the dissolution step of additives such as dyes.

The intention in applying ultrasonic vibrations consists in that, in order to prevent an ink composition from producing air bubbles under pressure added by a recording head, ultrasound wave energy equivalent to or greater than the energy the ink composition incurs at the recording head is applied to the ink composition during the manufacturing process and thereby air bubbles are eliminated in advance from the ink composition.

The frequency of ultrasonic vibrations applied is usually at least 20 kHz, preferably at least 40 kHz, and far preferably at least 50 kHz. The energy applied to liquid by ultrasonic vibrations is usually at least $2 \times 10^7$ J/m$^3$, preferably at least $5 \times 10^7$ J/m$^3$, and far preferably at least $1 \times 10^8$ J/m$^3$. The time spent on application of ultrasonic vibrations is usually of the order of 10 minutes to 1 hour.

The application of ultrasonic vibrations is effective even when it is carried out at any stage of the manufacturing process so far as the stage is subsequent to charge of dyes into a vehicle. The effect of ultrasonic vibrations is also produced even when the ultrasonic vibrations are applied to an ink composition once stored after completion of the ink composition. However, it is preferable that ultrasonic vibrations are applied at the time of dissolving and/or dispersing dyes into a vehicle because it can produce greater effect on elimination of air bubbles, and besides, the dissolution and/or dispersion of the dyes into the vehicle is promoted.

Specifically, ultrasonic vibrations can be applied at least in or after the step of dissolving and/or dispersing dyes into a vehicle. In other words, the operation of applying ultrasonic vibrations can be carried out at least once at any time during a period between preparation of ink compositions and completion thereof as products.

In a practical mode, it is appropriate that the process of dissolving and/or dispersing operation of dyes into a vehicle include a step of dissolving dyes into a part of the total vehicle and a step of mixing the remainder of the vehicle with the resulting solution. And it is preferable to apply ultrasonic vibrations in at least either of these steps, and it is preferable by far to apply ultrasonic vibrations in at least the step of dissolving dyes into a part of the total vehicle.

The step of mixing the remainder of the vehicle may be a single step or a multistage step.

Further, it is appropriate that deaeration be additionally performed under heating or reduced pressure in manufacturing the present ink compositions. This is because such a deaerating operation can enhance the effect in eliminating air bubbles from the ink compositions. It is preferable that the step of deaeration under heating or reduced pressure is carried out simultaneously with or subsequently to the step of mixing the remainder of the vehicle.

Examples of an ultrasonic vibration generator usable in the step of applying ultrasonic vibrations include known devices, such as an ultrasonic dispersing machine.

In the manufacturing process of the present ink compositions, it is important that a step of eliminating dust as solid particles by filtration is included after the compositions are prepared in solution form. A filter used in this operation has an effective pore diameter of 1 µm or below, preferably from 0.3 µm down to 0.05 µm, particularly preferably from 0.3 µm down to 0.25 µm. Although materials usable for the filter are various in kind, it is preferable to use a filter made specifically for aqueous solvents in the case of ink compositions using water-soluble dyes. In particular, a filter made of a plastic material is used to advantage, because it hardly gives rise to dust. In filtration, the solutions may be passed through a filter by feeding, or a method of filtering them under applied or reduced pressure can be adopted.

After filtration, air is often taken in the solutions. In many cases, bubbles coming from the air also cause distortion of images in inkjet recording. So it is preferable that the defoaming operation as mentioned above is performed additionally. As to a way of defoaming, the solutions after filtration may be allowed to stand still, or may undergo ultrasonic defoaming or reduced-pressure defoaming operation with a commercially available device. In the case of ultrasonic defoaming operation, the suitable operation time is of the order of 30 seconds to 2 hours, preferably 5 minutes to 1 hour.

In order to prevent contamination with dust during those operations it is appropriate that the operations be performed using clean spaces such as a clean room and at clean bench. To the invention, it is especially advantageous for the operations to be performed in spaces having cleanliness of Class 1000 or below. The term "cleanliness" as used herein refers to the value measured with a dust counter.

The volume of each of ink droplets striking the surface of a recording material is from 0.1 pl to 100 pl, preferably from 0.5 pl to 50 pl, particularly preferably from 2 pl to 50 pl.

The inkjet recording carried out in the invention is not particularly restricted as to its method of jetting ink, but any of known methods may be adopted so far as images are recorded by use of ink compositions or an ink set according to the invention and an inkjet printer. More specifically, methods usable in the invention include an electric charge control method in which ink is jetted by utilizing an induced electrostatic force, a drop-on-demand method (a pressure pulse method) utilizing vibration pressure of a piezo element, an acoustic inkjet method in which radiation pressure created by irradiating ink with acoustic beams converted from electric signals is utilized for jetting ink, and a thermal inkjet (bubble jet) method in which bubbles are formed by heating ink and the pressure created thereby is utilized for jetting ink.

In the inkjet recording methods are included a method of jetting a great number of minute-volume droplets of low-density ink referred to as the photo ink, a method of improving image quality by the use of two or more kinds of ink substantially the same in hue but different in density, and a method of using colorless invisible ink. The volume control of ink droplets striking the surface of a recording material is carried out mainly by means of a print head.

In the case of a thermal inkjet method, for instance, the volume of ink droplets striking the surface of a recording material can be controlled by structural changes made in a print head. More specifically, the ink droplets of a desired size can be made to strike the surface of a recording material by changing sizes of an ink cell, a heating section and a nozzle. Even in the thermal inkjet method, it also becomes feasible to make ink droplets having two or more different sizes strike the surface of a recording material by installing two or more print heads differing from one another in sizes of their respective heating sections and nozzles.

In the case of the drop-on-demand method using a piezo element, structural changes of a print head used therein makes it possible to change the volume of ink droplets striking the surface of a recording material as in the case of the thermal inkjet method. On the other hand, as described hereinafter, it is also possible to make different-sized ink droplets strike the surface of a recording material by controlling waveforms of piezo element-driving signals without changing the structure of a print head.

When droplets of the present ink compositions are made to strike the surface of a recording material, the jet frequency is preferably adjusted to at least 1 KHz.

In order to record images of photo-like high quality, it is required to reproduce highly sharp images with minute droplets of ink. So it is required that the density of ink droplets striking the surface of a recording material be adjusted to at least, 600 dpi (dots per inch).

In the case of an inkjet printer of the type which a performs recording on a recording paper with ink droplets jetted from heads having a plurality of nozzles while moving the recording paper and the heads in directions crossing each other at right angles, the number of heads capable of being driven simultaneously is limited to the order of dozens to 200. Even in a printer equipped with fixed heads referred to as the line head, the number of heads is limited to several hundreds. This is because there is a restriction on driving power and many head nozzles cannot be driven at the same time due to the fact that the heat produced thereby affects images.

Herein, it is possible to increase the recording speed by heightening the driving frequency.

In the case of a thermal inkjet method, the frequency control in making ink droplets strike a recording material is feasible by controlling the frequency of head driving signals for heating the heads.

In the case of a piezo method, such a control is feasible by controlling the frequency of piezo driving signals.

Driving of piezo heads is explained below. In a printer control section, the size, the speed and the frequency of ink droplets to strike the surface of a recording material are determined according to image signals to be printed, and signals for driving print heads are formed. And the driving signals formed are fed to the print heads. The size, the speed and the frequency of ink droplets to strike the surface of a recording material are controlled by the signals driving piezo elements. Herein, the size and the speed of ink droplets to strike the surface of a recording material are determined by the form and the amplitude of driving waves, while the frequency thereof is determined by the repetition period of the signals.

When the frequency of ink droplets to strike the surface of a recording material is set at 10 KHz, the heads are driven every 100 microseconds and one line of recording is completed in 400 microseconds. By setting the traveling speed of a recording paper at 1/600 inch per 400 microseconds, or about 42 microns, it becomes possible to print at a rate of one sheet per 1.2 seconds.

As the configuration of a printing apparatus and the structure of a printer used in the invention, the modes as disclosed in JP-A-11-170527 are suitable. And the ink cartridges as disclosed in JP-A-5-229133 can be used to advantage in the invention. As the suction mechanism and the structure of a cap covering a printing head used therein, those disclosed in JP-A-7-276671 are used suitably in the invention. In addition, it is advantageous to install in the head neighborhood the air bubble elimination filter as disclosed in JP-A-9-277552.

Further, it is advantageous to make the nozzle surface water-repellent as disclosed in JP-A-2002-292878. As to the uses, the invention may be applied to a printer linked to computers, or to apparatus tailored to the printing of photographs.

In an inkjet recording method applied to the invention, the suitable speed with which ink composition droplets are made to strike the surface of a recording material averages at least 2 m/sec, preferably at least 5 m/sec.

The control of a speed at which ink droplets strike the surface of a recording material is achieved by controlling the form and the amplitude of head driving waves.

In addition, the changing of driving waveforms enables ink droplets of different sizes to strike the surface of a recording material in spite of using one head.

EXAMPLES

The first invention will now be illustrated in more detail by reference to the following examples, but these examples should not be construed as limiting the scope of the invention. Additionally, all parts and percentages in the examples are by mass unless otherwise indicated.

(Preparation of Support)

Wood pulp constituted of 100 parts of LBKP was beaten to Canadian freeness of 300 ml by means of a double disk refiner, and admixed with 0.5 parts of epoxidized behenic acid amide, 1.0 parts of anionic polyacrylamide, 0.1 parts of polyamidopolyamine epichlorohydrin and 0.5 parts of cationic polyacrylamide. Herein, the amounts of the additives used were each expressed in terms of the bone dry mass ratio to the pulp. The resulting mixture was made into raw paper having a basis weight of 170 g/m$^2$ by means of a Fourdrinier paper machine.

In order to adjust the surface size of the raw paper obtained, the raw paper was impregnated with a 4% aqueous polyvinyl alcohol solution containing 0.04% of a brightening agent (Whitex BB, produced by Sumitomo Chemical Co., Ltd.) so that the amount of the surface size reached 0.5 g/m$^2$ in terms of the bone dry mass, and then dried, and further subjected to calendering treatment. Thus, a base paper having a density adjusted to 1.05 g/ml was prepared.

The thus obtained base paper was subjected to corona discharge treatment on the wire face side (the back), and thereon high-density polyethylene was coated in a thickness of 19 μm by means of a melt extrusion machine to form a matte resin layer (the surface of which was hereinafter referred to as the back). Further, the resin layer as the back was subjected to corona discharge treatment, and then coated with an aqueous dispersion as an antistatic agent, which was prepared by dispersing aluminum oxide (Alumina Sol 100, produced by NISSAN CHEMICAL INDUSTRIES LTD.) and silicon dioxide (Snowtex O, produced by NISSAN CHEMICAL INDUSTRIES LTD.) into water at a ratio of 1:2 by mass, so that the coverage of the antistatic agent reached 0.2 g/m$^2$ on a dry mass basis.

Furthermore, the base paper was subjected to corona discharge treatment on the felt face (surface) side where the resin layer was not provided and then, on the thus treated surface of the base paper, low-density polyethylene having MFR (melt flow rate) of 3.8 and containing 10% of anatase-type titanium dioxide, a trace amount of ultramarine and 0.01% of a brightening agent (wherein the proportions of these additives are based on the polyethylene) was extruded in a thickness of 29 μm by means of a melt extrusion machine to form a high-gloss thermoplastic resin layer (this high-gloss surface was hereinafter referred to as the front surface). Thus, a support was prepared.

(Preparation of Coating Solution A for Ink-receiving Layer)

Ingredients of the following composition, (a) vapor-phase process particulate silica, (b) ion exchange water and (c) SHALLOL DC-902P, were mixed and dispersed with a beads mill (KD-P, made by Shinmaru Enterprises Corporation), and then thereto, a solution containing the remainder ingredients; (d) polyvinyl-alcohol, (e) boric acid; (f) polyoxyethylene lauryl ether and (g) ion exchange water, was added to prepare a coating Solution A for ink-receiving layer.

Herein, the ratio of the particulate silica to the water-soluble resin (P/B ratio=(a):(d)) was 4.5:1 by mass, and the coating Solution A for ink-receiving layer was acidic and the pH thereof was 3.5.

| | <Composition of Coating Solution A for Ink-receiving Layer> | |
|---|---|---|
| (a) | Vapor-phase particulate silica (inorganic fine particles) (Rheolosil QS-30, produced by TOYUYAMA Corp., average primary particle size: 7 nm) | 10.0 parts |
| (b) | Ion exchange water | 51.6 parts |
| (c) | SHALLOL DC-902P (51% aqueous solution) (a dispersant, produced by Nitto Boseki Co., Ltd.) | 1.0 parts |
| (d) | Polyvinyl alcohol (8% aqueous solution) (a water-soluble resin, PVA124, produced by KURARAY CO., LTD., saponification degree: 98.5%, polymerization degree: 2,400) | 27.8 parts |
| (e) | Boric acid (cross-linking agent) | 0.4 parts |
| (f) | Polyoxyethylene lauryl ether (a surfactant, Emulgen 109P (10% aqueous solution), produced by Kao Corporation, HLB value: 13.6) | 1.2 parts |
| (g) | Ion exchange water | 33.0 parts |

(Production of Recording Medium)

The front surface of the support was subjected to corona discharge treatment and then, on the thus treated front surface, the coating Solution A for ink-receiving layer was coated at a coverage of 200 ml/m$^2$ by use of an extrusion die coater (coating step). The coating layer was dried at 80° C. with a hot-air dryer (air velocity: 3 to 8 m/sec) till it came to have a solids concentration of 20%. During this period, the coating layer was dried at a constant speed. Immediately afterward, the coating layer was immersed in a mordant Solution B having the following composition for a period of 30 seconds, thereby forming a deposition of 20 g/m$^2$ on the coating layer (mordant solution-applying step). Further, the deposition was dried at 80° C. for 10 minutes (drying step). Thus, a recording medium provided with a coloring material receiving layer having a dry thickness of 32 μm was produced.

| | <Composition of Mordant Coating Solution B> | |
|---|---|---|
| (a) | Boric acid (cross-linking agent) | 0.65 parts |
| (b) | Polyallylamine PAA-03 (20% aqueous solution) (a mordant, produced by Nitto Boseki Co., Ltd.) | 12.5 parts |
| (c) | Ion exchange water | 72.0 parts |
| (d) | Ammonium chloride (surface pH adjuster) | 0.8 parts |
| (e) | Polyoxyethylene lauryl ether (a surfactant, Emulgen 109P (2% aqueous solution), produced by Kao Corporation, HLB value: 13.6) | 10 parts |
| (f) | Megafac F1405 (10% aqueous solution) (a fluorine-containing surfactant, produced by DAINIPPON INK AND CHEMICALS, INCORPORATED) | 2.0 parts |

Compounds in the invention and compounds for comparison, which are shown in Table 1-2, were each added to the mordant coating Solution B in a proportion of 1 mass % (on a solids basis), thereby preparing mordant coating solutions.

TABLE 1-2

| | Additive | Number of atoms having conjugate π electrons |
|---|---|---|
| No. 1 (comparison) | nothing | — |
| No. 2 (comparison) | benzotriazole-5-carboxylic acid | 9 |

TABLE 1-2-continued

|  | Additive | Number of atoms having conjugate π electrons |
|---|---|---|
| No. 3 (invention) | P-1 | 18 |
| No. 4 (invention) | P-29 | 16 |
| No. 5 (invention) | P-35 | 12 |
| No. 6 (invention) | P-36 | 10 |

(Evaluation Tests)

The evaluation tests mentioned below were carried out on each of the present recording media (No.3 to No.6) and the recording media for comparison (No. 1 and No.2) obtained in the foregoing manners. The results obtained are shown in Table 1-3.

<Bronze Evaluation>

Under an environmental condition of 30° C.-80% RH, monochromatic images of cyan color were printed on each of the recording media so as to have densities changing stepwise from 0.2 to 2.2 on a 1-to-11 scale by means of each of the ink-jet printers, PM-970 (made by Seiko Epson Corporation) and PIXUS950i (made by Canon Inc.), loaded with their respective genuine ink sets, and evaluated by the bronzing phenomenon occurrence conditions.

Specifically, a case in which no bronzing phenomenon occurred at all in the all density range up to the highest density was graded A, a case in which the bronzing phenomenon occurred in the 8th- to 11th-step (highest) density range was graded B, and a case in which the bronzing phenomenon occurred even in the 1st-step (lowest) to 7th-step density range was graded C.

<Ozone Resistanc>

Magenta solid images and cyan solid images were printed on each of the recording media by means of each of the ink-jet printers, PM-970 (made by Seiko Epson Corporation) and PIXUS950i (made by Canon Inc.), loaded with their respective genuine ink sets, and stored for 24 hours in an environment that the ozone concentration was adjusted to 2.5 ppm. The magenta densities and the cyan densities were measured with a reflection densitometer (Xrite93 8, made by Xrite Inc.) before and after storage, and the residual density rates of magenta and cyan images were calculated.

A case where the residual density rate was 80% or above was graded A, a case where the residual density rate was from 70% to lower than 80% was graded B, a case where the residual density rate was from 60% to lower than 70% was graded C, and a case where the residual density rate was lower than 60%.was graded D.

<Light Resistance>

Under an environmental condition of 25° C.-32% RH, magenta and cyan solid images were printed on each of the recording media by means of each of the ink-jet printers, PM-970 (made by Seiko Epson Corporation) and PIXUS950i (made by Canon Inc.), loaded with their respective genuine ink sets, and then exposed to D65 light in an illumination of 85,000 lux via a filter cutting ultraviolet rays of wavelengths shorter than 365 nm over a time period of 3.8 hours by means of a weatherometer (Xenon Weather-O-Meter Ci65A, made by Atlas Electric Devices Co., USA). Thereafter, the lamp was switched off and the recording media was allowed to stand for 1 hour under an environmental condition of 20° C.-91% RH. This exposure-standing cycle was repeated over 168 hours. The densities of each color image before and after this test were measured with a reflection densitometer (Xrite938, made by Xrite Inc.), and the residual density rate of each color was calculated.

A case where the residual density rate was 90% or above was graded A, a case where the residual density rate was from 80% to lower than 90% was graded B, a case where the residual density rate was from 70% to lower than 80% was graded C, and a case where the residual density rate was lower than 70% was graded D.

TABLE 1-3

| | | | No. 1 (comparison) | No. 2 (comparison) | No. 3 (invention) | No. 4 (invention) | No. 5 (invention) | No. 6 (invention) |
|---|---|---|---|---|---|---|---|---|
| EPSON PM 970C | Bronze evaluation | | C | C | A | A | A | A |
| | Ozone resistance | Magenta | D | D | B | B | B | B |
| | | Cyan | C | C | B | B | B | B |
| | Light resistance | Magenta | D | D | C | C | C | C |
| | | Cyan | A | A | A | A | A | A |
| CANON PIXUS 950i | Bronze evaluation | | B | B | A | A | A | A |
| | Ozone resistance | Magenta | C | C | A | A | A | A |
| | | Cyan | C | C | B | B | B | B |
| | Light resistance | Magenta | D | D | C | C | C | C |
| | | Cyan | A | A | A | A | A | A |

As can be seen from the results shown in Table 1-3, the present recording media containing Compound P-1, Compound P-29, Compound P-35 and Compound P-36 respectively, wherein greater than 10 atoms having conjugate π electrons are present on a per-molecule basis, achieved the prevention of bronzing phenomenon even in the printed areas of high cyan densities. Further, the images printed on these recording media showed high residual density rates even after the long-term storage under the condition of high ozone concentration, so the present recording sheets have proved superior in ozone resistance. In addition, the residual density rates of the images formed were also high even after the test by repeated cycles of xenon irradiation and standing in a highly humid environment, so the present recording sheets have proved of excellent light resistance, too.

On the other hand, the comparative recording medium in which any compound according to the invention was not used showed the bronzing phenomenon in the printed areas of high cyan densities, and the addition of benzotriazole-5-carboxylic acid, in which the number of atoms having conjugate π electrons is 9, has proved insufficient in preventing the occurrence of the bronzing phenomenon.

The second invention will now be illustrated in more detail by the following examples, but these examples should not be construed as limiting the scope of the invention.

Example 2-1

Preparation of ink sets IS-101 and IS-102

Ink compositions of four different colors were each prepared as follows: To the ingredients set forth below, ultra-pure water having a resistance of 18 MΩ or higher was added in an amount to make the total volume 1 liter, and stirred for 1 hour while heating at 30-40° C. The resulting solution was passed through a microfilter having an average pore diameter of 0.25 µm under reduced pressure.

| [Formula of Cyan Ink Composition] (Solid Ingredients) | |
|---|---|
| Cyan dye (C-1) | 60 g/l |
| Urea (UR) | 30 g/l |
| Benzotriazole (BTZ) | 0.08 g/l |
| PROXEL XL2 (PXL) | 3.5 g/l |
| (Liquid Ingredients) | |
| Triethylene glycol (TEG) | 110 g/l |
| Glycerin (GR) | 130 g/l |
| Triethylene glycol monobutyl ether (TGB) | 130 g/l |
| 2-Pyrrolidone (PRD) | 60 g/l |
| Triethanolamine (TEA) | 7 g/l |
| SURFYNOL STG (SW) | 10 g/l |
| [Formula of Magenta Ink Composition] (Solid Ingredients) | |
| Magenta dye (M-1) | 23 g/l |
| Urea (UR) | 15 g/l |
| PROXEL | 5 g/l |
| (Liquid Ingredients) | |
| Diethylene glycol (DEG) | 100 g/l |
| Glycerin (GR) | 130 g/l |
| Triethylene glycol monobutyl ether (TGB) | 110 g/l |
| Triethanolamine (TEA) | 8 g/l |
| SURFYNOL STG (SW) | 10 g/l |
| [Formula of Yellow Ink Composition] (Solid Ingredients) | |
| Yellow dye (Y-1) | 35 g/l |
| PROXEL | 3.5 g/l |
| Benzotriazole (BTZ) | 0.08 g/l |
| Urea (UR) | 10 g/l |

-continued

| (Liquid Ingredients) | |
|---|---|
| Triethylene glycol monobutyl ether (TGB) | 130 g/l |
| Glycerin (GR) | 115 g/l |
| Diethylene glycol (DEG) | 120 g/l |
| 2-Pyrrolidone (PRD) | 35 g/l |
| Triethanolamine (TEA) | 8 g/l |
| SURFYNOL STG (SW) | 10 g/l |
| [Formula of Black Ink Composition] (Solid Ingredients) | |
| Black dye (BK-1) | 75 g/l |
| Yellow dye (Y-1) | 30 g/l |
| PROXEL | 5 g/l |
| Urea (UR) | 10 g/l |
| Benzotriazole (BTZ) | 3 g/l |
| (Liquid Ingredients) | |
| Diethylene glycol monobutyl ether (DGB) | 120 g/l |
| Glycerin (GR) | 125 g/l |
| Diethylene glycol (DEG) | 100 g/l |
| 2-Pyrrolidone (PRD) | 35 g/l |
| Triethanolamine (TEA) | 8 g/l |
| SURFYNOL STG (SW) | 10 g/l |

An ink set constituted of these ink compositions was symbolized by IS-101. Another ink set IS-102 was prepared in the same manner as IS-101, except that the dyes in the ink compositions were replaced with dyes shown in Table 2-1, respectively.

TABLE 2-1

| | Cyan dye | Magenta dye | Yellow dye | Black dye |
|---|---|---|---|---|
| IS-101 (comparison) | C-1 | M-1 | Y-1 | BK-1 |
| IS-102 (invention) | C-2 | M-2 | Y-2 | BK-2 |

The structural formulae of the dyes used herein are illustrated below:

C-1

X=A or B
A: $SO_2(CH_2)_3SO_3Li$
B: $SO_2(CH_2)_3SO_2NHCH_2CH(CH_3)OH$

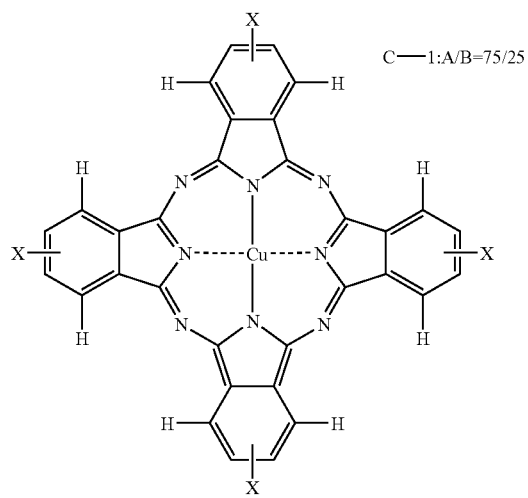

C—1: A/B=75/25

M-1
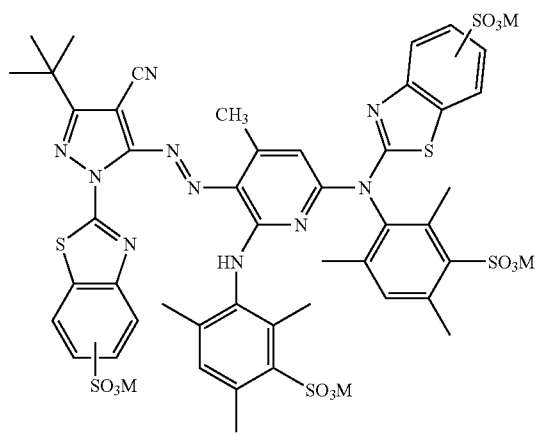
Y-1
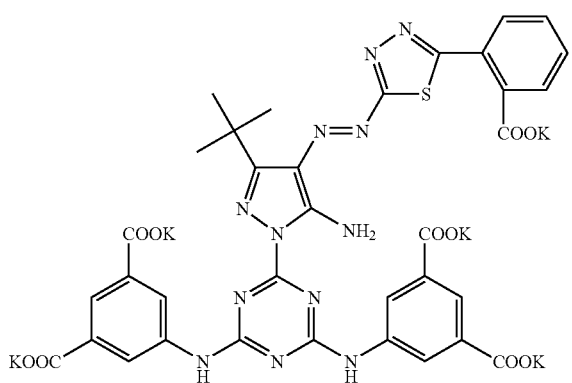
C-2
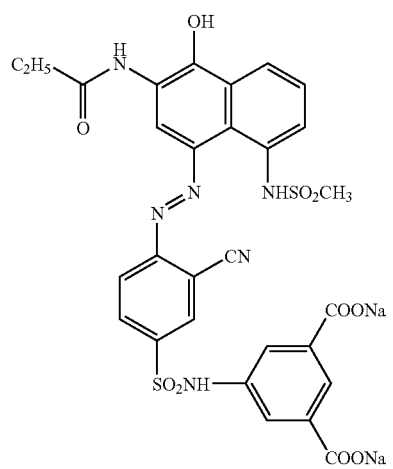

-continued
M-2
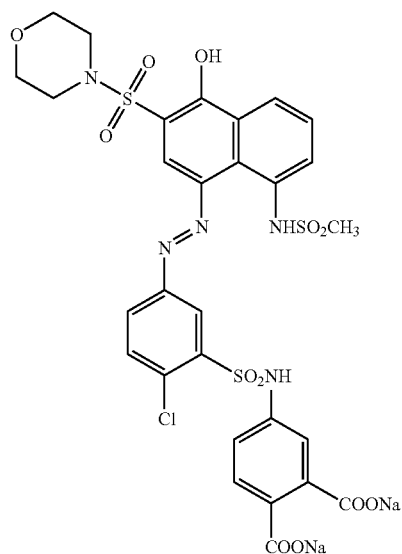
Y-2
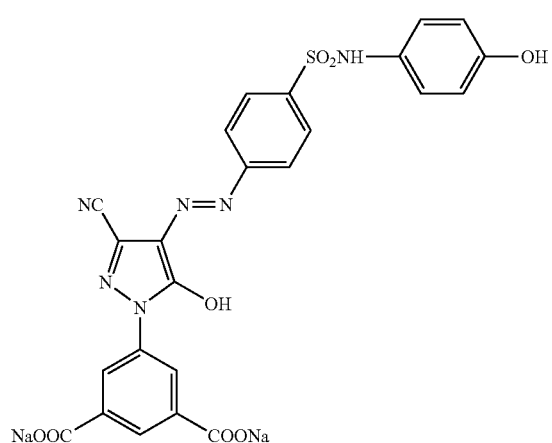
BK-1
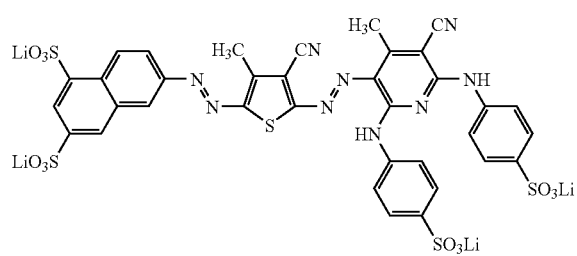
BK-2
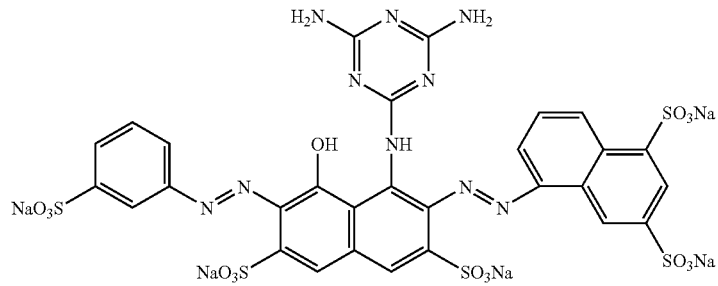

All of C-2, M-2, Y-2 and BK-2 illustrated above were dissociative dyes, and the pKa values thereof were within the range of 4.0 to 5.0.

The ink compositions were loaded into the ink cartridges of CL-760C, an inkjet printer made by Seiko Epson Corporation, and standard image patterns were printed therewith.

Image-receiving sheets used herein were Photo Paper "gasai", a gloss-finished inkjet photo paper produced by Fuji Photo Film Co., Ltd., and PM Photo Paper, a photo-quality inkjet paper produced by Seiko Epson Corporation. After a 24-hour lapse from the printing, the standard image patterns were printed similarly to the above.

At this time, great changes in colors of the images printed were observed in the cases of using the standard ink set of CL-760C and the ink set IS-101, and ΔE was found to be 21. When the ink set IS-102 according to the invention and the photo paper "gasai" were used, on the other hand, ΔE was found to be not greater than 2 and the printed images were recognized visually to be almost the same images as printed initially. In the case of printing the images on the PM photo paper, ΔE was found to be 5. These results indicated the superiority of the photo paper "gasai".

Example 2-2

Preparation of Ink Sets IS-201 and IS-202

Ink compositions of four different colors were each prepared as follows: To the ingredients set forth below, ultra-pure water having a resistance of 18 MΩ or higher was added in an amount to make the total volume 1 liter, and stirred for 1 hour while heating at 30-40° C. The resulting solution was passed through a microfilter having an average pore diameter of 0.25 µm under reduced pressure.

[Formula of Cyan Ink Composition]
(Solid Ingredients)

| | |
|---|---|
| Cyan dye (C-1) | 30 g/l |
| Urea (UR) | 40 g/l |
| Benzotriazole (BTZ) | 0.08 g/l |
| PROXEL XL2 (PXL) | 3.5 g/l |

(Liquid Ingredients)

| | |
|---|---|
| Triethylene glycol (TEG) | 40 g/l |
| Glycerin (GR) | 100 g/l |
| Triethylene glycol monobutyl ether (TGB) | 70 g/l |
| 1,5-Pentanediol (PTD) | 50 g/l |
| Isopropanol (IPA) | 20 g/l |
| Triethanolamine (TEA) | 7 g/l |
| SURFYNOL STG (SW) | 10 g/l |

[Formula of Magenta Ink Composition]
(Solid Ingredients)

| | |
|---|---|
| Magenta dye (M-1) | 23 g/l |
| Urea (UR) | 15 g/l |
| PROXEL | 5 g/l |

(Liquid Ingredients)

| | |
|---|---|
| Triethylene glycol (TEG) | 50 g/l |
| Glycerin (GR) | 100 g/l |
| Triethylene glycol monobutyl ether (TGB) | 50 g/l |
| 1,5-Pentanediol (PTD) | 40 g/l |
| Isopropanol (IPA) | 20 g/l |
| Triethanolamine (TEA) | 6.9 g/l |
| SURFYNOL STG (SW) | 10 g/l |

[Formula of Yellow Ink Composition]
(Solid Ingredients)

| | |
|---|---|
| Yellow dye (Y-1) | 35 g/l |
| PROXEL | 3.5 g/l |
| Benzotriazole (BTZ) | 0.08 g/l |
| Urea (UR) | 10 g/l |

-continued (Liquid Ingredients)

| | |
|---|---|
| Triethylene glycol (TEG) | 40 g/l |
| Glycerin (GR) | 100 g/l |
| Triethylene glycol monobutyl ether (TGB) | 70 g/l |
| 1,5-Pentanediol (PTD) | 60 g/l |
| Isopropanol (IPA) | 20 g/l |
| Triethanolamine (TEA) | 8 g/l |
| SURFYNOL STG (SW) | 10 g/l |

[Formula of Black Ink Composition]
(Solid Ingredients)

| | |
|---|---|
| Black dye (BK-1) | 75 g/l |
| Yellow dye (Y-1) | 30 g/l |
| PROXEL | 5 g/l |
| Urea (UR) | 10 g/l |
| Benzotriazole (BTZ) | 3 g/l |

(Liquid Ingredients)

| | |
|---|---|
| Triethylene glycol (TEG) | 60 g/l |
| Glycerin (GR) | 100 g/l |
| Triethylene glycol monobutyl ether (TGB) | 70 g/l |
| 1,5-Pentanediol (PTD) | 50 g/l |
| Isopropanol (IPA) | 20 g/l |
| Triethanolamine (TEA) | 8 g/l |
| SURFYNOL STG (SW) | 10 g/l |

An ink set constituted of these ink compositions was symbolized by IS-201. Another ink set IS-202 was prepared in the same manner as IS-201, except that the dyes in the ink compositions were replaced with dyes shown in Table 2-2, respectively.

TABLE 2-2

| | Cyan dye | Magenta dye | Yellow dye | Black dye |
|---|---|---|---|---|
| IS-201 (comparison) | C-1 | M-1 | Y-1 | BK-1 |
| IS-202 (invention) | C-2 | M-2 | Y-2 | BK-2 |

The ink compositions were loaded into the ink cartridges of PIXU-S550i, an inkjet printer made by Canon Inc.; and standard image patterns were printed therewith.

Image-receiving sheets used herein were gloss-finished photo paper "gasai", an inkjet photo paper produced by Fuji Photo Film Co., Ltd., and Professional Photo Paper PR-101, an inkjet photo paper produced by Canon Inc. After a 24-hour lapse from the printing, the standard image patterns were printed similarly to the above. The surface pH of PR-101 used herein was found to be 5.25.

In the printing after the 24-hour lapse, great changes in colors of the images printed were observed in the cases of using the standard ink set of PIXUS550i and the ink set IS-201, and ΔE was found to be 17 as described in (Example 2-1). When the ink set according to the invention were used, on the other hand, ΔE was found to be not greater than 2 on either image-receiving sheet and the printed images were recognized visually to be almost the same images as printed initially. These results demonstrate the advantage of the invention.

Industrial Applicability

The present recording medium (first invention) characterized by containing a substantially colorless compound in which at least 10 atoms having conjugate π electrons are present on a per-molecule basis can ensure high print density and formation of images causing no bronzing phenomenon as they have various excellent properties, including excellent hue and high resistances to light, gases and water. Therefore, the present recording medium can achieve excellent image quality, including high color saturation and excellent reflection density, when used as an ink-jet recording material.

The second invention can provide images, most notably inkjet-recorded images, which have glossiness and weather resistance with certainty and are reduced in hue change by ageing initiated immediately after printing even when porous image-receiving materials are used as media for forming the images.

The entire disclosure of each and every foreign patent application from which the benefit of foreign priority has been claimed in the present application is incorporated herein by reference, as if fully set forth.

The invention claimed is:

1. A recording medium comprising a support and an ink-receiving layer provided on the support,
    wherein the ink-receiving layer comprises a compound in which at least 10 atoms having conjugate π electrons are present on a per-molecule basis;
    wherein the recording medium is an ink jet recording material; and
    wherein the compound is at least one compound selected from the group consisting of compounds P-1, P-29, P-33, P-34, P-35, P-36, and P-38:

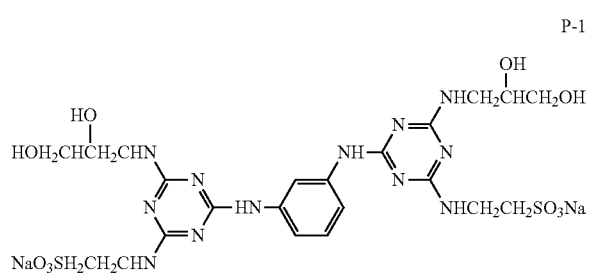

P-1

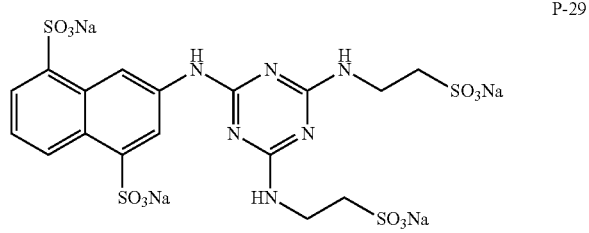

P-29

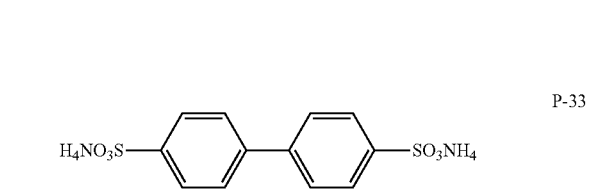

P-33

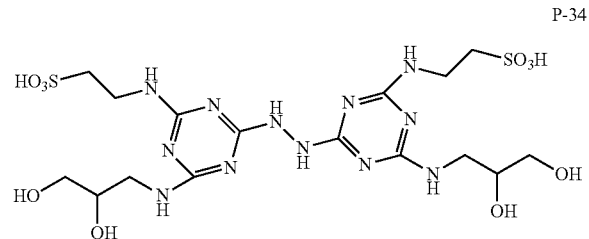

P-34

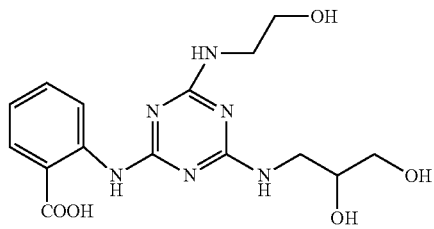

P-35

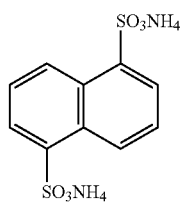

P-36

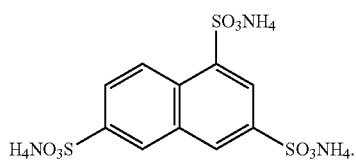

P-38

2. A recording medium according to claim 1, wherein the compound shows no fluorescence and has a longest-wavelength-side absorption peak λmax at a wavelength of 350 nm or shorter and a molar absorption constant of 10,000 or below at any of wavelengths within a visible spectral region of 400 to 700 nm.

3. A recording medium according to in any of claims 1, wherein the compound further contains a solubilizing group.

4. A recording medium according to claim 1, wherein the ink-receiving layer further comprises a water-soluble resin.

5. A recording medium according to claim 4, wherein the water-soluble resin is at least one resin selected from polyvinyl alcohol resins, cellulose resins, ether linkage-containing resins, carbamoyl group-containing resins, carboxyl group-containing resins and gelatins.

6. A recording medium according to claim 1, wherein the ink-receiving layer further comprises a cross-linking agent capable of forming cross-links between molecules of the water-soluble resin.

7. A recording medium according to claim 1, wherein the ink-receiving layer further comprises a particulate substance.

8. A recording medium according to claim 7, wherein the particulate substance is at least one substance selected from particulate silica, colloidal silica, particulate alumina and pseudo boehmite.

9. A recording medium according to claim 1, wherein the ink-receiving layer further comprises a mordant.

10. A recording medium according to claim 1, wherein the ink-receiving layer further comprises a compound having at least two species of di- or higher-valent metal atoms per molecule.

11. A recording medium according to claim 1, wherein the compound is colorless.

* * * * *